United States Patent
Shinohara et al.

(10) Patent No.: US 9,581,831 B2
(45) Date of Patent: Feb. 28, 2017

(54) OPTICAL LENS, METHOD FOR DESIGNING OPTICAL LENS, AND APPARATUS FOR MANUFACTURING OPTICAL LENS

(75) Inventors: Toshihide Shinohara, Chino (JP); Tadashi Kaga, Minowa-machi (JP); Takateru Mori, Minowa-machi (JP)

(73) Assignee: EHS LENS PHILIPPINES, INC., Cavite (PH)

( * ) Notice: Subject to any disclaimer, the term of this patent is extended or adjusted under 35 U.S.C. 154(b) by 176 days.

(21) Appl. No.: 13/615,004

(22) Filed: Sep. 13, 2012

(65) Prior Publication Data

US 2013/0083288 A1    Apr. 4, 2013

(30) Foreign Application Priority Data

Sep. 30, 2011    (JP) .................................. 2011-216722

(51) Int. Cl.
G02C 7/06    (2006.01)
G02C 7/02    (2006.01)

(52) U.S. Cl.
CPC ............... *G02C 7/02* (2013.01); *G02C 7/024* (2013.01); *G02C 7/061* (2013.01); *G02C 7/065* (2013.01)

(58) Field of Classification Search
CPC ........ G02C 7/024; G02C 7/025; G02C 7/061; G02C 7/068
USPC ............. 351/159.41, 159.42, 159.76, 159.77
See application file for complete search history.

(56) References Cited

U.S. PATENT DOCUMENTS

| | | |
|---|---|---|
| 5,777,716 A | 7/1998 | Miura et al. |
| 5,926,250 A | 7/1999 | Mukaiyama et al. ........ 351/168 |
| 6,019,470 A | 2/2000 | Mukaiyama et al. ........ 351/169 |
| 6,139,148 A | 10/2000 | Menezes et al. |
| 6,935,744 B2 | 8/2005 | Kitani et al. .................. 351/169 |
| 7,241,010 B2 | 7/2007 | Kitani et al. .................. 351/177 |

(Continued)

FOREIGN PATENT DOCUMENTS

| | | |
|---|---|---|
| DE | 10020576 A1 | 11/2001 |
| EP | 2237100 A1 | 10/2010 |

(Continued)

OTHER PUBLICATIONS

Extended European search report dated Jan. 13, 2013 issued in corresponding European application 12186330.2 cites the U.S. patent application publication and foreign patent documents listed above.

(Continued)

*Primary Examiner* — Bumsuk Won
*Assistant Examiner* — William R Alexander
(74) *Attorney, Agent, or Firm* — DLA Piper LLP (US)

(57) ABSTRACT

An optical lens including, an object-side surface including an atoric surface element and an eyeball-side surface including an element that cancels a surface power shift produced by the atoric surface element, wherein the atoric surface element causes horizontal surface power at a fitting point to be greater than vertical surface power at the fitting point and causes a difference between the horizontal surface power and the vertical surface power to decrease along a horizontal reference line passing through the fitting point in a direction from the fitting point toward a periphery of the optical lens or causes a sign of the difference between the horizontal surface power and the vertical surface power to change along the horizontal reference line.

10 Claims, 29 Drawing Sheets

(56) References Cited

U.S. PATENT DOCUMENTS

| | | | |
|---|---|---|---|
| 2003/0086055 A1* | 5/2003 | Morris et al. | 351/159 |
| 2004/0233385 A1 | 11/2004 | Kitani et al. | |
| 2005/0225719 A1* | 10/2005 | Kamishita et al. | 351/159 |
| 2008/0284978 A1* | 11/2008 | Kaga | 351/169 |

FOREIGN PATENT DOCUMENTS

| | | |
|---|---|---|
| JP | 08-114775 A | 5/1996 |
| JP | 2002-249992 A | 9/2000 |
| JP | 2003-344813 | 12/2003 |
| JP | 2004-004436 | 1/2004 |
| WO | WO 97/19382 A1 | 5/1997 |
| WO | WO 97/19383 A1 | 5/1997 |
| WO | 9735224 A1 | 9/1997 |
| WO | 9963392 A1 | 12/1999 |
| WO | 2012115258 A1 | 8/2012 |

OTHER PUBLICATIONS

A.H. Tunnacliffe, "Primary Position", Introduction to Visual Optics, pp. 312-313, 1993.

* cited by examiner

10a

| HORIZONTAL DISTANCE x (mm) FROM PRINCIPAL MERIDIAN | 0 | 5 | 10 | 15 | 20 | 25 | 30 | 35 | 40 |
|---|---|---|---|---|---|---|---|---|---|
| OBJECT-SIDE HORIZONTAL SURFACE POWER OHP (D) | 5.000 | 5.000 | 4.860 | 4.480 | 3.920 | 3.240 | 2.500 | 1.760 | 1.080 |
| OBJECT-SIDE VERTICAL SURFACE POWER OVP (D) | 3.000 | 3.000 | 3.000 | 3.000 | 3.000 | 3.000 | 3.000 | 3.000 | 3.000 |
| OBJECT-SIDE SAG (mm) | 0.000 | 0.098 | 0.378 | 0.849 | 1.485 | 2.280 | 3.199 | 4.223 | 5.318 |
| LENS THICKNESS (mm) | 1.10 | 1.16 | 1.32 | 1.61 | 2.01 | 2.54 | 3.20 | 3.99 | 4.93 |

| HORIZONTAL DISTANCE x (mm) FROM PRINCIPAL MERIDIAN | 0 | 5 | 10 | 15 | 20 | 25 | 30 | 35 | 40 |
|---|---|---|---|---|---|---|---|---|---|
| OBJECT-SIDE HORIZONTAL SURFACE POWER OHP (D) | 5.000 | 5.000 | 5.000 | 5.000 | 5.000 | 5.000 | 5.000 | 5.000 | 5.000 |
| OBJECT-SIDE VERTICAL SURFACE POWER OVP (D) | 3.000 | 3.000 | 3.000 | 3.000 | 3.000 | 3.000 | 3.000 | 3.000 | 3.000 |
| OBJECT-SIDE SAG (mm) | 0.000 | 0.101 | 0.403 | 0.908 | 1.485 | 2.538 | 3.672 | 5.025 | 6.606 |
| LENS THICKNESS (mm) | 1.10 | 1.16 | 1.32 | 1.61 | 2.02 | 2.57 | 3.28 | 4.19 | 5.33 |

| HORIZONTAL DISTANCE x (mm) FROM PRINCIPAL MERIDIAN | 0 | 5 | 10 | 15 | 20 | 25 | 30 | 35 | 40 |
|---|---|---|---|---|---|---|---|---|---|
| OBJECT-SIDE HORIZONTAL SURFACE POWER OHP (D) | 2.500 | 2.500 | 2.500 | 2.500 | 2.500 | 2.500 | 2.500 | 2.500 | 2.500 |
| OBJECT-SIDE VERTICAL SURFACE POWER OVP (D) | 2.500 | 2.500 | 2.500 | 2.500 | 2.500 | 2.500 | 2.500 | 2.500 | 2.500 |
| OBJECT-SIDE SAG (mm) | 0.000 | 0.050 | 0.201 | 0.453 | 0.805 | 1.259 | 1.815 | 2.474 | 3.236 |
| LENS THICKNESS (mm) | 1.10 | 1.16 | 1.31 | 1.58 | 1.95 | 2.44 | 3.02 | 3.72 | 4.54 |

FIG.11C

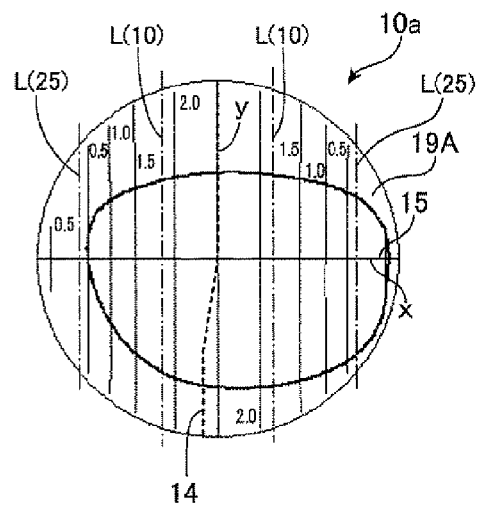 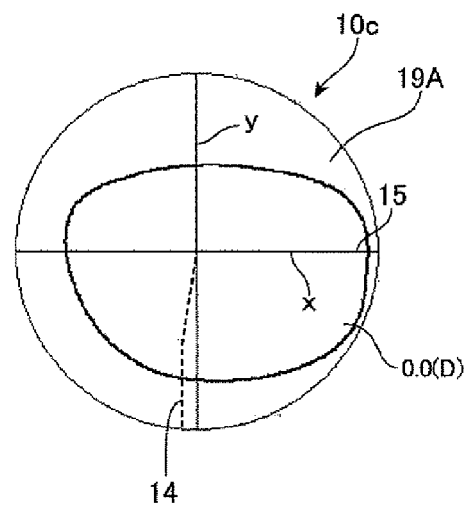
FIG.13A  FIG.13B
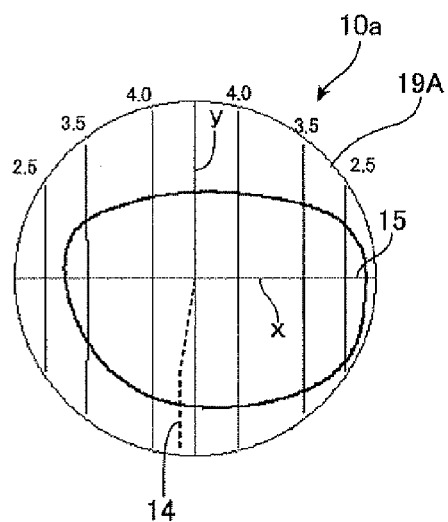 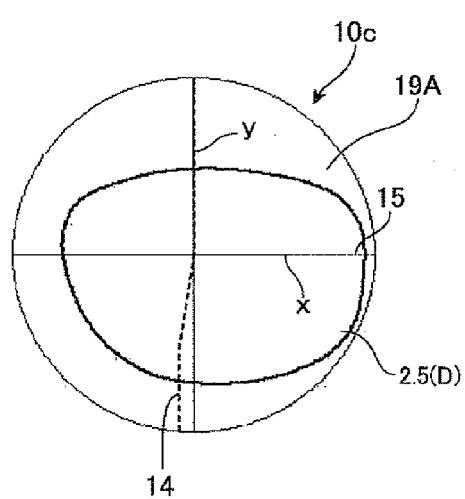
FIG.14A  FIG.14B

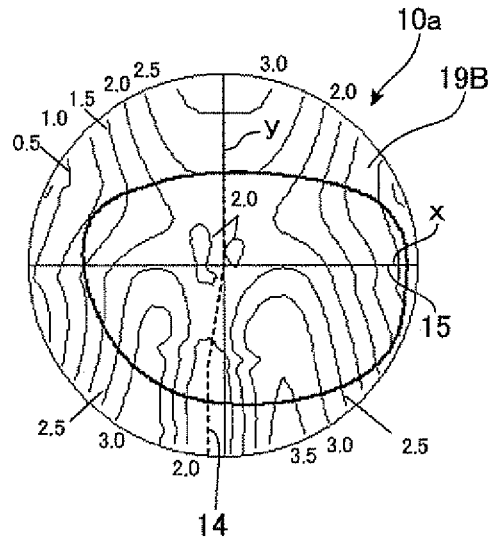 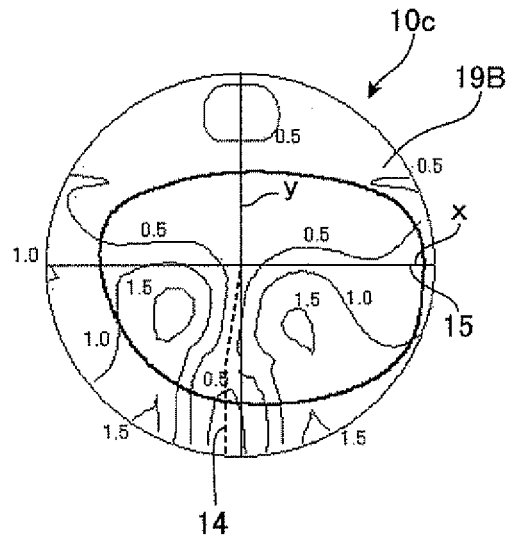
FIG.15A  FIG.15B
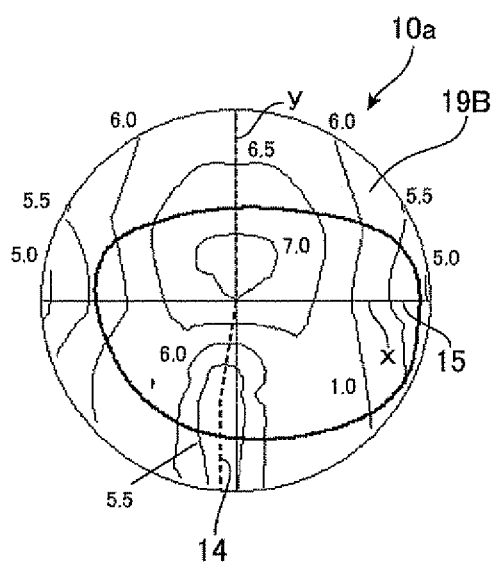 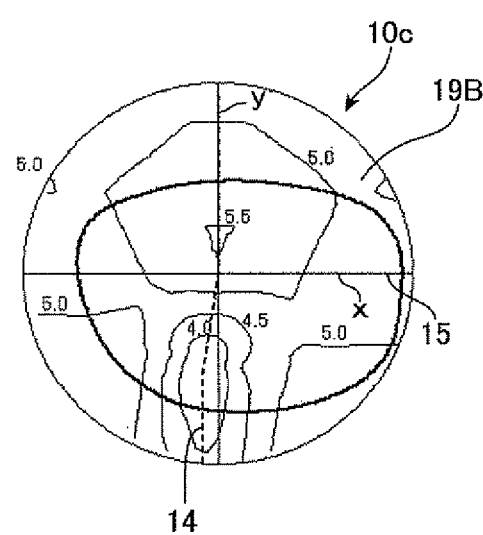
FIG.16A  FIG.16B

| HORIZONTAL DISTANCE x (mm) FROM PRINCIPAL MERIDIAN | 0 | 5 | 10 | 15 | 20 | 25 | 30 | 35 | 40 |
|---|---|---|---|---|---|---|---|---|---|
| OBJECT-SIDE HORIZONTAL SURFACE POWER OHP (D) | 4.000 | 4.000 | 3.983 | 3.797 | 3.410 | 2.831 | 2.068 | 1.126 | 0.026 |
| OBJECT-SIDE VERTICAL SURFACE POWER OVP (D) | 2.000 | 2.000 | 2.000 | 2.000 | 2.000 | 2.000 | 2.000 | 2.000 | 2.000 |
| OBJECT-SIDE SAG (mm) | 0.000 | 0.079 | 0.302 | 0.683 | 1.202 | 1.857 | 2.618 | 3.463 | 4.351 |
| LENS THICKNESS (mm) | 1.10 | 1.16 | 1.32 | 1.60 | 1.98 | 2.50 | 3.12 | 3.88 | 4.77 |

| HORIZONTAL DISTANCE x (mm) FROM PRINCIPAL MERIDIAN | 0 | 5 | 10 | 15 | 20 | 25 | 30 | 35 | 40 |
|---|---|---|---|---|---|---|---|---|---|
| OBJECT-SIDE HORIZONTAL SURFACE POWER OHP (D) | 4.000 | 4.000 | 4.000 | 4.000 | 4.000 | 4.000 | 4.000 | 4.000 | 4.000 |
| OBJECT-SIDE VERTICAL SURFACE POWER OVP (D) | 2.000 | 2.000 | 2.000 | 2.000 | 2.000 | 2.000 | 2.000 | 2.000 | 2.000 |
| OBJECT-SIDE SAG (mm) | 0.000 | 0.080 | 0.322 | 0.725 | 1.292 | 2.023 | 2.921 | 3.990 | 5.233 |
| LENS THICKNESS (mm) | 1.10 | 1.16 | 1.32 | 1.60 | 1.99 | 2.51 | 3.16 | 3.98 | 4.98 |

10f

| HORIZONTAL DISTANCE x (mm) FROM PRINCIPAL MERIDIAN | 0 | 5 | 10 | 15 | 20 | 25 | 30 | 35 | 40 |
|---|---|---|---|---|---|---|---|---|---|
| OBJECT-SIDE HORIZONTAL SURFACE POWER OHP (D) | 6.000 | 6.000 | 5.916 | 5.688 | 5.352 | 4.944 | 4.500 | 4.056 | 3.648 |
| OBJECT-SIDE VERTICAL SURFACE POWER OVP (D) | 5.000 | 5.000 | 5.000 | 5.000 | 5.000 | 5.000 | 5.000 | 5.000 | 5.000 |
| OBJECT-SIDE SAG (mm) | 0.000 | 0.118 | 0.454 | 1.025 | 1.807 | 2.811 | 4.008 | 5.402 | 6.967 |
| LENS THICKNESS (mm) | 3.80 | 3.74 | 3.56 | 3.25 | 2.83 | 2.31 | 1.68 | 0.96 | 0.16 |

| HORIZONTAL DISTANCE x (mm) FROM PRINCIPAL MERIDIAN | 0 | 5 | 10 | 15 | 20 | 25 | 30 | 35 | 40 |
|---|---|---|---|---|---|---|---|---|---|
| OBJECT-SIDE HORIZONTAL SURFACE POWER OHP (D) | 6.000 | 6.000 | 6.000 | 6.000 | 6.000 | 6.000 | 6.000 | 6.000 | 6.000 |
| OBJECT-SIDE VERTICAL SURFACE POWER OVP (D) | 6.000 | 6.000 | 6.000 | 6.000 | 6.000 | 6.000 | 6.000 | 6.000 | 6.000 |
| OBJECT-SIDE SAG (mm) | 0.000 | 0.121 | 0.483 | 1.091 | 1.948 | 3.060 | 4.436 | 6.087 | 8.028 |
| LENS THICKNESS (mm) | 3.80 | 3.74 | 3.56 | 3.25 | 2.83 | 2.30 | 1.68 | 0.93 | 0.07 |

FIG.34B

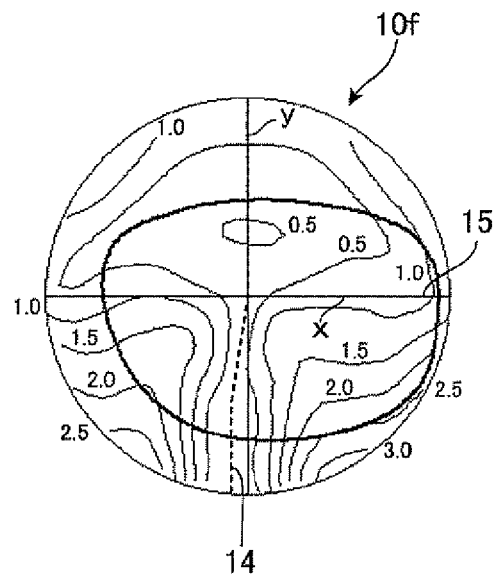
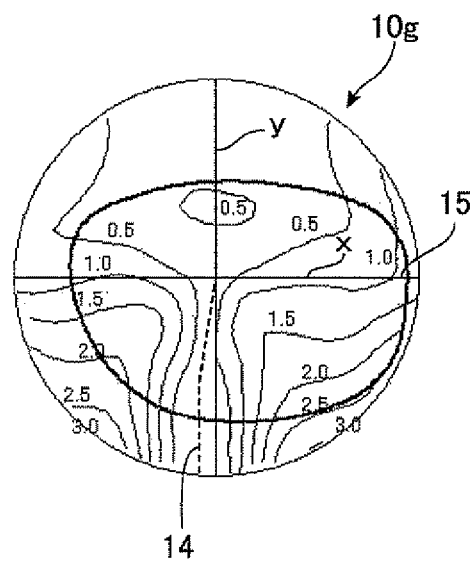
FIG.40A  FIG.40B
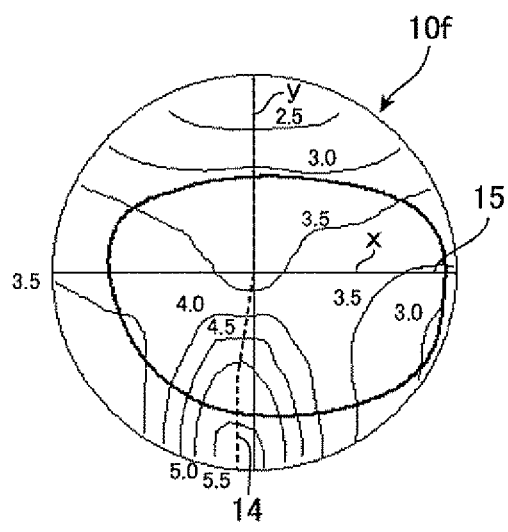
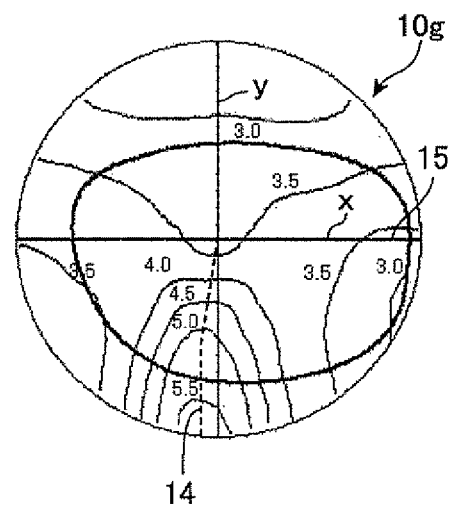
FIG.41A  FIG.41B

OPTICAL LENS, METHOD FOR DESIGNING OPTICAL LENS, AND APPARATUS FOR MANUFACTURING OPTICAL LENS

This application claims priority to Japanese Patent Application No. 2011-216722, filed Sep. 30, 2011, the entirety of which is hereby incorporated by reference.

BACKGROUND

1. Technical Field

The present invention relates to an optical lens, a method for designing the optical lens, and an apparatus for manufacturing the optical lens.

2. Background Art

International Publication WO97/19382 on a progressive multifocal lens used as a spectacle lens suitable for presbyopia correction or other vision correction describes that a progressive refractive surface having been provided on the object-side surface in related art is provided on the eyeball-side surface. This configuration allows the object-side surface to be a spherical surface having a fixed base curve, whereby no variation in magnification caused by a shape factor will occur, and the difference in magnification between the distance portion and the near portion can be reduced. In addition, any change in magnification in the progressive portion can be suppressed. The resultant progressive multifocal lens can therefore reduce image sway and distortion due to the difference in magnification and provide a comfortable field of view. International Publication WO97/19382 further describes that image sway and distortion can be reduced also in a progressive multifocal lens for astigmatism correction by combining a progressive refractive surface with a toric surface for astigmatism correction based on a combination formula to form the eyeball-side surface.

The multifocal spectacle lens described in International Publication WO97/19383 has viewing portions having different power factors, such as a distance portion and a near portion, and achieves predetermined addition power by configuring the object-side surface in such a way that the difference in average surface power between the distance portion and the near portion is mathematically smaller than the addition power and configuring the eyeball-side surface in such a way that average surface power of the distance portion and average surface power of the near portion are adjusted. The configuration described above not only allows the average surface power of the object-side surface to be so adjusted that the difference in magnification between the distance portion and the near portion decreases but also allows the difference in average surface power between the distance portion and the near portion of the object-side surface. The resultant multifocal lens can therefore reduce image sway and distortion due to the difference in magnification and provide a wide bright field of view where astigmatism is corrected and a comfortable field of view where image sway and other disadvantages are suppressed.

JP-A-2003-344813 describes provision of a double-sided aspheric progressive power lens that has a small amount of difference in image magnification between the distance portion and the near portion and provides excellent vision correction according to prescriptions and a wide effective field of view having a small amount of distortion in use of the lens. Specifically, JP-A-2003-344813 describes that horizontal surface power DHf and vertical surface power DVf of a first refractive surface, which is the object-side surface, in a distance power measurement position F1 and horizontal surface power DHn and vertical surface power DVn of the first refractive surface in a near power measurement position N1 satisfy DHf+DHn<DVf+DVn and DHn<DVn; surface astigmatism components in the positions F1 and N1 on the first refractive surface are canceled by those on the eyeball-side surface, which is a second refractive surface; and the first and second refractive surfaces as a whole provide distance power and addition power based on the prescriptions.

JP-A-2004-004436 describes provision of a progressive power lens that provides improved spectacle performance by reducing image distortion and blur inevitably produced by a typical progressive power lens. To this end, the double-sided progressive lens described in JP-A-2004-004436 has an object-side progressive surface and an eyeball-side progressive surface so shaped that the object-side surface has negative surface addition power and the distribution of average surface power of the object-side surface is similar to that of the eyeball-side surface.

Although the above and other technologies have improved the performance of a progressive power lens, some users still cannot adapt to the characteristics of a progressive power lens, particularly an image sway characteristic, and further improvement is therefore required.

SUMMARY

An aspect of the invention is directed to an optical lens including an object-side surface including an atoric surface element and an eyeball-side surface including an element that cancels a surface power shift produced by the atoric surface element. The atoric surface element causes horizontal surface power OHP at a fitting point to be greater than vertical surface power OVP at the fitting point and the difference TP between the horizontal surface power OHP and the vertical surface power OVP to decrease along a horizontal reference line passing through the fitting point in a direction from the fitting point toward a periphery of the optical lens or the sign of the difference between the horizontal surface power and the vertical surface power to change along the horizontal reference line.

An atoric surface element refers to an element formed of a small curved surface having different power factors along two orthogonal primary meridians, that is, horizontal and vertical meridians, at least one of which has an aspheric shape. In contrast, a toric surface element refers to an element formed of a small curved surface having different power factors along two orthogonal primary meridians, that is, horizontal and vertical meridians, each of which has a spherical shape. In the optical lens described above, the eyeball-side element (eyeball-side atoric surface element) cancels a surface power shift produced by the atoric surface element of the object-side surface. That is, the atoric surface elements of the object-side and eyeball-side surfaces of the optical lens cancel power shifts produced by the atoric surface elements with respect to each other. The atoric surface elements are therefore not intended to correct astigmatism but are effective in suppressing image sway produced through the spectacle lens when the eye (line of sight) moves.

Typical sight line (eye) movement that produces sway of an image formed through a spectacle lens occurs when an eyeball (sight line) moves relative to the head under the influence of vestibulo-ocular reflex that compensates movement of the head. The line of sight that moves under the influence of vestibulo-ocular reflex typically moves more greatly in the horizontal direction than in the vertical direction. The optical lens includes a microscopical toric surface (troidal surface) element around the fitting point on the object-side surface where the line of sight moves by the greatest amount. The toric surface element provides horizontal surface power OHP greater than vertical surface power OVP. That is, the horizontal curvature is greater than the vertical curvature or the vertical radius of curvature is greater than the horizontal radius of curvature. In this case, when the line of sight moves horizontally, the angle at which the line of sight passes through the optical lens (incident and exiting angles at which line of sight is incident on and exits out of optical lens) will not greatly vary. A variety of aberrations contained in an image formed through the optical lens when the line of sight moves can therefore be reduced, whereby the optical lens (spectacle lens) can form a sway-suppressed image.

Further, the advantageous effect of the toric surface described above is provided in the vicinity of the fitting point, where the line of sight moves by the greatest amount, whereas the horizontal curve will not be too deep as the entire optical lens by providing the optical lens with an atoric surface element where horizontal surface power OHP is greater than vertical surface power OVP at the fitting point and the difference TP between the horizontal surface power OHP and the vertical surface power OVP decreases or the sign of the difference TP is reversed along the horizontal reference line passing through the fitting point toward the periphery of the optical lens. The resultant optical lens including a toric surface element on both surfaces thereof can be suitably used as a spectacle lens capable of suppressing increase in edge thickness difference and being readily fit into a frame.

To provide the advantageous effect of the toric surface and prevent the horizontal curve from being too deep, the difference TPc between the horizontal surface power OHP and the vertical surface power OVP of the atoric surface element at the fitting point is desirably greater than or equal to 0.5 D but smaller than or equal to 3.5 D, where D represents dioptre. The difference TP is more desirably greater than or equal to 1.0 D but smaller than or equal to 3.0 D, and still more desirably greater than or equal to 1.5 D but smaller than or equal to 2.5 D.

The amount of decrease $\Delta TP$ in the difference TP between the horizontal surface power OHP and the vertical surface power OVP of the atoric surface element is desirably 0.3 D at maximum in an area within ±10 mm from the fitting point. The advantageous effect of the toric surface is likely to be provided by maintaining the difference TP in the region around the fitting point where the line of sight moves by the greatest amount.

The amount of decrease $\Delta TP$ in the difference TP between the horizontal surface power OHP and the vertical surface power OVP of the atoric surface element in an area within ±25 mm from the fitting point along the horizontal reference line is desirably greater than or equal to 0.3 times the difference TPc between the horizontal surface power OHP and the vertical surface power OVP at the fitting point but smaller than or equal to 1.5 times of the difference TPc between the horizontal surface power OHP and the vertical surface power OVP at the fitting point. The toric surface element can prevent the horizontal lens curve from being too deep.

The optical lens may be a progressive power lens including a distance portion and a near portion having different power factors. The atoric surface element of the object-side surface of the progressive power lens includes at least one of the following elements: an element where horizontal surface power OHPf is greater than vertical surface power OVPf of the distance portion along a principal meridian or a vertical reference line passing through the fitting point (distance element) and an element where horizontal surface power OHPn is greater than vertical surface power OVPn of the near portion along the vertical reference line passing through the fitting point or the principal meridian (near element). The resultant optical lens can be a progressive power lens that produces a sway-suppressed image, suppresses increase in edge thickness difference, and is readily fit into a frame.

The amount of decrease in the difference between the horizontal surface power and the vertical surface power of the atoric surface element in an area within ±10 mm from the vertical reference line passing through the fitting point or the principal meridian is desirably smaller than or equal to 0.3 D. The resultant optical lens can produce a sway-suppressed image through the region along the vertical reference line or the principal meridian that is most frequently used in distance vision, intermediate vision, and near vision. Further, the amount of decrease $\Delta TP$ in the difference TP between the horizontal surface power OHP and the vertical surface power OVP of the atoric surface element in an area within ±25 mm from the vertical reference line passing through the fitting point or the principal meridian is desirably 0.3 times or greater than but 1.5 times or smaller than the difference TPc between the horizontal surface power OHP and the vertical surface power OVP along the vertical reference line or the principal meridian.

The object-side surface desirably includes any of the following elements: a first element, a second element, and a third element. The first element causes the vertical surface power OVPf to be greater than the vertical surface power OVPn. The second element causes the vertical surface power OVPf to be smaller than the vertical surface power OVPn. The third element causes the vertical surface power OVPf to be equal to the vertical surface power OVPn and horizontal surface power OHPf to be equal to horizontal surface power OHPn.

For example, when the optical lens is prescribed for hypermetropia correction, addition power is added to the distance portion having positive average prescribed power. The near portion therefore has greater positive power. A large amount of distortion is therefore produced through the intermediate portion and the near portion and tends to increase the amount of image sway in use of the optical lens. To further reduce the amount of image sway produced by the optical lens, an atoric surface element having what is called reverse progressive specifications (first element) where the vertical surface power progressively decreases in the direction from the intermediate portion toward the near portion is added in many cases.

When the optical lens is prescribed for myopia correction, addition power is added to the distance portion having negative average prescribed power. The power of the near portion is therefore shifted toward the positive side and becomes small but still negative in many cases. As a result, distortion produced by the near portion becomes smaller than that produced by the distance portion, whereby the amount of image sway decreases in use of the optical lens and the wearer is unlikely to feel image sway. On the other hand, when the optical lens is prescribed to correct hypermetropia, in which the image magnification is greater than one and an image is enlarged, the vision is satisfactorily corrected accordingly, whereas when the optical lens is prescribed to correct myopia, in which the image magnification is smaller than one and the image is reduced in size, it is difficult to correct the vision in a satisfactory manner. To provide an optical lens that has a greater image magnification, provides a smaller amount of image sway, and is likely to correct vision in a satisfactory manner, an atoric surface element having what is called object-side progressive specifications (second element) in which the vertical surface power progressively increases in the direction from the intermediate portion toward the near portion is added in many cases.

When the prescribed power of the distance portion of the optical lens is close to that used in emmentropia, a progressive power optical lens that achieves image sway suppression and image-enlargement-based vision improvement in a well balanced manner can be provided in many cases by using a simple atoric surface element where the horizontal surface power is greater than the vertical surface power of the object-side surface along the principal meridian (third element).

Another aspect of the invention is directed to a method for designing an optical lens having an object-side surface and an eyeball-side surface. The method includes providing the object-side surface with an atoric surface element and providing the eyeball-side surface with an element that cancels a surface power shift produced by the atoric surface element of the object-side surface. The atoric surface element causes horizontal surface power OHP at a fitting point to be greater than vertical surface power OVP at the fitting point and the difference TP between the horizontal surface power and the vertical surface power to decrease along a horizontal reference line passing through the fitting point in a direction from the fitting point toward a periphery of the optical lens or the sign of the difference between the horizontal surface power and the vertical surface power to change along the horizontal reference line.

The design method is also applicable to design of an optical lens further having a distance portion and a near portion having different power factors. The atoric surface element may further include at least one of the following elements: an element where horizontal surface power OHPf is greater than vertical surface power OVPf of the distance portion along a principal meridian or a vertical reference line passing through the fitting point and an element where horizontal surface power OHPn is greater than vertical surface power OVPn of the near portion along the vertical reference line passing through the fitting point or the principal meridian.

The object-side surface may further include any of the following elements: a first element, a second element, and a third element. The first element causes the vertical surface power OVPf of the distance portion to be greater than the vertical surface power OVPn of the near portion. The second element causes the vertical surface power OVPf of the distance portion to be smaller than the vertical surface power OVPn of the near portion. The third element causes the vertical surface power OVPf of the distance portion to be equal to the vertical surface power OVPn of the near portion and the horizontal surface power OHPf of the distance portion to be equal to the horizontal surface power OHPn of the near portion.

Still another aspect of the invention is directed to an optical lens manufacturing method including manufacturing an optical lens designed by using the design method described above.

Yet another aspect of the invention is directed to an apparatus for designing an optical lens having an object-side surface and an eyeball-side surface. The apparatus includes a first unit that provides the object-side surface with an atoric surface element where horizontal surface power at a fitting point is greater than vertical surface power at the fitting point and the difference between the horizontal surface power and the vertical surface power decreases along a horizontal reference line passing through the fitting point in a direction from the fitting point toward a periphery of the optical lens or the sign of the difference between the horizontal surface power and the vertical surface power changes along the horizontal reference line and a second unit that provides the eyeball-side surface with an element that cancels a surface power shift produced by the atoric surface element of the object-side surface.

BRIEF DESCRIPTION OF THE DRAWINGS

The invention will be described with reference to the accompanying drawings, wherein like numbers reference like elements.

FIG. 11A shows numerical data of the object-side surface of the progressive power lens according to Example 1, FIG. 11B shows numerical data of the object-side surface of the progressive power lens according to Comparative Example 1, and FIG. 11C shows numerical data of the object-side surface of a progressive power lens according to Prior art Example 1.

FIG. 13A shows a surface astigmatism distribution across the object-side surface of the progressive power lens according to Example 1, and FIG. 13B shows a surface astigmatism distribution across the object-side surface of the progressive power lens according to Prior art Example 1.

FIG. 14A shows an equivalent spherical surface power distribution across the object-side surface of the progressive power lens according to Example 1, and FIG. 14B shows an equivalent spherical surface power distribution across the object-side surface of the progressive power lens according to Prior art Example 1.

FIG. 15A shows a surface astigmatism distribution across the eyeball-side surface of the progressive power lens according to Example 1, and FIG. 15B shows a surface astigmatism distribution across the eyeball-side surface of the progressive power lens according to Prior art Example 1.

FIG. 16A shows an equivalent spherical surface power distribution across the eyeball-side surface of the progressive power lens according to Example 1, and FIG. 16B shows an equivalent spherical surface power distribution across the eyeball-side surface of the progressive power lens according to Prior art Example 1.

FIG. 34A shows numerical data of the object-side surface of the progressive power lens according to Example 3, and FIG. 34B shows numerical data of the object-side surface of a progressive power lens according to Prior art Example 3.

FIG. 40A shows an astigmatism distribution across the progressive power lens according to Example 3, and FIG. 40B shows an astigmatism distribution across the progressive power lens according to Prior art Example 3.

FIG. 41A shows an equivalent spherical power distribution across the progressive power lens according to Example 3, and FIG. 41B shows an equivalent spherical power distribution across the progressive power lens according to Prior art Example 3.

DESCRIPTION OF EXEMPLARY EMBODIMENTS

Figure 1:
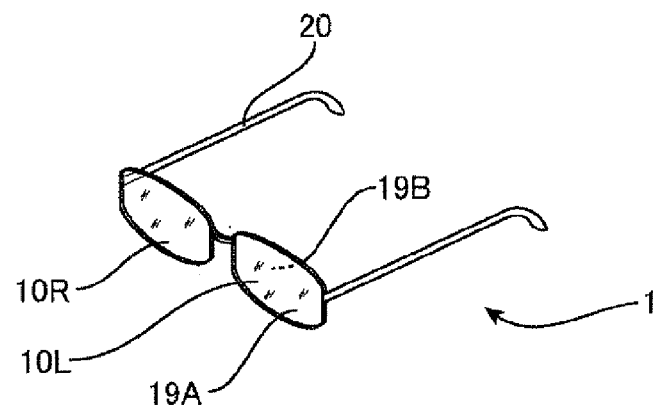
FIG. 1 is a perspective view showing an example of spectacles.
Figures 2A, 2B:
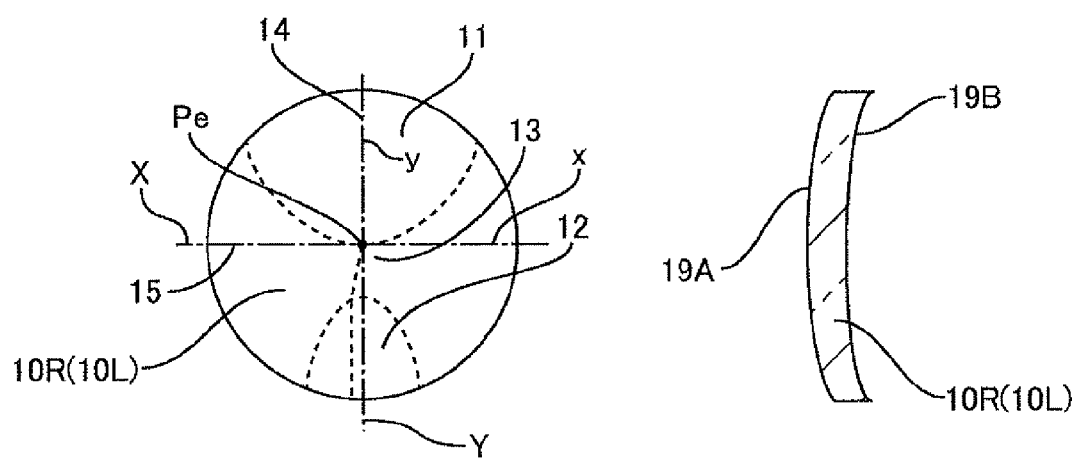
FIG. 2A is a plan view diagrammatically showing a progressive power lens.
FIG. 2B is a cross-sectional view of the progressive power lens.

FIG. 1 is a perspective view showing an example of spectacles. FIG. 2A is a plan view diagrammatically showing an optical lens (spectacle lens) according to an embodiment of the invention. FIG. 2B is a cross-sectional view diagrammatically showing the lens.

In the present description, the right and left sides are defined as the right and left sides viewed from a user (wearer, eyeball). Spectacles 1 include a pair of right and left optical lenses (spectacle lenses) 10R, 10l, for the right and left eyes and a spectacle frame 20 to which the lenses 10R and 10L are attached. Each of the optical lenses 10R and 10L is a progressive power lens, more specifically, a progressive multifocal lens. Each of the lenses 10R and 10L basically has a meniscus shape convex toward an object. Each of the lenses 10R and 10L therefore has an object-side surface (convex surface) 19A and an eyeball-side (user-side) surface (concave surface) 19B.

FIG. 2A shows the lens 10R for the right eye. The lens 10R has a distance portion 11, which is an upper viewing portion (head-top-side portion when spectacles are worn) that allows the user to view a distant object (distance vision), and a near portion 12, which is a lower viewing portion (jaw-side portion when spectacles are worn) that allows the user to view a near object (near vision) and has power different from that of the distance portion 11. The lens 10R further has an intermediate portion (portion for intermediate vision, progressive portion, progressive corridor) 13 that connects the distance portion 11 and the near portion 12 to each other in such a way that the power continuously changes across the boundary therebetween. The lens 10R further has a principal meridian 14 that connects on-lens positions that are the centers of the viewing portions for distance vision, intermediate vision, and near vision. A fitting point Pe, which is an on-lens reference point through which the line of sight of the user who is horizontally viewing a distant object in front of the user (primary position) is designed to pass when the periphery of the spectacle lens 10R is so shaped that the spectacle lens 10R is fit in a rim of the frame and fixed therein, is typically positioned in the vicinity of the lower end of the distance portion 11. In the following description, assume the fitting point Pe to be the origin of the coordinates of the lens, and let an X coordinate be the horizontal coordinate along a horizontal reference line 15 (line passing through fitting point Pe and perpendicular to principal meridian 14 of distance portion 11) and a Y coordinate be the vertical coordinate along a vertical reference line y (line passing through fitting point Pe and parallel to principal meridian 14 of distance portion 11) or the principal meridian 14. The principal meridian 14 extends substantially in the vertical direction from the distance portion 11 toward the near portion 12 and deviates from the vertical reference line Y toward the nose after it passes through the fitting point Pe or a point in the vicinity thereof.

The following description of a spectacle lens will be made primarily based on the spectacle lens 10R for the right eye. The spectacle lens or the lens described herein may be the spectacle lens 10L for the left eye, because the spectacle lens 10L for the left eye is basically bilaterally symmetrical with the spectacle lens 10R for the right eye except differences in spectacle specifications between the right and left eyes. In the following description, the spectacle lens 10R for the right eye and the spectacle lens 10L for the left eye are collectively referred to as a spectacle lens (or lens, progressive power lens) 10.

Among a variety of optical performance characteristics of the progressive power lens 10, the size of the field of view can be determined by using an astigmatism distribution diagram and an equivalent spherical power distribution diagram. One of the important performance characteristics of the progressive power lens 10 is how small the amount of sway sensed by the user who wears the progressive power lens 10 is when the user moves the head. It is noted that progressive power lenses having substantially the same astigmatism distribution and equivalent spherical power distribution may differ from each other in terms of sway in some cases. A method for evaluating sway will first be described below, and embodiments of the present application will be compared with examples of prior art by using the evaluation method.

1. METHOD FOR EVALUATING SWAY

Figure 3A:
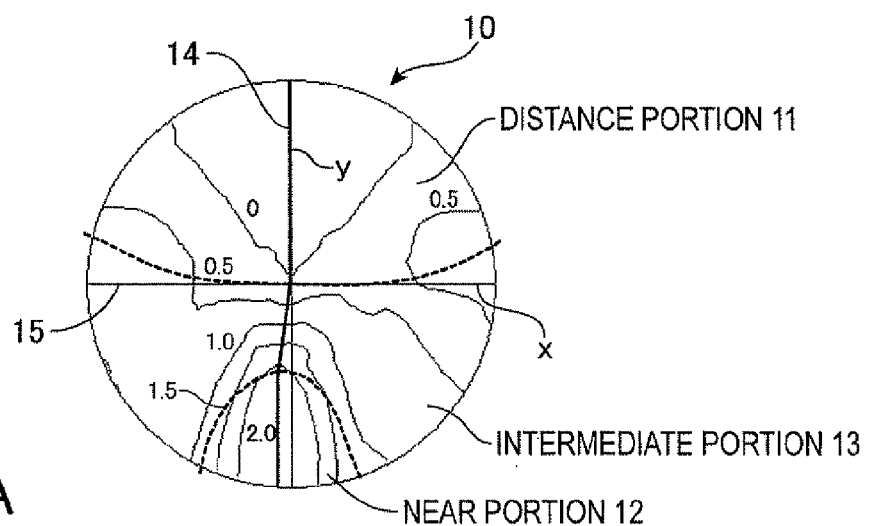
FIG. 3A shows an equivalent spherical power distribution across a spectacle lens.
Figure 3B:
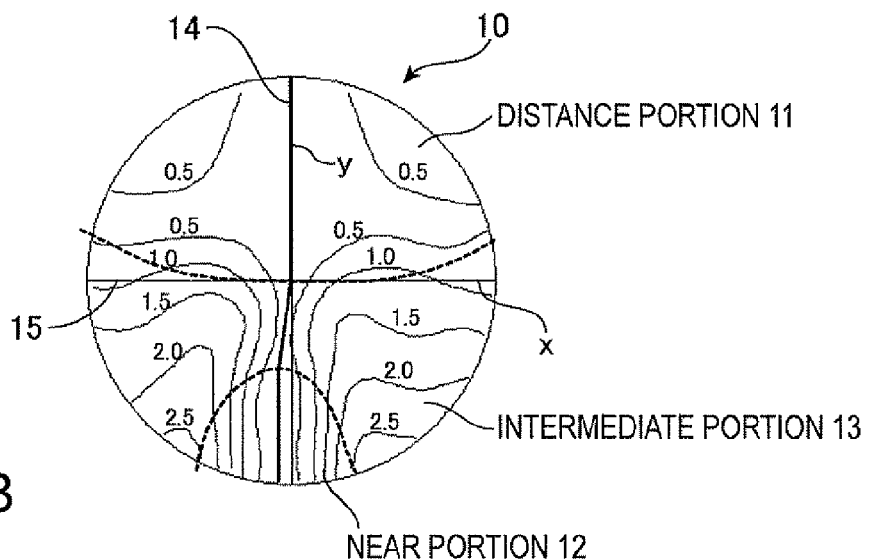
FIG. 3B shows an astigmatism distribution across the spectacle lens.
Figure 3C:
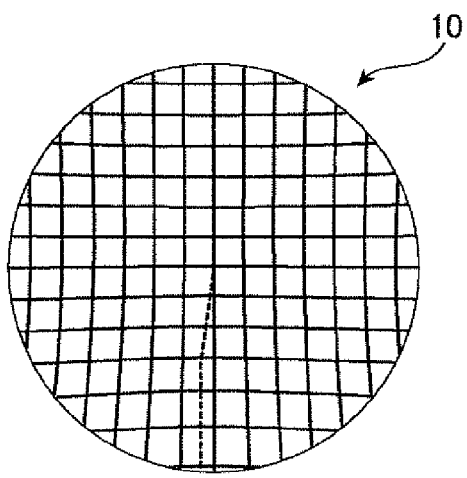
FIG. 3C shows distortion that a user senses when viewing a square grid through the spectacle lens.
Figure 30:
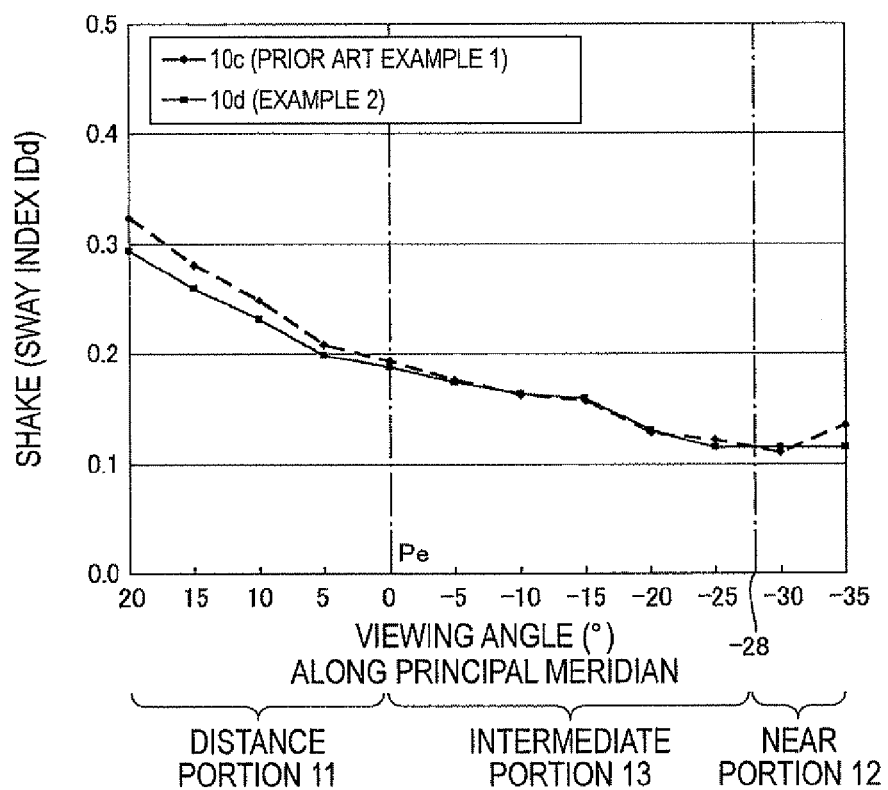
FIG. 30 shows shake (sway index IDd) in Example 2 and Prior art Example 1.

FIG. 3A shows an equivalent spherical power distribution (in dioptre (D)) across a typical progressive power lens 10. FIG. 3B shows an astigmatism distribution (in dioptre (D)). FIG. 30 shows distortion that the user senses when viewing a square grid through the lens 10. In the progressive power lens 10, predetermined power factors are added along the principal meridian 14. Adding power causes a large amount of astigmatism on both sides of the intermediate region (intermediate portion, progressive region) 13, resulting in a blurred image formed through either of the side regions. In the equivalent spherical power distribution, the power is greater in the near portion 12 by a predetermined amount than in the distance portion 11 and gradually decreases from the near portion 12 through the intermediate portion 13 to the distance portion 11. In the distance portion 11 of the progressive power lens 10, the power (distance power, Sph) is 0.00 D (dioptre), and the addition power (Add) is 2.00 D.

Due to the difference in power across the lens 10, the near portion 12, where the power is larger than the other portions, forms a more magnified image than the distance portion 11, and an image of the square grid formed through either of the portions on both sides of the intermediate portion 13 and the near portion 12 is distorted, which causes image sway when the user moves the head.

Figure 4:
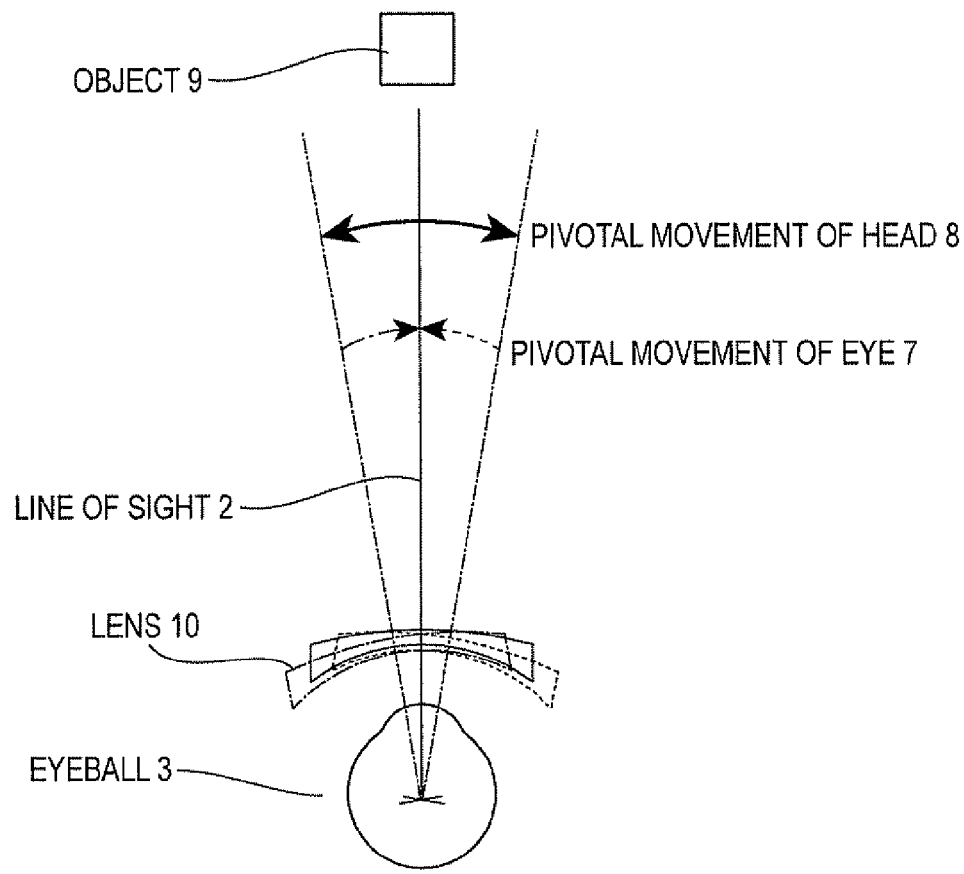
FIG. 4 shows vestibulo-ocular reflex.

FIG. 4 schematically shows vestibule-ocular reflex (VOR). When a person who is looking at an object (object 9 in FIG. 4) moves the head, the person's sight also moves. At this point, an image on the retina also moves. When an eyeball 3 moves (pivotal movement (rotation) 7 of eye) to cancel the movement of the head (pivotal movement (rotation) of face, pivotal movement of head) 8, the line of sight 2 is fixed (does not move), whereby the image on the retina does not move. Such reflex eyeball movement that fixes an image on the retina is called compensatory eye movement. Vestibulo-ocular reflex is one type of the compensatory eye movement, and pivotal movement of the head triggers the reflex action. A neural mechanism of the vestibulo-ocular reflex triggered by horizontal rotation (horizontal pivotal movement) of the head has been explained to some extent as follows: It is believed that the pivotal movement 8 of the head is sensed by the horizontal semicircular canal, an input from which inhibits or excites the external ocular muscle, which then moves the eyeball 3.

When the head makes a pivotal movement and vestibulo-ocular reflex produces a pivotal movement of the eyeball, an image on the retina does not move but the spectacle lens 10 makes a pivotal movement together with that of the head, as indicated by the broken line and the dashed line in FIG. 4. In this process, the vestibulo-ocular reflex causes the line of sight 2 passing through the spectacle lens 10 to move relative to the spectacle lens 10. The image on the retina therefore sways in some cases when imaging performance of the spectacle lens 10 varies across the range over which the vestibulo-ocular reflex causes the eyeball 3 to move, that is, the range over which the vestibulo-ocular reflex causes the line of sight 2 to move.

Figure 5:
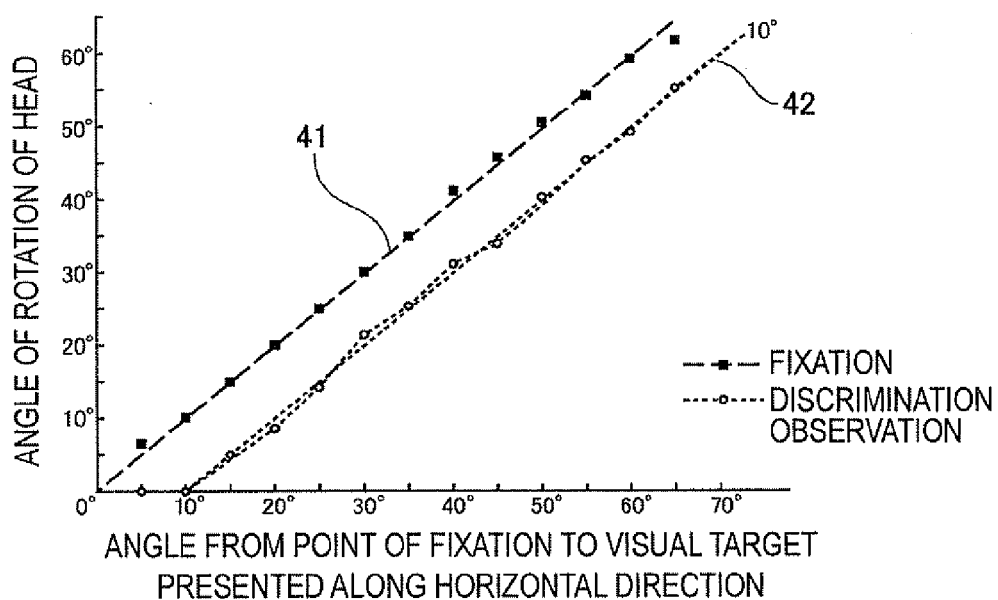
FIG. 5 shows a maximum angle in vestibulo-ocular reflex.

FIG. 5 shows an example of results of observation of movement of the head position (eye position) of a person who searches a visual target. The graphs shown in FIG. 5 show how much the head pivots to recognize the visual target (object) having moved horizontally by a certain angle from a point of fixation. In a state of fixation in which the visual target (object) is a center of attention, the head pivots as the object moves, as indicated by the graph 41. In contrast, in a state of discrimination observation in which the person simply recognizes the visual target (object) but not in a concentrated manner, the amount of movement of the head decreases by about 10 degrees with respect to the angle by which the object has moved as indicated by the graph 42. According to the observation result, the full range across which the object can be recognized only by moving the eyeball can be set at about 10 degrees. The horizontal pivotal angle of the head of a person who views an object under the influence of vestibulo-ocular reflex while naturally moving the head is therefore believed to be about 10 degrees at maximum rightward and leftward (maximum horizontal angle θxm by which eyeball 3 moves under the influence of vestibulo-ocular reflex).

On the other hand, the maximum vertical pivotal angle of the head of a person who is viewing an object under the influence of vestibule-ocular reflex is believed to be smaller than the maximum horizontal pivotal angle thereof because a progressive power lens, the power of which changes across the intermediate portion, cannot bring the object at a fixed distance into focus, resulting in a blurred image, when the head moves by a large amount. In view of the above discussion, the pivotal angle of the head, which is used as a parameter in a sway simulation, is preferably set at about 10 degrees rightward and leftward in the horizontal direction and at a smaller value in the vertical direction, for example, about 5 degrees upward and downward. Further, a typical range across which the line of sight moves under the influence of vestibulo-ocular reflex is about ±10 degrees on the right and left sides of the principal meridian 14.

Figure 6:
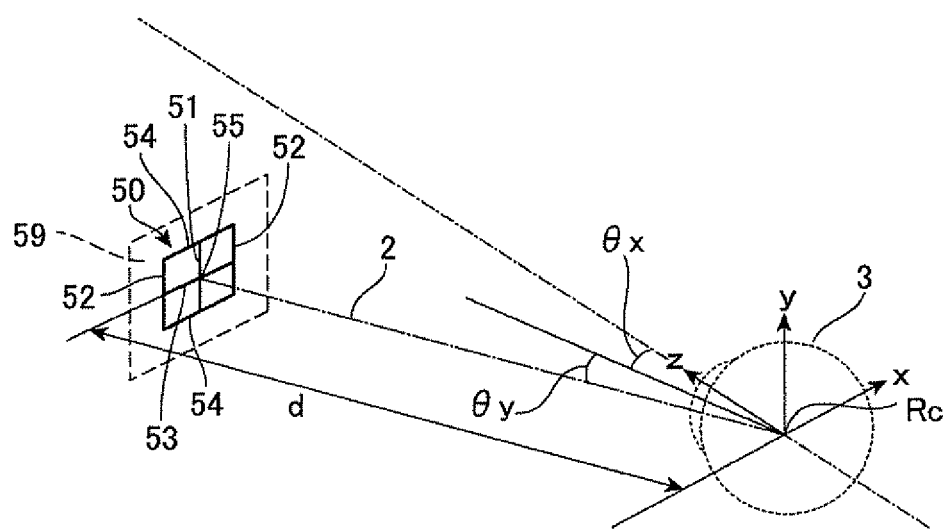
FIG. 6 shows how to set a rectangle pattern.

FIG. 6 shows a vision simulation made in consideration of vestibulo-ocular reflex under the condition that the head is allowed to pivot relative to an observation target, a rectangular pattern 50 in the this description, placed in a virtual plane 59 in a virtual space. Set a pivotal center Rc of the eyeball 3 as the origin in the virtual space, a z axis in the horizontally forward direction, an x axis in the horizontal direction, and a y axis in the vertical direction. The rectangular pattern 50, which is the observation target, is placed in the virtual plane 59 set apart by a distance d and inclined to the y-z plane by an angle θx and to the x-z plane by an angle θy.

In this description, the rectangular pattern 50 is a square grid having central horizontal and vertical lines that halves the square in both directions. Specifically, the rectangular pattern 50 has a central vertical grid line 51 passing through a geometric center 55, right and left vertical grid lines 52 symmetrical with respect to the central vertical grid line 51, a central horizontal grid line 53 passing through the geometric center, and upper and lower horizontal grid lines 54 symmetric with respect to the central horizontal grid line 53. The distance d between the virtual plane 59 and the eyeball 3 is so adjusted that the pitch of the square-grid rectangular pattern 50 is set on the spectacle lens 10 in the form of viewing angle, as will be described below.

In this description, the spectacle lens 10 is placed in front of the eyeball 3 in the same position and attitude as those in actual use of the spectacle lens 10, and the virtual plane 59 is so set that the right and left vertical grid lines 52 and the upper and lower horizontal grid lines 54 are recognized in the vicinity of the maximum horizontal angle Oxm, by which the eyeball 3 moves relative to the point of fixation under the influence of vestibulo-ocular reflex, that is, in an area within ±10 degrees from the point of fixation.

The size of the square-grid rectangular pattern 50 can be defined by the viewing angle and set in accordance with an object to be viewed. For example, the grid can have a small pitch across the field of view, for example, for the screen of a mobile personal computer, whereas the grid can have a large pitch across the field of view, for example, for the screen of a desktop personal computer.

On the other hand, an expected distance d to the observation target (virtual plane) 59 used with the progressive power lens 10 changes depending on which one of the distance portion, the intermediate portion, and the near portion is evaluated. In consideration of this fact, it is reasonable to set a long distance d, several meters or longer, for the distance portion, a short distance d, about 40 to 30 centimeters, for the near portion, and an intermediated distance d, about 1 meter to 50 centimeters, for the intermediate portion. It is, however, unnecessary to set the distance d in a very accurate manner in accordance with which one of the distance portion, the intermediate portion, and the near portion of the lens is evaluated because the user who is walking views an object apart from the user by a relatively long distance, such as 2 to 3 meters, through the intermediate portion or the near portion, and sway index calculation will not be greatly affected even when the distance d is not set in a very accurate manner.

The rectangular pattern 50, which is an observation target, is observed in a viewing angle direction shifted from the viewing angle direction (θx,θy) because the lens refracts light. An image of the rectangular pattern 50 observed by the user can be typically determined by using ray tracing. When the head is allowed to pivot horizontally by +α° from the state described above, the lens 10 on the face also pivots by +α°. At this point, since the eyeball 3 pivots under the influence of vestibulo-ocular reflex by α° in the opposite direction, that is, by −α°, the line of sight 2 points the geometric center 55 of the rectangular target pattern 50 through a position on the lens 10 shifted by −α°. Since the line of sight 2 passes through the lens 10 in a different position and impinges thereon at a different angle, the rectangular pattern 50, which is a target object, is observed differently.

In view of the fact described above, allow the head to pivot repeatedly rightward and leftward, superimpose images of the observation target (rectangular pattern) 50 obtained in the end positions of a maximum or predetermined pivotal angular range θx1 at the geometric center 55 of the observation target, and calculate the geometric discrepancy among the shapes of the images. The horizontal angle θx1 is, for example, the maximum horizontal angle θxm (about 10 degrees), across which the eyeball 3 moves under the influence of vestibulo-ocular reflex.

An indicator used in the sway evaluation in the present embodiment is a sway index IDd, which is used to calculate change in inclination of the horizontal grid lines 53 and 54 and the vertical grid lines 51 and 52.

Figure 7:
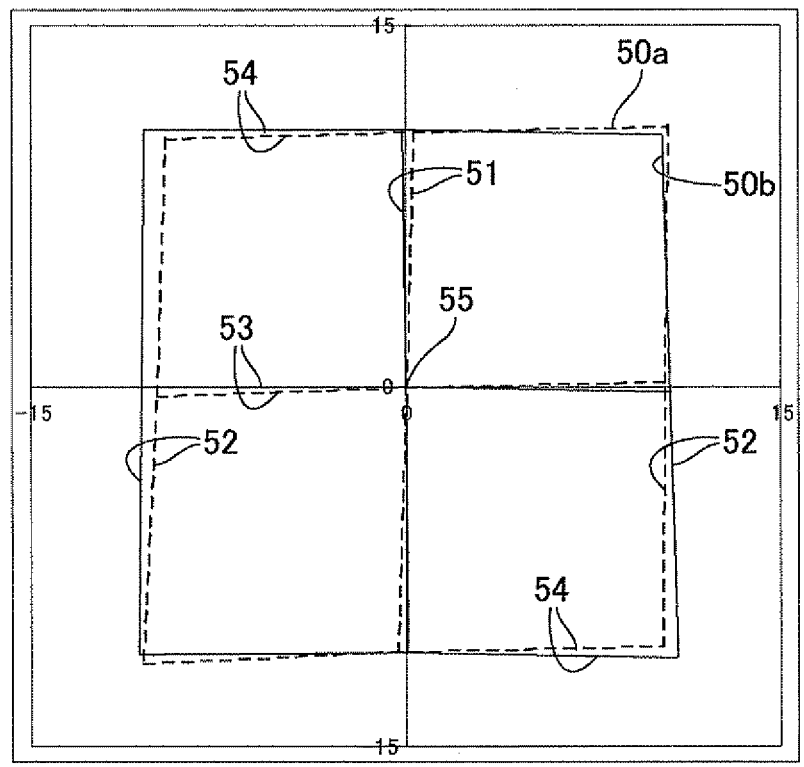
FIG. 7 shows that geometrically shifted rectangular patterns are superimposed.

FIG. 7 shows an example of images of the rectangular pattern 50 obtained when the eyeball 3 and the rectangular pattern 50 are moved rightward and leftward relative to the point of fixation by a first horizontal angle (turning angle) θOx1 (10 degrees). The state described above corresponds to a state in which the spectacle lens 10 is moved rightward and leftward along with the head by the horizontal angle (turning angle) of 10 degrees and the user observes the stationary rectangular pattern 50 with the line of sight 2 fixed to the geometric center 55 of the rectangular pattern 50. A rectangular pattern 50a (broken line) represents an image observed through the spectacle lens 10 at the turning angle of 10° in a ray tracing simulation (rightward pivot image), and a rectangular pattern 50b (solid line) is an image similarly observed through the spectacle lens 10 at the turning angle of −10° (leftward pivot image). The thus observed rectangular patterns 50a and 50b are so superimposed that the geometric centers 55 thereof coincide with each other. It is noted that an image of the rectangular pattern 50 observed at a turning angle of 0° is located in a substantially middle position between the rectangular patterns 50a and 50b.

The images (rectangular patterns) 50a and 50b are target object images actually observed by the user when the user turns the head while viewing the observation target through the spectacle lens 10, and the difference (deformation) between the images 50a and 50b can be taken as the shift of the images formed when the user turns the head.

Figure 8:
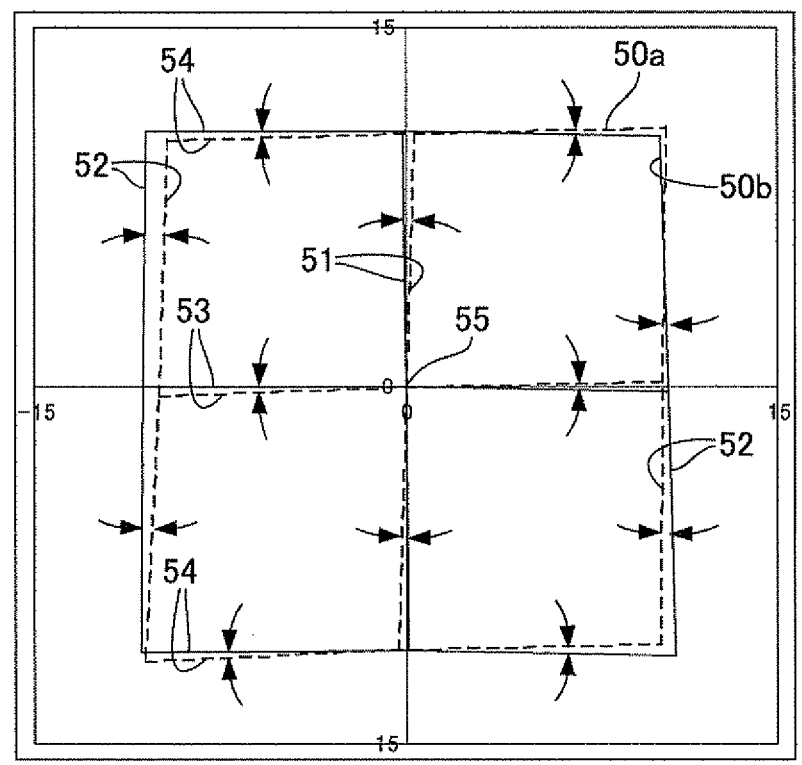
FIG. 8 shows change in inclination of grid lines of the rectangular pattern.

FIG. 8 shows sway indices (sway indicators) IDd. A sway index IDd represents change in inclination of any of the grid lines 51 to 54. Twelve sway indices IDd can be determined by calculating the amount of geometrical change in inclination of the sides (grid lines) 51 to 54 of the rectangular pattern 50, as shown in FIG. 8. The amount of change in inclination of each of the horizontal grid lines 53 and 54 is believed to represent "waviness (swell)", and the amount of change in inclination of each of the vertical grid lines 51 and 52 is believed to represent "jitter." The sway can therefore be quantitatively evaluated in the form of "waviness (swell)" and "jitter" by summing the amount of change in inclination of the grid lines 51 to 54 separately for each of the directions.

These sway indices IDd can be used in any of the following forms depending on applications: the horizontal component; the vertical component; and the sum thereof. In the following description, a sway index IDd derived from the change in inclination is described as "shake" in some cases. The sway index IDd, which represents "shake," is dimensionless because it is the amount of change in inclination of any of the grid lines in the viewing angle coordinate system.

In the following description, a sway index IDd representing shake indexes the sum or average of the shake of all the grid lines obtained by summing or averaging, among the vertical grid line 51, 52 and the horizontal gird line 53, 54, the shake of all the horizontal grid lines 53 and 54 including the central horizontal grid line 53 and the shake of all the vertical grid lines 51 and 52 including the central vertical grid line 51. The horizontal and vertical shake as a whole is more similar to a sensation experienced by a person (user) who actually feels sway in consideration of the fact that the user perceives not only change in only one horizontal or vertical line but also at the same time change in the outline of the object that is perceived as a shape. Further, since the user simultaneously perceives shake in the horizontal and vertical directions, the sum of shake in the two directions is the most reasonable index. It is believed that sensitivity to the "waviness (swell)" and the "jitter" can differ user to user, and that the "waviness (swell)" is problematic when the line of sight is moved horizontally in many cases in a certain individual life environment whereas the "jitter" is problematic in another environment. The sway components in the two directions may therefore be used separately to index and evaluate sway.

2. EMBODIMENTS

2.1 First Embodiment

An optical lens according to an embodiment of the invention will be described below in more detail with reference to a progressive power lens 10. The progressive power lens 10 includes an atoric surface element where horizontal surface power OHPf and vertical surface power OVPf of the distance portion 11 of the object-side surface 19A along the principal meridian 14 and horizontal surface power OHPn and vertical surface power OVPn of the near portion 12 of the object-side surface 19A along the principal meridian 14 satisfy the following expression (0).

$$OHPf \geq OVPf \qquad (0\text{-}1)$$

$$OHPn \geq OVPn \qquad (0\text{-}2)$$

Expression (0-1) and Expression (0-2) are collectively referred to as Expression (0). The equal signs in Expression (0) do not hold at the same time.

The progressive power lens 10 further includes any of the following elements: a first element that satisfies the following expression (1); a second element that satisfies the following expression (2); and a third element that satisfies the following expression (3).

$$OVPf > OVPn \qquad (1)$$

$$OVPf < OVPn \qquad (2)$$

$$OVPf = OVPn \qquad (3\text{-}1)$$

$$OHPf = OHPn \qquad (3\text{-}2)$$

Expression (3-1) and Expression (3-2) are collectively referred to as Expression (3).

The conditions expressed by Expressions (0) to (3) mean that a region along the principal meridian 14 of the object-side surface 19A includes a toric surface (troidal surface). That is, Expression (0) means that the object-side surface 19A includes a toric surface element including at least one of the following elements: a toric surface element in the distance portion 11; and a toric surface element in the near portion 12, and that the element forms a toric surface where the horizontal surface power is greater than the vertical surface power along the principal meridian 14.

The object-side surface 19A including the element expressed by Expression (1) is so configured that the vertical surface power OVPf of the distance portion 11 is greater than the vertical surface power OVPn of the near portion 12, which means that a progressive power lens 10 including a toric surface element is designed based on spectacle specifications in which the vertical surface power progressively decreases in the direction from the intermediate portion 13 toward the near portion 12 along the principal meridian 14 of the object-side surface 19A. The progressive power lens 10 designed based on the spectacle specifications including the condition expressed by Expression (1) is therefore so configured that the object-side surface 19A includes a reverse progressive (object-side reverse progressive) element. The horizontal surface power OHPf of the distance portion 11 and the horizontal surface power OHPn of the near portion 12 may be the same in magnitude, or a reverse progressive element may be provided as in the vertical direction.

The object-side surface 19A including the element expressed by Expression (2) is so configured that the vertical surface power OVPf of the distance portion 11 is smaller than the vertical surface power OVPn of the near portion 12, which means that a progressive power lens including a toric surface element is designed based on spectacle specifications in which the vertical surface power progressively increases in the direction from the intermediate portion 13 toward the near portion 12 along the principal meridian 14 of the object-side surface 19A. The progressive power lens 10 designed based on the spectacle specifications including the condition expressed by Expression (2) is therefore so configured that the object-side surface 19A includes a progressive (object-side progressive) surface element. The horizontal surface power OHPf of the distance portion 11 and the horizontal surface power OHPn of the near portion 12 may be the same in magnitude, and a progressive surface element may be provided as in the vertical direction.

The object-side surface 19A including the element expressed by Expression (3) is so configured that the vertical surface power OVPf of the distance portion 11 is equal to the vertical surface power OVPn of the near portion 12 and the horizontal surface power OHPf of the distance portion 11 is equal to the horizontal surface power OHPn of the near portion 12, which means that a progressive power lens is designed based on spectacle specifications in which the object-side surface 19A is a simple toric surface (troidal surface) along the principal meridian 14. The progressive power lens 10 designed based on the spectacle specifications including the condition expressed by Expression (3) is therefore so configured that a region of the object-side surface 19A that extends at least along the principal meridian 14 includes a simple toric surface element.

A person who uses the progressive power lens 10 tends to use the principal meridian 14 very frequently and feels image sway when the person uses a region in the vicinity of the principal meridian 14 for visual work. An advantageous effect, for example, of reducing image sway can therefore be provided in a satisfactory manner when the conditions for the object-side surface 19A expressed by Expressions (0) to (3) described above are satisfied at least in an area within about ±10 mm in the horizontal direction from the principal meridian 14.

Further, a progressive power lens 10 designed below is an eyeball-side progressive lens including a toric surface element that cancels a surface power shift produced by the toric surface of the object-side surface 19A. To this end, horizontal surface power IHPf and vertical surface power IVPf of the distance portion 11 of the eyeball-side surface 19B along the principal meridian 14 and horizontal surface power IHPn and vertical surface power IVPn of the near portion 12 of the eyeball-side surface 19B along the principal meridian 14 are so selected that the conditions expressed by the following expression (4) are satisfied.

$$IHPf \geq IVPf \quad (4\text{-}1)$$

$$IHPn \geq IVPn \quad (4\text{-}2)$$

$$IHPf > IHPn \quad (4\text{-}3)$$

Expressions (4-1), (4-2), and (4-3) are collectively referred to as Expression (4). The equal sings in Expression (4) do not hold at the same time.

2.1.1 Example 1 and Comparative Example 1

Basic spectacle specifications in Example 1 and Comparative Example 1 were designed based on a progressive power lens "Seiko P-1 Synergy AS" (refractive index: 1.67) manufactured by Seiko Epson Corp. to which the following spectacle specifications were applied: the length of the progressive corridor was 14 mm; the prescribed power (distance power, Sph) was −3.00 D; and the addition power (Add) was 2.00 D. Further, the diameters of progressive power lenses according to Example 1 and Comparative Example 1 were each 65 mm, and no astigmatism power was added. A progressive power lens 10a according to Example 1 and a progressive power lens 10b according to Comparative Example 1 are therefore myopia correcting spectacle lenses having distance portions 11 of negative average prescribed power. The progressive power lens 10a according to Example 1 includes an atoric surface element, and the progressive power lens 10b according to Comparative Example 1 has the same spectacle specifications as those in Example 1 but includes a toric surface element.

Figure 9A:
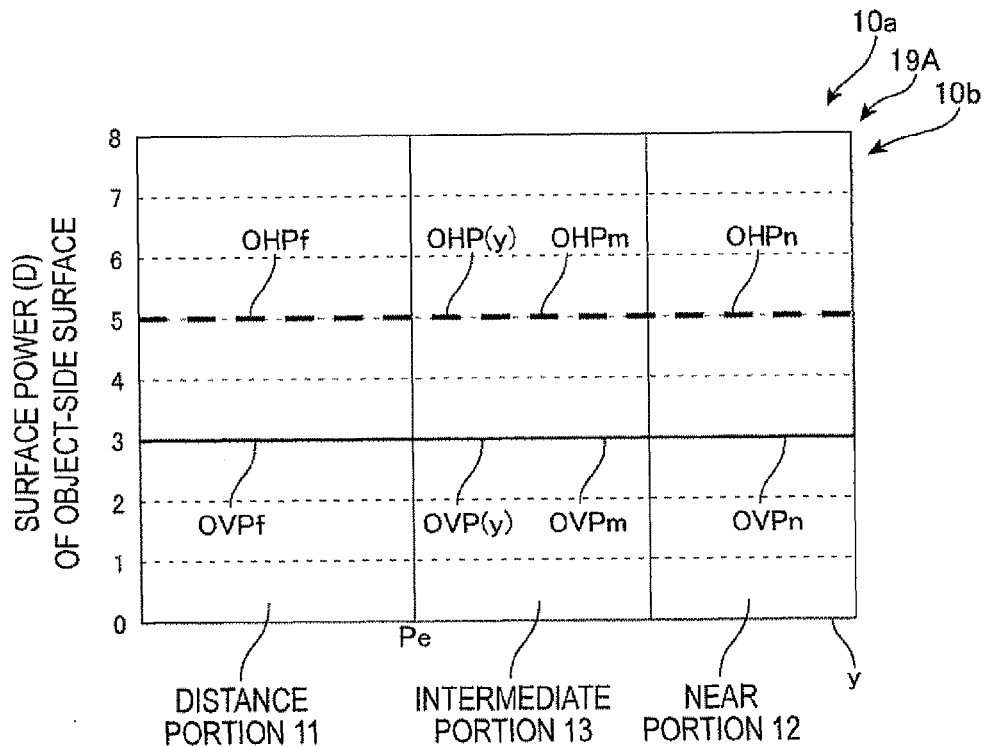
FIG. 9A shows surface power of the object-side surfaces of progressive power lenses according to Example 1 and Comparative Example 1 along a principal meridian.

FIG. 9A shows a broken line representing horizontal surface power OHP(y) and a solid line representing vertical surface power OVP(y) of the object-side surfaces 19A of the progressive power lens 10a according to Example 1 and the progressive power lens 10b according to Comparative Example 1 along the principal meridian 14. The horizontal surface power OHP(y) and the vertical surface power OVP(y) of the progressive power lens 10a according to Example 1 along the principal meridian 14 agree with the horizontal surface power OHP(y) and the vertical surface power OVP(y) of the progressive power lens 10b according to Comparative Example 1 along the principal meridian 14. The unit of the power shown in FIG. 9A is dioptre (D), and the same holds true for the following figures unless otherwise noted.

Figure 9B:
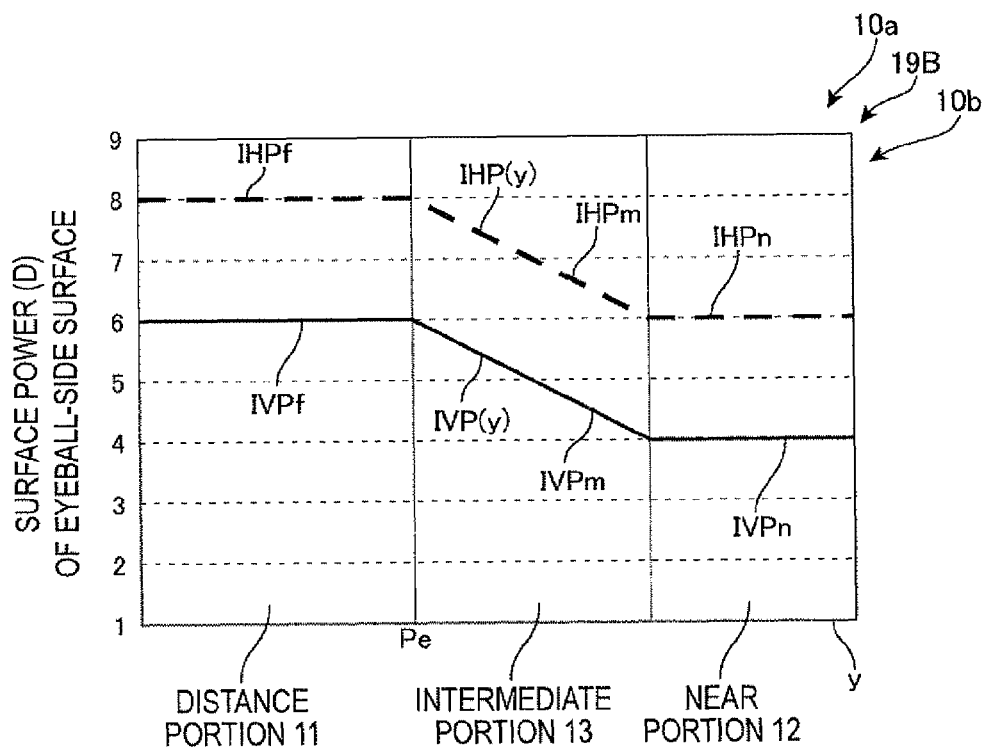
FIG. 9B shows surface power of the eyeball-side surfaces of the progressive power lenses according to Example 1 and Comparative Example 1 along the principal meridian.

FIG. 9B shows a broken line representing horizontal surface power IHP(y) and a solid line representing vertical surface power IVP(y) of the eyeball-side surfaces 19B of the progressive power lens 10a according to Example 1 and the progressive power lens 10b according to Comparative Example 1 along the principal meridian 14. The horizontal surface power IHP(y) and the vertical surface power IVP(y) of the progressive power lens 10a according to Example 1 along the principal meridian 14 agree with the horizontal surface power IHP(y) and the vertical surface power IVP(y) of the progressive power lens 10b according to Comparative Example 1 along the principal meridian 14.

The horizontal surface power THP(y) and the vertical surface power IVP(y) of the eyeball-side surface 19B inherently have negative values, but surface power of the eyeball-side surface 19B is expressed herein by using absolute values. The same holds true for the following sections. Further, the y coordinate extends along the principal meridian 14, and the origin of the y coordinate is the fitting point Pe. The x coordinate used in the following sections extends along the horizontal reference line 15, and the origin of the x coordinate is the fitting point Pe. The principal meridian 14, which converges from a vertical reference line y toward the nose, is expressed by using the y coordinate.

Figure 10A:
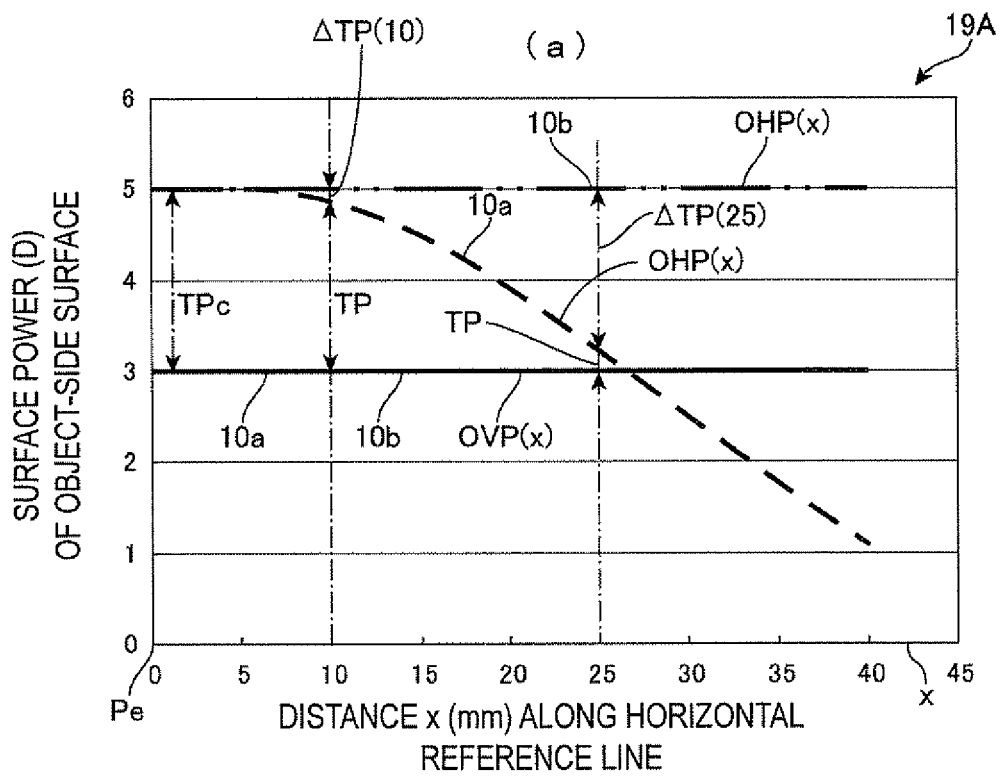
FIG. 10A shows surface power of the object-side surfaces of the progressive power lenses according to Example 1 and Comparative Example 1 along a horizontal reference line.

FIG. 10A shows a broken line representing horizontal surface power OHP(x) and a solid line representing vertical surface power OVP(x) of the object-side surface 19A of the progressive power lens 10a according to Example 1 along the horizontal reference line 15. FIG. 10A further shows a chain double-dashed line representing the horizontal surface power OHP(x) of the object-side surface 19A of the progressive power lens 10b according to Comparative Example 1 along the horizontal reference line 15. The vertical surface power OVP(x) of the object-side surface 19A of the progressive power lens 10b according to Comparative Example 1 along the horizontal reference line 15 agrees with the vertical surface power OVP(x) of the object-side surface 19A of the progressive power lens 10a according to Example 1 along the horizontal reference line 15. Further, the surface power along the horizontal reference line 15 is bilaterally symmetrical with respect to the fitting point Pe, and FIG. 10A shows change in the surface power on the right side of the fitting point Pe. The same holds true for the graphs and numerical values along the horizontal reference line 15 in the following figures.

Figure 10B:
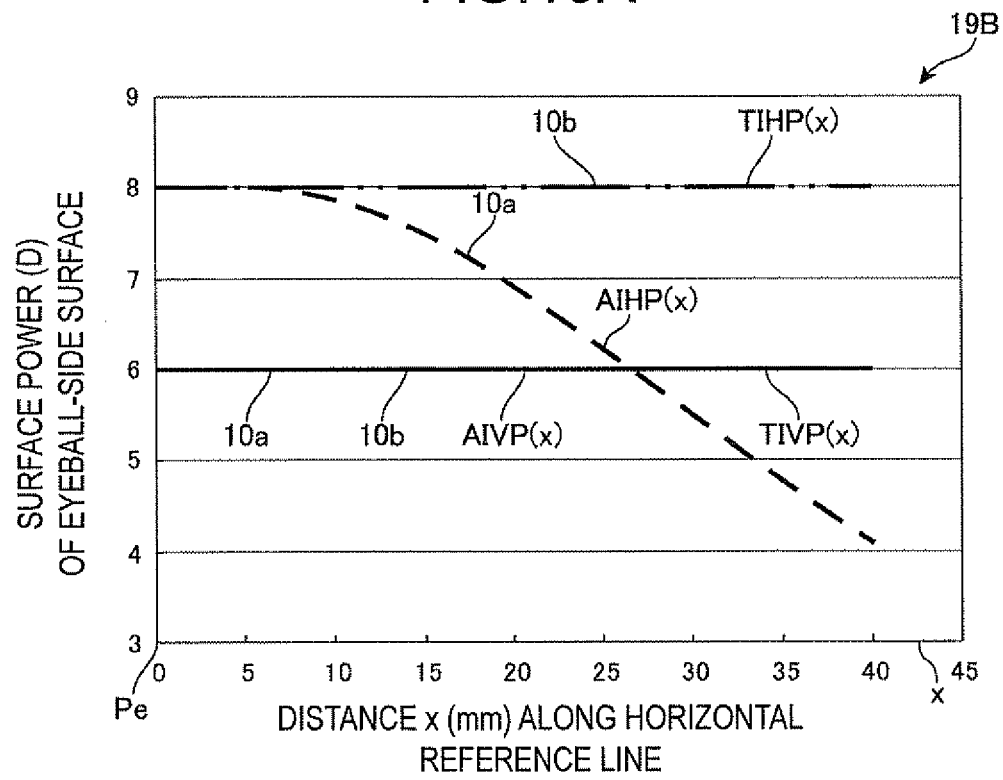
FIG. 10B shows surface power of an atoric surface element and a toric surface element of the eyeball-side surfaces of the progressive power lenses according to Example 1 and Comparative Example 1 along the horizontal reference line.

FIG. 10B shows a broken line representing horizontal surface power AIHP(x) and a solid line representing vertical surface power AIVP(x) of an atoric surface element of the eyeball-side surface 19B of the progressive power lens 10a according to Example 1 along the horizontal reference line 15. FIG. 10B further shows a chain double-dashed line representing horizontal surface power TIHP(x) of a toric surface element of the eyeball-side surface 19B of the progressive power lens 10b according to Comparative Example 1 along the horizontal reference line 15. Vertical surface power TIVP (x) of the toric surface element of the eyeball-side surface 19B of the progressive power lens 10b according to Comparative Example 1 along the horizontal reference line 15 agrees with the vertical surface power AIVP(x) of the atoric surface element of the eyeball-side surface 19B of the progressive power lens 10a according to Example 1 along the horizontal reference line 15.

The surface power AIHP(x), AIVP(x), TIHP(x), and TIVP (x) shown in FIG. 10B represent the surface power of the atonic surface element and the toric surface element but do not represent the surface power of the eyeball-side surfaces of the progressive power lenses 10a and 10b. The surface power of the eyeball-side surfaces of the progressive power lenses 10a and 10b is the sum of the surface power of the eyeball-side surfaces and the surface power of the progressive surface elements, which will be described in detail by using isolines. Further, the values shown in FIG. 10B are calculated on the assumption that the lenses are thin, as will be described later.

FIG. 11A shows numerical data of the object-side surface 19A of the progressive power lens 10a according to Example 1. FIG. 11B shows numerical data of the object-side surface 19A of the progressive power lens 10b according to Comparative Example 1.

The progressive power lens 10a according to Example 1 and the progressive power lens 10b according to Comparative Example 1 satisfy the conditions expressed by Expressions (0), (3), and (4) described above. The progressive power lenses 10a and 10b are therefore so configured that the horizontal surface power IHPf of the distance portion 11 and the horizontal surface power IHPn of the near portion 12 of the eyeball-side surface 19B along the principal meridian 14 or the vertical reference line y (principal meridian 14 in present example) satisfy the conditions described below in order to cancel a surface power shift produced by the atoric surface element and the toric surface element of the object-side surface 19A along the principal meridian 14 or the vertical reference line y (principal meridian 14 in present example). When the conditions are satisfied, the intermediate portion 13 of the eyeball-side surface 19B can also be provided with an atoric surface element or a toric surface element that cancel the surface power shift produced by the atoric surface element or the toric surface element of the object-side surface 19A.

$$OHPf-OVPf=IHPf-IVPf \quad (5)$$

$$OHPn-OVPn=IHPn-IVPn \quad (6)$$

It is, however, noted that these conditions and conditions described below do not include astigmatism correction prescription. That is, these conditions do not include astigmatism correction prescription in far vision correction prescription. The same holds true for the following sections. Further, the surface power IHPf and IHPn is expressed by using absolute values.

The conditional expressions (5) and (6) are valid on the assumption that the lenses are thin, and conditional expressions (5a) and (6a) derived in consideration of a shape factor that takes into account of the lens thickness and is typically used in spectacle lens power calculation are as follows.

$$IHPf-IVPf=OHPf/(1-t/n\times OHPf)-OVPf/(1-t/n\times OVPf) \quad (5a)$$

$$IHPn-IVPn=OHPn/(1-t/n\times OHPn)-OVPn/(1-t/n\times OVPn) \quad (6a)$$

In Expressions (5a) and (6a), t represents the lens thickness (in meter), and n represents the refractive index of the lens material.

The expressions derived in consideration of lens thickness allow the eyeball-side surface to cancel a toric surface element added to the object-side surface in a precise manner, whereas simpler Expressions (5) and (6) can also substantially achieve the intended purposes.

In the progressive power lenses 10a and 10b, when the line of sight 2 is perpendicular to the object-side surface 19A and the eyeball-side surface 19B of the lenses 10a and 10b, horizontal transmission power HP and vertical transmission power VP along the principal meridian 14 are approximately given by the following expressions.

$$HP(y)=OHP(y)-IHP(y) \quad (7)$$

$$VP(y)=OVP(y)-IVP(y) \quad (8)$$

Expressions (7) and (8) are valid on the assumption that the lenses are thin and can be replaced with expressions derived in consideration of a shape factor that takes into account of the lens thickness and is typically used in spectacle lens power calculation. In this case, the following expressions (7a) and (8a) are used.

$$HP(y)=OHP(y)/(1-t/n\times OHP(y))-IHP(y) \quad (7a)$$

$$VP(y)=OVP(y)/(1-t/n\times OVP(y))-IVP(y) \quad (8a)$$

In Expressions (7a) and (8a), t represents the lens thickness (in meter), and n represents the refractive index of the lens material. Further, to achieve more accurate design, the y coordinates in Expressions (7), (7a), (8), and (8a) can alternatively be obtained by using ray tracing to determine difference in on-lens position through which the line of sight passes in the periphery of the lens between the object-side surface and the eyeball-side surface.

In the region other than the principal meridian 14, it is necessary to consider a prism effect because the line of sight 2 incident on the object-side surface 19A and the eyeball-side surface 19B of the lens 10 is inclined to the vertical direction. It is, however, noted that Expressions (7) and (8) described above hold in an approximate manner.

In the progressive power lens 10*a* according to Example 1 and the progressive power lens 10*b* according to Comparative Example 1, the object-side surface 19A along the principal meridian 14 is a simple toric surface (troidal surface), and the difference TPc between the horizontal surface power OHP and the vertical surface power OVP at the fitting point Pe is 2D. That is, each of the horizontal surface power OHPf of the distance portion 11, the horizontal surface power OHPm of the intermediate portion 13, and the horizontal surface power OHPn of the near portion 12 is a fixed value, 5.0 D, and each of the vertical surface power OVPf of the distance portion 11, the vertical surface power OVPm of the intermediate portion 13, and the vertical surface power OVPn of the near portion 12 is a fixed value, 3.0 D, on the object-side surface 19A along the principal meridian 14. On the eyeball-side surface 19B along the principal meridian 14, the horizontal surface power IHPf of the distance portion 11 is a fixed value, 8.0 D, the horizontal surface power IHPm of the intermediate portion 13 progressively decreases to 6.0 D in the near portion 12, and the horizontal surface power IHPn of the near portion 12 is a fixed value, 6.0 D. On the other hand, the vertical surface power IVPf of the distance portion 11 is a fixed value, 6.0 D, the vertical surface power IVPm of the intermediate portion 13 progressively decreases to 4.0 D in the near portion 12, and the vertical surface power IVPn of the near portion 12 is a fixed value, 4.0 D.

On the other hand, along the horizontal reference line 15, the object-side surface 19A of the progressive power lens 10*b* according to Comparative Example 1 is a simple toric surface where the difference TP between the horizontal surface power OHP and the vertical surface power OVP is 2.0 D, whereas the object-side surface 19A of the progressive power lens 10*a* according to Example 1 is an atoric surface where the horizontal surface power OHP gradually decreases in the direction toward the periphery and hence the difference TP between the horizontal surface power OHP and the vertical surface power OVP decreases or the sign of the difference TP changes, as shown in FIG. 10A. Therefore, the eyeball-side surface 19B of the progressive power lens 10*b* according to Comparative Example 1 includes an element that cancels a surface power shift produced by the simple toric surface, whereas the eyeball-side surface 19B of the progressive power lens 10*a* according to Example 1 includes an atoric surface element that cancels a surface power shift produced by the atoric surface of the object-side surface 19A, as shown in FIG. 10B.

2.1.2 Prior Art Example 1

A progressive power lens 10*c* having a spherical object-side surface 19A was designed as Prior art Example 1 based on the same spectacle specifications as those described above and compared with the progressive power lens 10*a* according to Example 1 and the progressive power lens 10*b* according to Comparative Example 1.

Figure 12A:
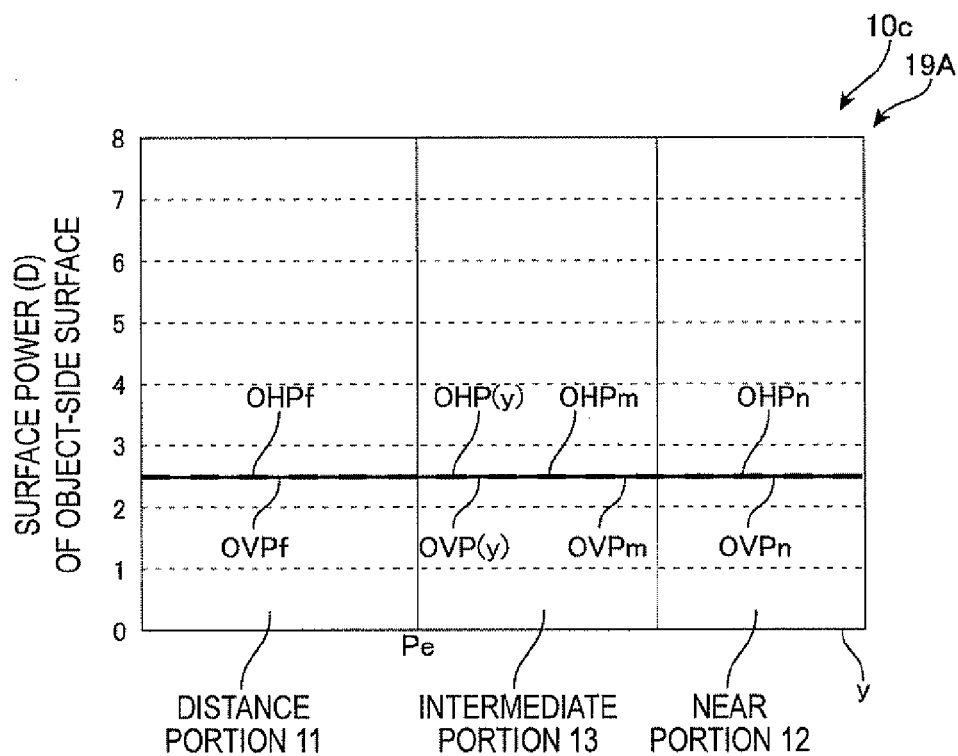
FIG. 12A shows surface power of the object-side surface of a progressive power lens according to Prior art Example 1 along the principal meridian.
Figure 12B:
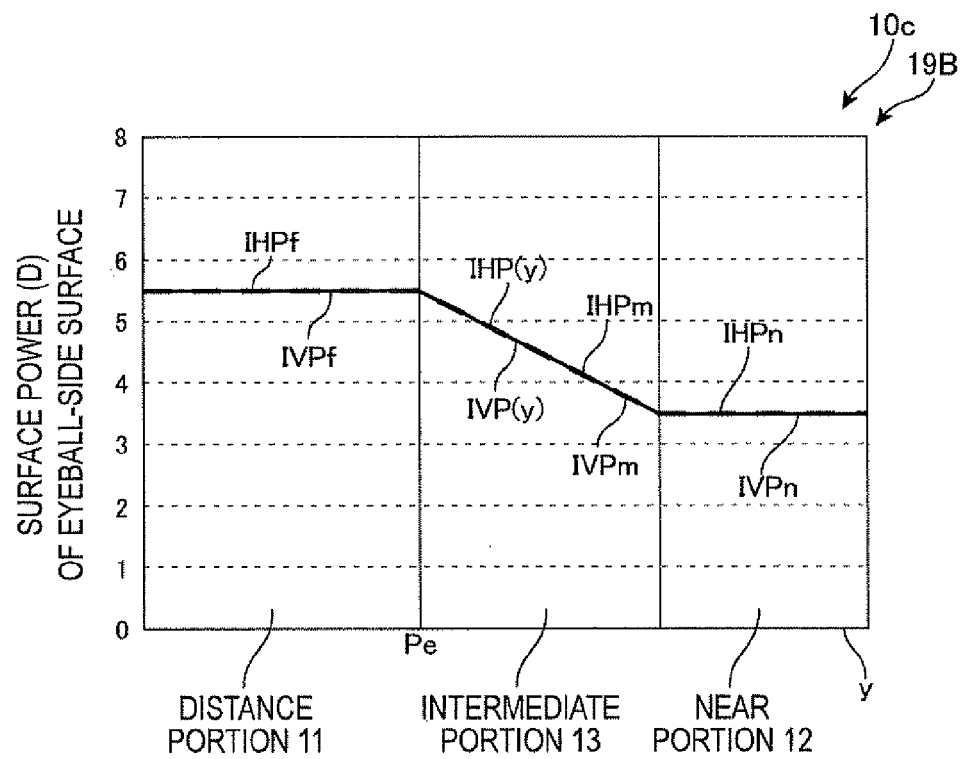
FIG. 12B shows surface power of the eyeball-side surface of the progressive power lens according to Prior art Example 1 along the principal meridian.

FIG. 12A shows horizontal surface power the OHP(y) and the vertical surface power OVP(y) of the object-side surface 19A of the progressive power lens 10*c* according to Prior art Example 1 expressed in dioptre (D) along the principal meridian 14. FIG. 12B shows the horizontal surface power IHP(y) and the vertical surface power IVP(y) of the eyeball-side surface 19B of the progressive power lens 10*c* expressed in dioptre (D) along the principal meridian 14. FIG. 11C shows numerical data of the object-side surface 19A of the progressive power lens 10*c* according to Prior art Example 1.

Since the progressive power lens 10*c* according to Prior art Example 1 has a spherical object-side surface 19A, each of the horizontal surface power OHPf of the distance portion 11, the horizontal surface power OHPm of the intermediate portion 13, the horizontal surface power OHPn of the near portion 12, the vertical surface power OVPf of the distance portion 11, the vertical surface power OVPm of the intermediate portion 13, and the vertical surface power OVPn of the near portion 12 is a fixed value, 2.5 D. On the other hand, the horizontal surface power IHP and the vertical surface power IVP of the eyeball-side surface 19B along the principal meridian 14 agree with each other. Each of the horizontal surface power IHPf and the vertical surface power IVPf of the distance portion 11 is a fixed value, 5.5 D. The horizontal surface power IHPm and the vertical surface power IVPm of the intermediate portion 13 progressively decrease to 3.5 D in the near portion 12. Each of the horizontal surface power IHPn and the vertical surface power IVPn of the near portion 12 is a fixed value, 3.5 D.

The change in the surface power shown in FIGS. 9A and 9B, FIGS. 10A and 10B, and FIGS. 12A and 12B are shown in simplified forms only for understanding of basic behaviors. In actual design, since aspheric surface correction intended to correct aberrations produced in the periphery of the lens is added to the behaviors described above, the power in the horizontal and vertical directions in an upper portion of the distance portion and the near portion varies to some extent.

2.1.3 Evaluation

FIG. 13A shows a surface astigmatism distribution across the object-side surface 19A of the progressive power lens 10*a* according to Example 1, and FIG. 13B shows a surface astigmatism distribution across the object-side surface 19A of the progressive power lens 10*c* according to Prior art Example 1. FIG. 14A shows an equivalent spherical surface power distribution across the object-side surface 19A of the progressive power lens 10*a* according to Example 1, and FIG. 14B shows an equivalent spherical surface power distribution across the object-side surface 19A of the progressive power lens 10*c* according to Prior art Example 1. Equivalent spherical surface power ESP is given by the following expression (9).

$$ESP=(OHP+OVP)/2 \tag{9}$$

The horizontal and vertical straight lines in each of FIGS. 13A and 13B and FIGS. 14A and 14B represent reference lines passing through the geometric center of the circular lens (vertical reference line y and horizontal reference line 15), and each of the figures also shows an imaginary shape of the spectacle lens inserted into a spectacle frame with the fitting point Pe coinciding with the geometric center, which is the intersection of the reference lines. The same holds true for the following figures. FIG. 13A also shows lines L(10) set apart from the vertical reference line y by horizontal distances of ±10 mm and lines L(25) set apart from the vertical reference line y by horizontal distances of ±25 mm.

FIG. 15A shows a surface astigmatism distribution across the eyeball-side surface 19B of the progressive power lens 10*a* according to Example 1, and FIG. 15B shows a surface astigmatism distribution across the eyeball-side surface 19B of the progressive power lens 10*c* according to Prior art Example 1. FIG. 16A shows an equivalent spherical surface power distribution across the eyeball-side surface 19B of the progressive power lens 10a according to Example 1, and FIG. 16B shows an equivalent spherical surface power distribution across the eyeball-side surface 19B of the progressive power lens 10c according to Prior art Example 1.

The surface astigmatism of the progressive power lens 10a according to Example 1 shown in FIGS. 13A and 15A is the sum of the surface astigmatism of the progressive power lens 10c according to Prior art Example 1 shown in FIGS. 13B and 15B and the surface astigmatism produced by the atoric surface element, which changes in such a way that the difference TP decreases in the direction from the principal meridian 14 outward along the horizontal reference line 15 and the sign of the difference TP changes. It is also shown that the summation is not simple because aspheric surface correction is added to adjust the amount of aberration.

Similarly, the equivalent spherical surface power distribution across the progressive power lens 10a according to Example 1 shown in FIGS. 14A and 16A is the sum of the equivalent spherical surface power distribution across the progressive power lens 10c according to Prior art Example 1 shown in FIGS. 14B and 16B and the equivalent spherical surface power distribution produced by the atoric surface element, in which the equivalent spherical surface power decreases in such a way that the horizontal surface power OHP decreases in the direction from the principal meridian 14 outward along the horizontal reference line 15. It is also shown that the summation is not simple as well because aspheric surface correction is performed.

Figure 17A:
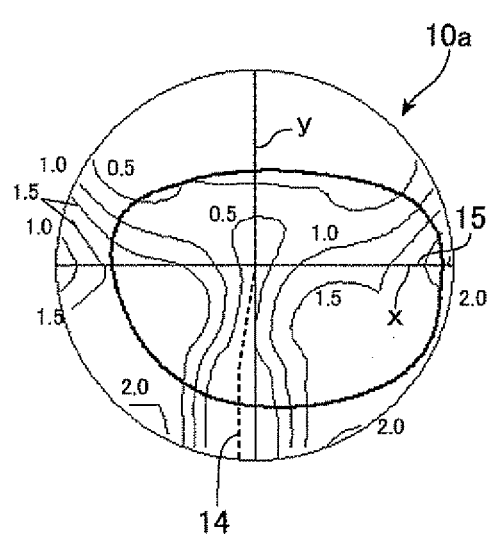
FIG. 17A shows an astigmatism distribution across the progressive power lens according to Example 1.
Figure 17B:
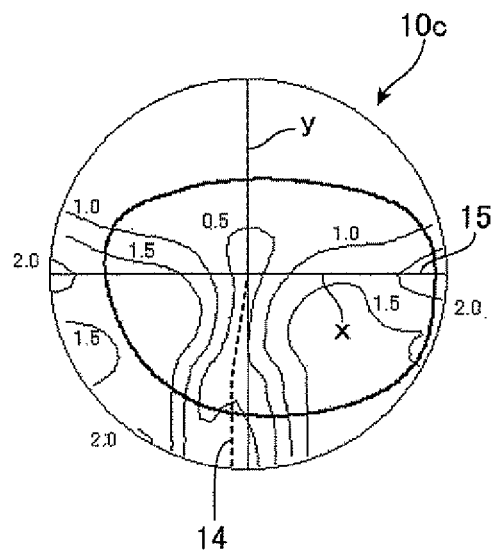
FIG. 17B shows an astigmatism distribution across the progressive power lens according to Prior art Example 1.
Figure 18A:
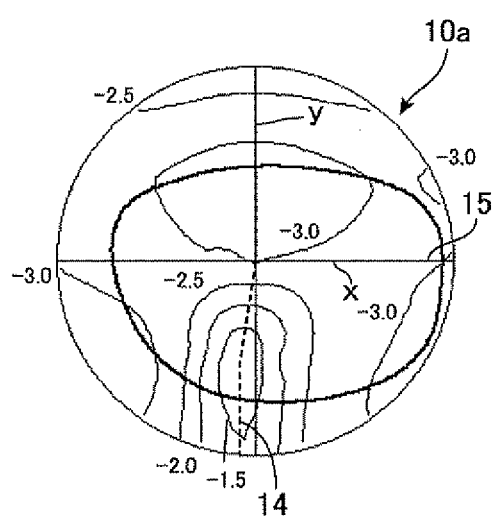
FIG. 18A shows an equivalent spherical power distribution across the progressive power lens according to Example 1.
Figure 18B:
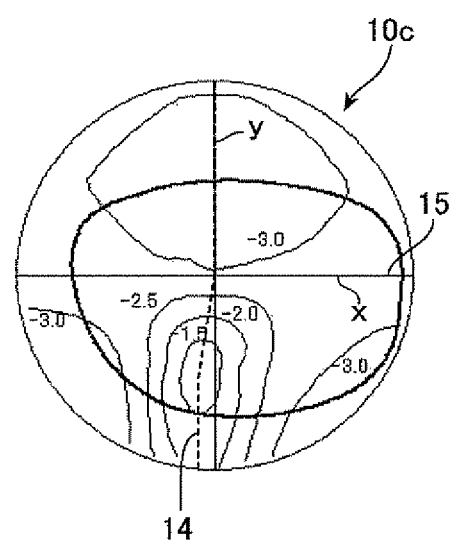
FIG. 18B shows an equivalent spherical power distribution across the progressive power lens according to Prior art Example 1.

FIG. 17A shows an astigmatism distribution obtained by viewing an object through each on-lens position of the progressive power lens 10a according to Example 1, and FIG. 17B shows an astigmatism distribution obtained by viewing the object through each on-lens position of the progressive power lens 10c according to Prior art Example 1. FIG. 18A shows an equivalent spherical power distribution obtained by viewing an object through each on-lens position of the progressive power lens 10a according to Example 1, and FIG. 18B shows an equivalent spherical power distribution obtained by viewing the object through each on-lens position of the progressive power lens 10c according to Prior art Example 1.

The astigmatism distribution across the progressive power lens 10a according to Example 1 shown in FIG. 17A is substantially the same as the astigmatism distribution across the progressive power lens 10c according to Prior art Example 1 shown in FIG. 17B. Further, the equivalent spherical power distribution across the progressive power lens 10a according to Example 1 shown in FIG. 18A is substantially the same as the equivalent spherical power distribution across the progressive power lens 10c according to Prior art Example 1 shown in FIG. 18B. It is therefore shown that effectively using aspheric surface correction with the progressive power lens 10a according to Example 1 provides a progressive power lens that shows substantially the same astigmatism distribution and equivalent spherical power distribution as those across the progressive power lens 10c according to Prior art Example 1.

Further, the progressive power lens 10a according to Example 1 in an area within ±10 mm along the horizontal reference line 15 from the fitting point Pe is a substantially toric surface as shown in FIG. 10A, as in the progressive power lens 10b according to Comparative Example 1, and the toric surface element of the eyeball-side surface 19B cancels the toric surface element of the object-side surface 19A. The toric surface elements of the object-side and eyeball-side surfaces are therefore not intended to correct astigmatism but are more effective in suppressing image sway produced through the lens 10a when the eye (line of sight) moves.

Further, the object-side surface 19A of the progressive power lens 10a according to Example 1 in an area within ±10 mm along the horizontal reference line 15 from the principal meridian 14, that is, the object-side surface 19A inside the lines L(10), is a substantially toric surface, and the toric surface element of the eyeball-side surface 19B cancels the toric surface element of the object-side surface 19A, as shown in FIG. 13A. As a result, a substantially toric surface is formed along the principal meridian 14, along which the line of sight 2 moves, whereby image sway produced through the optical lens 10a when the eye moves can be suppressed.

Figure 19:
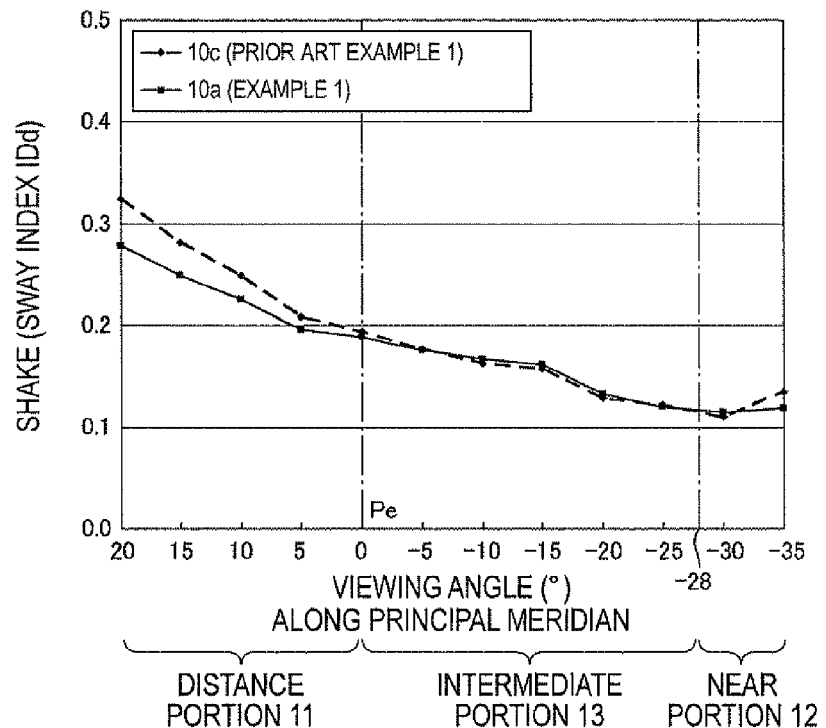
FIG. 19 shows shake (sway index IDd) in Example 1 and Prior art Example 1.

FIG. 19 shows the index IDd representing shake determined by using the sway evaluation method described above. It is assumed that the viewing angle pitch of the rectangular pattern 50, which is an observation target, is 10 degrees, and that the head is allowed to pivot rightward and leftward by 10 degrees on each side. The same holds true for the following sway evaluation. "Total L" representing the sum or average of shake of all the grid lines is determined as the index IDd representing shake at several points along the principal meridians 14 of the progressive power lens 10a according Example 1 and the progressive power lens 10c according to Prior art Example 1. The fitting point Pe of each of the lenses 10a and 10c is located in a primary position, that is, a position through which an object in the horizontal plane in front of the wearer is viewed at a viewing angle of 0°. The distance portion 11 occupies the area extending from the fitting point Pe upward to an angular position of 20 degrees, the intermediate portion 13 occupies the area extending from the fitting point Pe downward to an angular position of about −28 degrees, and the near portion 12 occupies the area below the intermediate portion 13.

The index IDd representing shake produced by the progressive power lens 10a according to Example 1 is smaller than the index IDd representing shake produced by the progressive power lens 10c according to Prior art Example 1, as shown in FIG. 19. FIG. 19 shows that sway decreases substantially throughout the principal meridian 14 from the distance portion through the intermediate portion to the near portion. In particular, the sway is greatly reduced in the distance portion 11.

Sway can be reduced by providing a toric surface element along the principal meridian 14. To this end, the difference TPc between the horizontal surface power OHP and the vertical surface power OVP at the fitting point Pe desirably satisfies the following condition (10).

$$0.5\ D \leq TPc \leq 3.5\ D \tag{10}$$

When the difference TPc is smaller than the lower limit, sway is not reduced very much, whereas when the difference TPc is greater than the upper limit, the horizontal lens curve becomes too steep. In the latter case, the edge thickness difference of the lens probably becomes too large, resulting in a difficulty in inserting the lens into a frame.

The lower limit of the difference TPc is preferably 1.0 D or greater, more preferably 1.5 D or greater. The upper limit of the difference TPc is preferably 3.0 D or smaller, more preferably 2.5 D or smaller. The progressive power lens 10a according to Example 1 has a difference TPc of 2.0 D, which satisfies the condition described above.

Further, the object-side surface 19A in an area within ±10 mm from the fitting point Pe or the principal meridian 14 (or vertical reference line y) may be a simple toric surface or an atoric surface where the horizontal surface power OHP decreases, but the amount of decrease ΔTP in the difference TP between the horizontal surface power OHP and the vertical surface power OVP desirably satisfies the following condition (11).

$$\Delta TP(10) \leq 0.3 \text{ D} \tag{11}$$

In Expression (11), ΔTP(10) represents the amount of decrease ΔTP in the difference TP in the position apart from the fitting point Pe by 10 mm along the horizontal reference line 15. When the amount of decrease ΔTP is greater than the upper limit, the effect of the atoric surface element in the vicinity of the principal meridian 14 can disadvantageously be too strong to reduce sway. One reason why the amount of sway is reduced is that providing each of the object-side and eyeball-side surfaces with a toric surface element along the principal meridian 14 is believed to prevent the line of sight 2 that moves under the influence of vestibulo-ocular reflex from being incident on and exiting out of the spectacle lens 10*a* at different angles and hence the amounts of a variety of aberrations from changing when the line of sight 2 moves under the influence of vestibulo-ocular reflex. When the effect of the atoric surface element is too strong, the line of sight 2 can disadvantageously be incident on and exit out of the spectacle lens 10*a* at greatly different angles. The progressive power lens 10*a* according to Example 1 has a ΔTP(10) of 0.14 D as shown in FIG. 11A, which satisfies the condition (11).

Further, the portion of the progressive power lens 10*a* according to Example 1 beyond ±10 mm from the fitting point Pe and the principal meridian 14 along the horizontal reference line 15 is an aspheric surface (atoric surface) where the vertical surface power OVP of the object-side surface 19A does not change but the horizontal surface power OHP of the object-side surface 19A monotonously decreases, as shown in FIG. 10A. The progressive power lens 10*a* according to Example 1 is superior to the progressive power lens 10*b* according to Comparative Example 1, which has a simple toric object-side surface 19A, in that the horizontal lens curve can be shallow.

Figure 20:
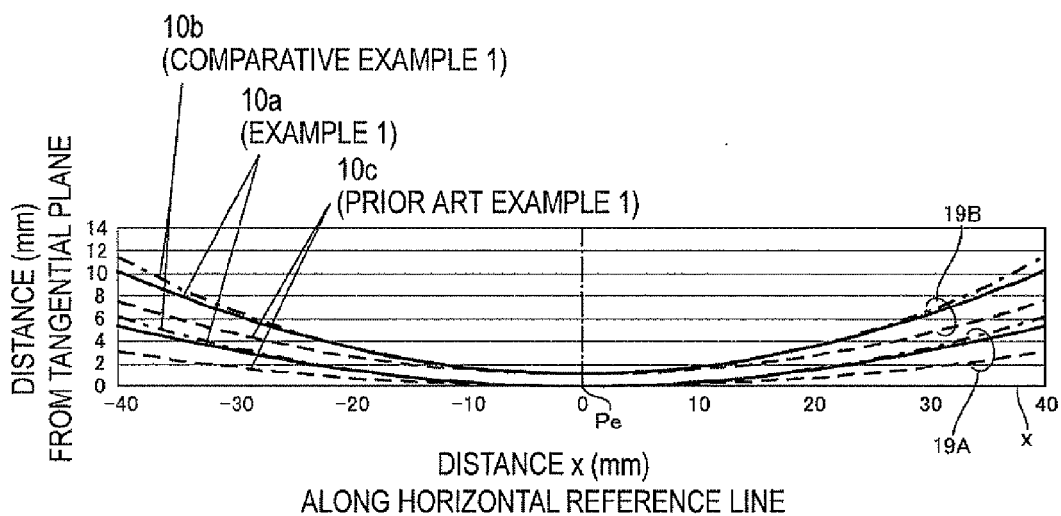
FIG. 20 shows the curves of the object-side surfaces and the curves of the eyeball-side surfaces of the progressive power lenses according to Example 1, Comparative Example 1, and Prior art Example 1.

FIG. 20 shows the curves of the object-side surfaces 19A and the curves of the eyeball-side surfaces 19B of the progressive power lens 10*a* according to Example 1, the progressive power lens 10*b* according to Comparative Example 1, and the progressive power lens 10*c* according to Prior art Example 1. Each of the curves includes the fitting point Pe and extends along the horizontal reference line 15. The curve of each of the object-side surfaces 19A is expressed by the distance from a tangential plane including the fitting point Pe (object-side sag), which is the vertex and the geometric center of the object-side surface 19A. The object-side surface 19A of each of the lenses is expressed by a downwardly convex curve drawn to be in contact with the origin, which coincides with fitting point Pe, and the eyeball-side surface 195 of each of the lenses is expressed by a downwardly convex curve so drawn that the vertex thereof, which is the fitting point Pe, is located in a position apart from the origin by a predetermined value (thickness).

The progressive power lens 10*b* according to Comparative Example 1, which includes a simple toric surface element, has a deeper horizontal curve and hence tends to have a larger thickness at the periphery of the lens (edge thickness difference) than the progressive power lens 10*c* according to Prior art Example 1. In contrast, the progressive power lens 10*a* according to Example 1 does not have very deep horizontal curve or a very large thickness at the periphery of the lens (edge thickness difference).

To achieve the advantageous effect of an atoric surface, the amount of decrease ΔTP in the difference TP between the horizontal surface power OHP and the vertical surface power OVP in an area within ±25 mm from the fitting point Pe or the principal meridian 14 (or vertical reference line y) (but beyond 10 mm therefrom) desirably satisfies the following condition (12). It is noted that a circle of a radius of 25 mm around the fitting point Pe is a lens area corresponding to an angular viewing area of about 45 degrees where a human eye characteristically has excellent vision.

$$0.3 TPc \leq \Delta TP(25) \leq 1.5 TPc \tag{12}$$

In Expression (12), ΔTP(25) represents the amount of decrease ΔTP in the difference TP at a distance of 25 mm from the fitting point Pe along the horizontal reference line 15. When ΔTP(25) is smaller than the lower limit, the advantageous effect of decrease in edge thickness difference is difficult to achieve and the horizontal lens curve becomes deeper, resulting in a difficulty in inserting the lens into a frame. On the other hand, when ΔTP(25) is greater than the upper limit, the horizontal surface power OHP remains nearly flat, probably resulting in an increase in the amount of aberration at the periphery of the field of view. The progressive power lens 10*a* according to Example 1 has a ΔTP (25) of 0.88TPc (1.76/2.00), which satisfies the condition (12) described above.

Referring to the numerical data of the progressive power lens 10*a* according to Example 1 shown in FIG. 11A, the horizontal surface power OHP of the object-side surface 19A of the progressive power lens 10*a* according to Example 1 decreases by 0.14 D at a horizontal distance x of 10 mm from the principal meridian 14 (or vertical reference line y). In other words, the amount of decrease ΔTP in the difference TP is 0.14 D, which means that the difference TP is maintained at about 2.0 D. The atoric surface element of the object-side surface 19A of the progressive power lens 10*a* in an area within a horizontal distance x of 10 mm therefore changes mildly in shape or is a substantially toric surface.

The horizontal surface power OHP of the object-side surface 19A abruptly decreases beyond a horizontal distance x of about 10 mm, and the amount of decrease is 1.76 D at a horizontal distance x of 25 mm from the fitting point Pe. The amount of decrease ΔTP in the difference TP is therefore 1.76 D, which is about 0.9 times the difference TPc (toric level) at the principal meridian 14, which is 2.0 D. The horizontal surface power OHP of the object-side surface 19A continues to decrease monotonously, and the amount of decrease at the outer edge of the lens is 3.92 D, which is about twice the toric level TPc at the principal meridian 14. In contrast, in the progressive power lens 10*b* according to Comparative Example 1 shown in FIG. 11B and the progressive power lens 10*c* according to Prior art Example 1 shown in FIG. 11C, the horizontal surface power OHP remains fixed from the principal meridian 14 to the outer edge.

The horizontal surface power OHP of the progressive power lens 10*c* according to Example of relate art 1 at the principal meridian 14 is 2.5 D, whereas the horizontal surface power OHP of the progressive power lens 10*a* according to Example 1 and the progressive power lens 10*b* according to Comparative Example 1 at the principal meridian 14 is 5.0 D, which greatly differs from 2.5 D. As a result, the sags at the peripheries of the progressive power lens 10*a* according to Example 1 and the progressive power lens 10*b* according to Comparative Example 1 are much greater than the sag at the periphery of the progressive power lens 10c according to Prior art Example 1. It is, however, shown that employing an atoric shape allows the progressive power lens 10a according to Example 1 to advantageously have a shallower object-side surface 19A than the progressive power lens 10b according to Comparative Example 1, which employs a toric shape, by about 0.80 mm at a horizontal distance x of 35 mm. On the other hand, the progressive power lens 10a according to Example 1 is thicker than the progressive power lens 10c according to Prior art Example 1 by about 0.27 mm at a horizontal distance x of 35 mm but thinner than the progressive power lens 10b according to Comparative Example 1, which employs a toric shape, by 0.20 mm at the horizontal distance x of 35 mm.

As described above, in the progressive power lens 10a according to Example 1, which provides each of the object-side surface 19A and the eyeball-side surface 19B with an atonic surface element, the astigmatism distribution and the equivalent spherical power distribution, which represent typical performance of a spectacle lens that does not consider astigmatism correction, are equivalent to those across the progressive power lens 10c according to Example of relate art 1, which employs a spherical surface. Further, the progressive power lens 10a according to Example 1 is superior to the progressive power lens 10c according to Prior art Example 1 in that image sway produced when the line of sight 2 (eyeball 3) moves under the influence of vestibulo-ocular reflex can be reduced. Moreover, the progressive power lens 10a according to Example 1, which employs an atonic shape which allows the horizontal surface power to gradually decrease in the direction from the principal meridian toward the outer edge, prevents the sag and hence the edge thickness difference from increasing. Still further, the progressive power lens 10a according to Example 1 prevents the horizontal curve from being too deep, which solves a problem of a difficulty in inserting a lens having too deep a lens curve with respect to the curve of a spectacle frame into the frame and a problem of inability to insert a lens designed for sport sunglasses and having a deep curve of 6 D or greater into a frame.

2.2 Second Embodiment 2.2.1 Example 2 and Comparative Example 2

Basic spectacle specifications in Example 2 and Comparative Example 2 were designed based on a progressive power lens "Seiko P-1 Synergy AS" (refractive index: 1.67) manufactured by Seiko Epson Corp. to which the following spectacle specifications were applied: the length of the progressive corridor was 14 mm; the prescribed power (distance power, Sph) was −3.00 D; and the addition power (Add) was 2.00 (D), which were the same as those in Example 1. A progressive power lens 10d according to Example 2 includes an atoric surface element, and a progressive power lens 10e according to Comparative Example 2 has the same spectacle specifications as those in Example 2 but includes a toric surface element.

Figure 21A:
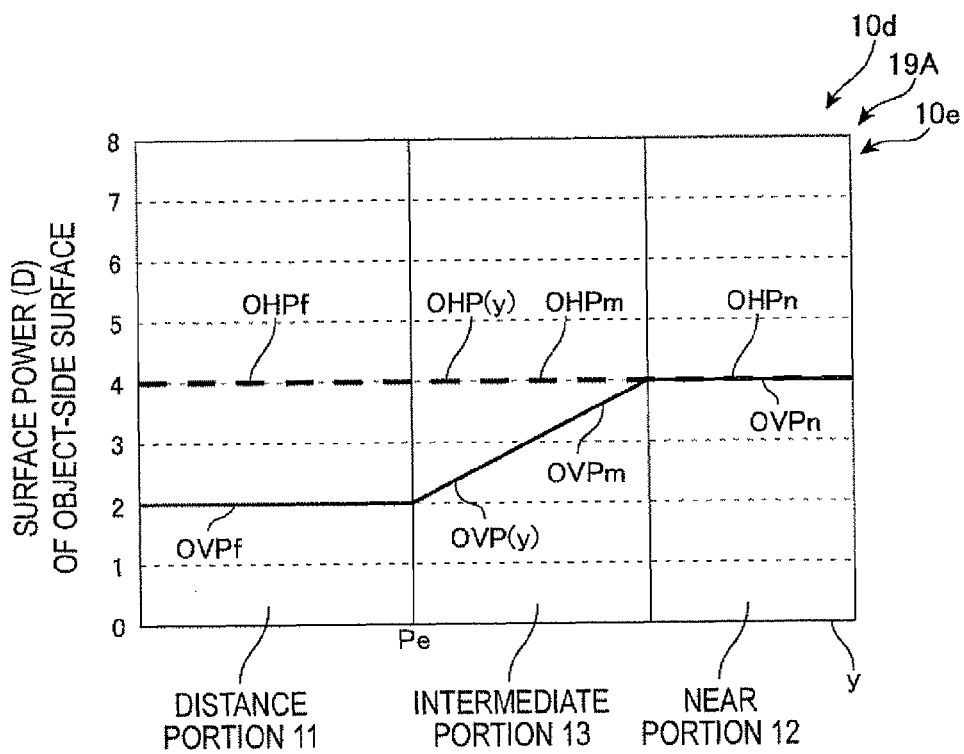
FIG. 21A shows surface power of the object-side surfaces of progressive power lenses according to Example 2 and Comparative Example 2 along the principal meridian.

FIG. 21A shows a broken line representing the horizontal surface power OHP(y) and a solid line representing the vertical surface power OVP(y) of the object-side surfaces 19A of the progressive power lens 10d according to Example 2 and the progressive power lens 10e according to Comparative Example 2 along the principal meridian 14. The horizontal surface power OHP(y) and the vertical surface power OVP(y) of the progressive power lens 10d along the principal meridian 14 agree with the horizontal surface power OHP(y) and the vertical surface power OVP(y) of the progressive power lens 10e along the principal meridian 14.

Figure 21B:
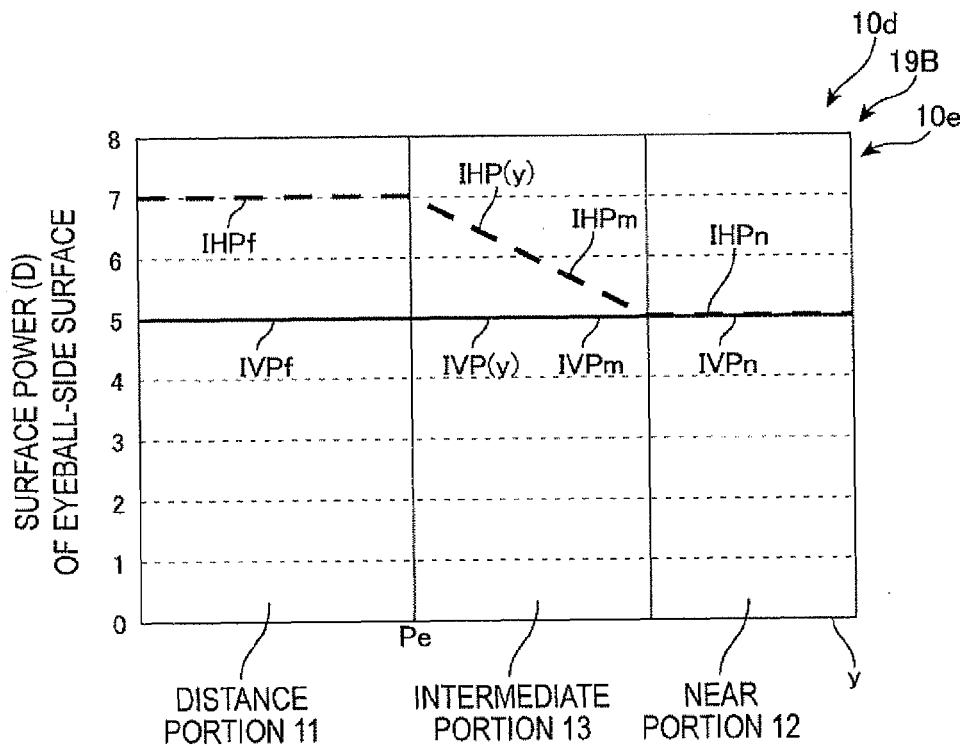
FIG. 21B shows surface power of the eyeball-side surfaces of the progressive power lenses according to Example 2 and Comparative Example 2 along the principal meridian.

FIG. 21B shows a broken line representing the horizontal surface power IHP(y) and a solid line representing the vertical surface power IVP(y) of the eyeball-side surfaces 19B of the progressive power lens 10d according to Example 2 and the progressive power lens 10e according to Comparative Example 2 along the principal meridian 14. The horizontal surface power IHP(y) and the vertical surface power IVP(y) of the progressive power lens 10d along the principal meridian 14 agree with the horizontal surface power IHP(y) and the vertical surface power IVP(y) of the progressive power lens 10e along the principal meridian 14.

Figure 22A:
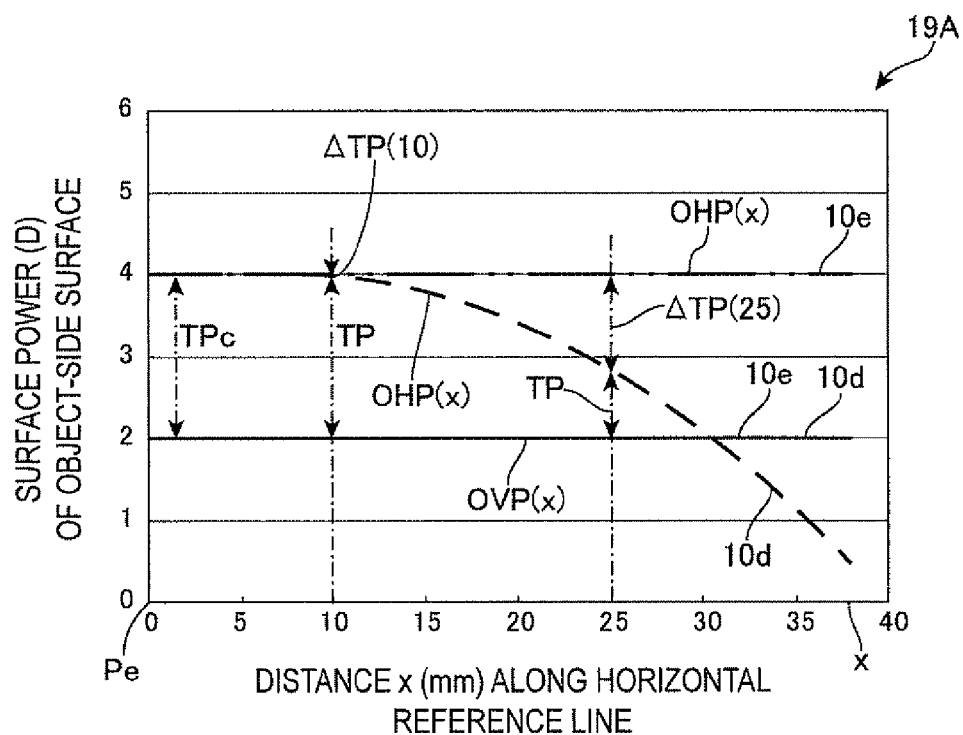
FIG. 22A shows surface power of the object-side surfaces of the progressive power lenses according to Example 2 and Comparative Example 2 along the horizontal reference line.

FIG. 22A shows a broken line representing the horizontal surface power OHP(x) and a solid line representing the vertical surface power OVP(x) of the object-side surface 19A of the progressive power lens 10d according to Example 2 along the horizontal reference line 15. FIG. 22A further shows a chain double-dashed line representing the horizontal surface power OHP(x) of the object-side surface 19A of the progressive power lens 10e according to Comparative Example 2 along the horizontal reference line 15. The vertical surface power OVP(x) of the object-side surface 19A of the progressive power lens 10e along the horizontal reference line 15 agrees with the vertical surface power OVP(x) of the object-side surface 19A of the progressive power lens 10d along the horizontal reference line 15.

Figure 22B:
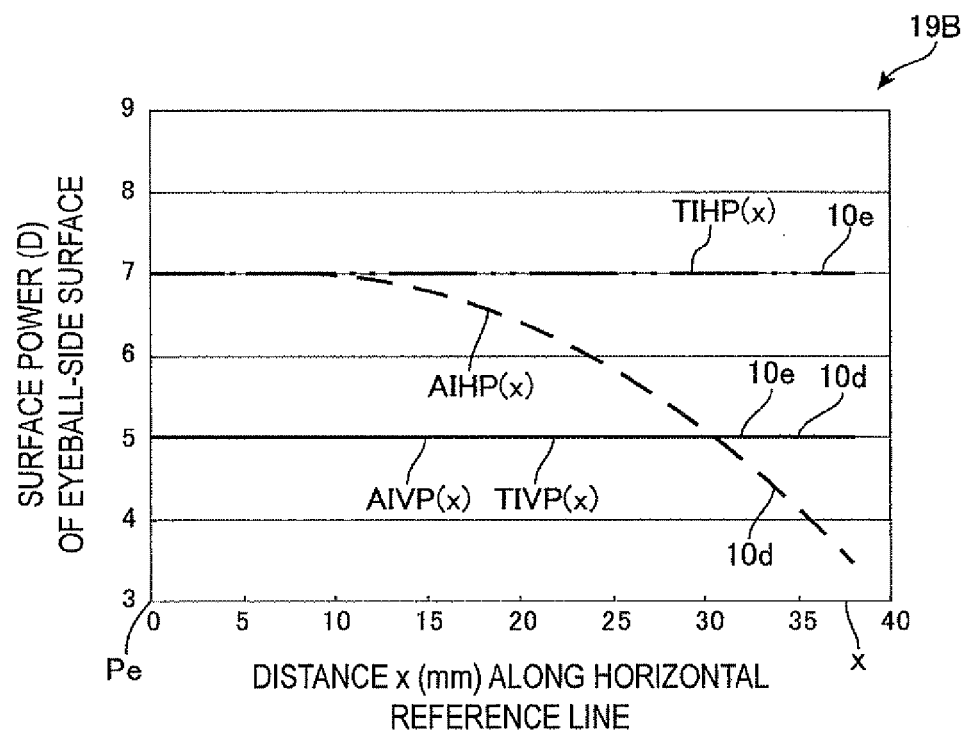
FIG. 22B shows surface power of an atoric surface element and a toric surface element of the eyeball-side surfaces of the progressive power lenses according to Example 2 and Comparative Example 2 along the horizontal reference line.

FIG. 22B shows a broken line representing the horizontal surface power AIHP(x) and a solid line representing the vertical surface power AIVP(x) of an atoric surface element of the eyeball-side surface 19B of the progressive power lens 10d according to Example 2 along the horizontal reference line 15. FIG. 22B further shows a chain double-dashed line representing the horizontal surface power TIHP(x) of a toric surface element of the eyeball-side surface 19B of the progressive power lens 10e according to Comparative Example 2 along the horizontal reference line 15. The vertical surface power TIVP(x) of the toric surface element of the eyeball-side surface 19B of the progressive-power lens 10e along the horizontal reference line 15 agrees with the vertical surface power AIVP(x) of the atoric surface element of the eyeball-side surface 19B of the progressive power lens 10d along the horizontal reference line 15.

Figures 23A, 23B, 24:
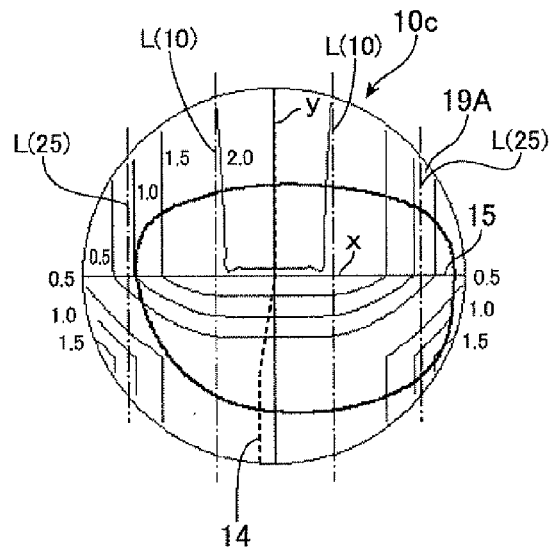
FIG. 23A shows numerical data of the object-side surface of the progressive power lens according to Example 2.
FIG. 23B shows numerical data of the object-side surface of the progressive power lens according to Comparative Example 2.
FIG. 24 shows a surface astigmatism distribution across the object-side surface of the progressive power lens according to Example 2.

FIG. 23A shows numerical data of the object-side surface 19A of the progressive power lens 10d according to Example 2. FIG. 23B shows numerical data of the object-side surface 19A of the progressive power lens 10e according to Comparative Example 2.

The progressive power lens 10d according to Example 2 and the progressive power lens 10e according to Comparative Example 2 satisfy Expressions (0), (2), and (4) described above. Specifically, in the progressive power lenses 10d and 10e, each of the horizontal surface power OHPf of the distance portion 11, the horizontal surface power OHPm of the intermediate portion 13, and the horizontal surface power OHPn of the near portion 12 is a fixed value, 4.0 D, on the object-side surface 19A along the principal meridian 14. On the other hand, the vertical surface power OVPf of the distance portion 11 is a fixed value, 2.0 D, the vertical surface power OVPm of the intermediate portion 13 progressively increases to 4.0 D in the near portion 12, and the vertical surface power OVPn of the near portion 12 is a fixed value, 4.0 D, on the object-side surface 19A along the principal meridian 14.

On the eyeball-side surface 19B along the principal meridian 14, the horizontal surface power IHPf of the distance portion 11 is a fixed value, 7.0 D, the horizontal surface power IHPm of the intermediate portion 13 progressively decreases to 5.0 D in the near portion 12, and the horizontal surface power IHPn of the near portion 12 is a fixed value, 5.0 D. On the other hand, each of the vertical surface power IVPf of the distance portion 11, the vertical surface power IVPm of the intermediate portion 13, and the vertical surface power IVPn of the near, portion 12 is a fixed value, 5.0 D.

As described above, the object-side surface 19A of each of the progressive power lenses 10d and 10e includes a progressive surface (object-side progressive) element, and the eyeball-side surface 19B thereof also includes a progressive surface (eyeball-side progressive) element. Specifically, the vertical surface power OVP of the object-side surface 19A is produced by the object-side progressive element, and the horizontal surface power IHP of the eyeball-side surface 193 is produced by the eyeball-side progressive element. Further, the progressive power lens 10d according to Example 2 includes an atoric surface element where the difference TP along the principal meridian 14 on the object-side and eyeball-side surfaces of the distance portion 11 and the intermediate portion 13 is not zero (where difference in toric level is present along principal meridian 14). Each of the object-side and eyeball-side surfaces of the near portion 12 of the progressive power lens 10d includes an atoric surface element where the difference TP is zero along the principal meridian 14, that is, the surface along the principal meridian 14 is a spherical surface. The configuration described above may depart from the definition of an atoric surface in an exact sense but is taken as a special case of an atoric surface in the present embodiment.

In the progressive power lens 10e according to Comparative Example 2, each of the object-side and eyeball-side surfaces of the distance portion 11 and the intermediate portion 13 of includes a toric surface element, and the object-side surface 19A of the near portion 12 is a spherical surface. The eyeball-side surface 19B of the near portion 12 of the progressive power lens 10e therefore includes no element that cancels the toric surface element.

2.2.2 Evaluation

Figure 25:
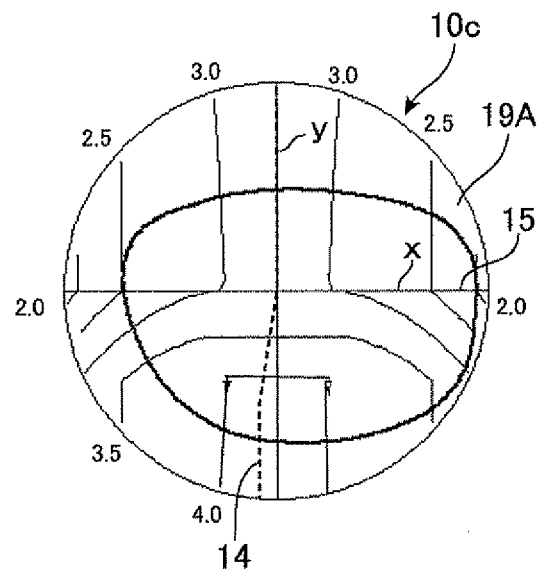
FIG. 25 shows an equivalent spherical surface power distribution across the object-side surface of the progressive power lens according to Example 2.

FIG. 24 shows a surface astigmatism distribution across the object-side surface 19A of the progressive power lens 10d according to Example 2, and FIG. 25 shows an equivalent spherical surface power distribution across the object-side surface 19A of the progressive power lens 10d. The surface astigmatism distribution and the equivalent spherical surface power distribution are compared with the surface astigmatism distribution (FIG. 13B) and the equivalent spherical surface power distribution (FIG. 14B) across the progressive power lens 10c according to Prior art Example 1 described above having the same spectacle specifications.

Figure 26:
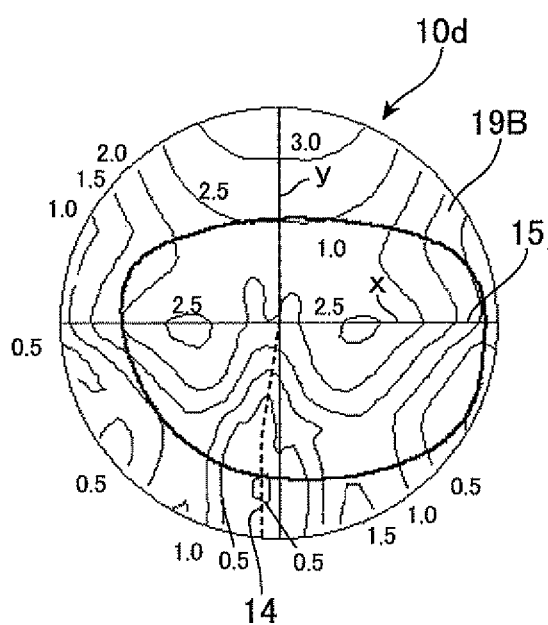
FIG. 26 shows a surface astigmatism distribution across the eyeball-side surface of the progressive power lens according to Example 2.
Figure 27:
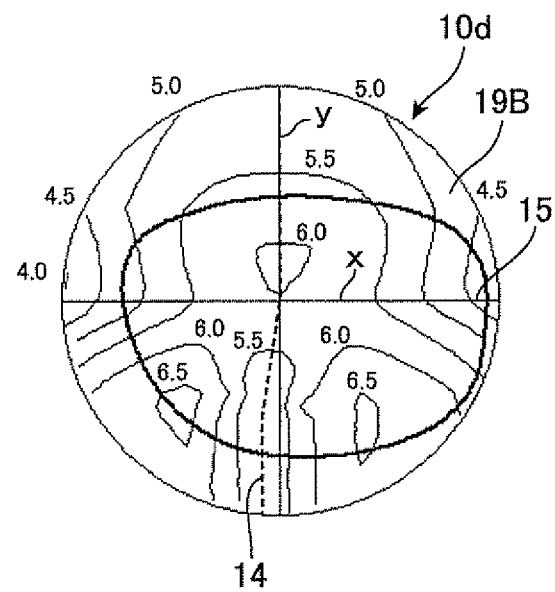
FIG. 27 shows an equivalent spherical surface power distribution across the eyeball-side surface of the progressive power lens according to Example 2.

FIG. 26 shows a surface astigmatism distribution across the eyeball-side surface 19B of the progressive power lens 10d, and FIG. 27 shows an equivalent spherical surface power distribution across the eyeball-side surface 19B of the progressive power lens 10d. The surface astigmatism distribution and the equivalent spherical surface power distribution are compared with the surface astigmatism distribution (FIG. 15B) and the equivalent spherical surface power distribution (FIG. 16B) across the progressive power lens 10c according to Prior art Example 1 described above having the same spectacle specifications.

Figure 28:
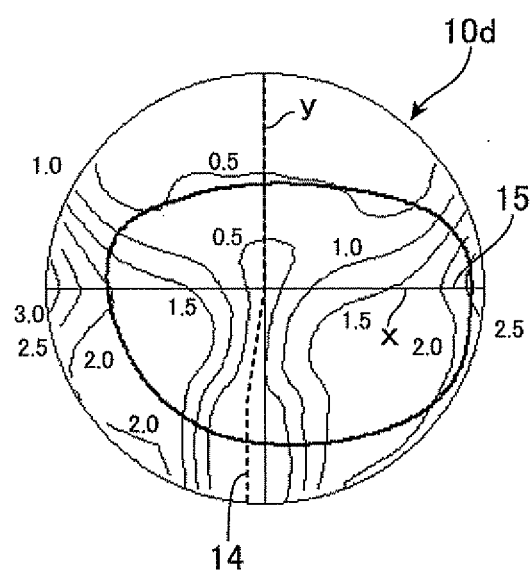
FIG. 28 shows an astigmatism distribution across the progressive power lens according to Example 2.
Figure 29:
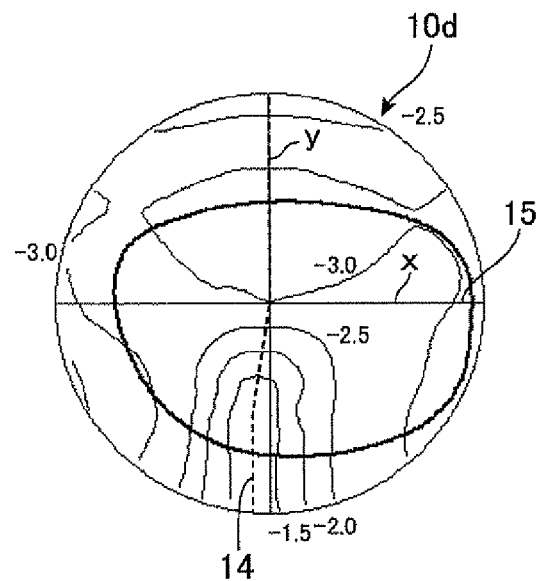
FIG. 29 shows an equivalent spherical power distribution across the progressive power lens according to Example 2.

FIG. 28 shows an astigmatism distribution obtained by viewing an object through each on-lens position of the progressive power lens 10d, and FIG. 29 shows an equivalent spherical power distribution obtained by viewing the object through each on-lens position of the progressive power lens 10d. The astigmatism distribution and the equivalent spherical power distribution are compared with the astigmatism distribution (FIG. 17B) and the equivalent spherical power distribution (FIG. 18B) across the progressive power lens 10c according to Prior art Example 1 described above having the same spectacle specifications.

The surface astigmatism across the object-side and eyeball-side surfaces of the progressive power lens 10d according to Example 2 shown in FIGS. 24 and 26 is the sum of the surface astigmatism across the progressive power lens 10c according to Prior art Example 1 and the surface astigmatism produced by the atoric surface element, which changes in such a way that the difference between the horizontal surface power and the vertical surface power decreases in the direction from the principal meridian 14 outward along the horizontal reference line 15 and the sign of the difference is reversed. Similarly, the equivalent spherical surface power distribution across each of the object-side and eyeball-side surfaces of the progressive power lens 10d shown in FIGS. 25 and 27 is the sum of the equivalent spherical surface power distribution across the progressive power lens 10c according to Prior art Example 1 and the equivalent spherical surface power distribution produced by the atoric surface element, in which the equivalent spherical surface power decreases in such a way that the horizontal surface power OHP decreases in the direction from the principal meridian 14 outward along the horizontal reference line 15. It is also shown that the summation is not simple because aspheric surface correction is performed.

The astigmatism distribution across the progressive power lens 10d shown in FIG. 28 is substantially the same as the astigmatism distribution across the progressive power lens 10c according to Prior art Example 1 shown in FIG. 17B. The equivalent spherical power distribution across the progressive power lens 10d shown in FIG. 29 is substantially the same as the equivalent spherical power distribution across the progressive power lens 10c according to Prior art Example 1 shown in FIG. 18B. It is therefore shown that effectively using aspheric surface correction with the progressive power lens 10d according to Example 2 provides a progressive power lens that shows substantially the same astigmatism distribution and equivalent spherical power distribution as those across the progressive power lens 10c according to Prior art Example 1.

Further, the progressive power lens 10d according to Example 2 in an area within ±10 mm along the horizontal reference line 15 from the fitting point Pe is a substantially toric surface as shown in FIG. 22A, as in the progressive power lens 10e according to Comparative Example 2, and the toric surface element of the eyeball-side surface 19B cancels the toric surface element of the object-side surface 19A. The toric surface elements of the object-side and eyeball-side surfaces are therefore not intended to correct astigmatism but are more effective in suppressing image sway produced through the lens 10d when the eye (line of sight) moves.

Further, the object-side surface 19A of the progressive power lens 10d according to Example 2 in an area within ±10 mm along the horizontal reference line 15 from the principal meridian 14, that is, the portion of the object-side surface 19A from the principal meridian 14 to the lines L(10), is a substantially toric surface, and the toric surface element of the eyeball-side surface 19B cancels the toric surface element of the object-side surface 19A, as shown in FIG. 24. As a result, a substantially toric surface is formed along the principal meridian 14, along which the line of sight 2 moves, whereby image sway produced through the optical lens 10d when the eye moves can be suppressed.

FIG. 30 shows the index IDd representing shake determined by using the sway evaluation method. The index TDd representing shake produced by the progressive power lens 10d according to Example 2 is smaller than the index IDd representing shake produced by the progressive power lens 10c according to Prior art Example 1. FIG. 30 shows that sway decreases substantially throughout the principal meridian 14 from the distance portion through the intermediate portion to the near portion. In particular, the sway is greatly reduced in the distance portion 11.

The difference TPc between the horizontal surface power OHP and the vertical surface power OVP of the progressive power lens 10d according to Example 2 at the fitting point Pe is 2.0 D, which satisfies the condition (10). The amount of decrease ΔTP(10) in the difference TP of the progressive power lens 10d is 0.02 D, as shown in FIG. 23A, which satisfies the condition (11). The progressive power lens 10d therefore includes a toric surface element capable of suppressing image sway along the principal meridian 14.

Further, the progressive power lens 10d according to Example 2 has a ΔTP(25) of 0.59TPc (1.17/2.00), which satisfies the condition (12) described above. The portion of the progressive power lens 10d according to Example 2 beyond ±10 mm from the fitting point Pe and the principal meridian 14 along the horizontal reference line 15 is therefore an aspheric surface (atoric surface) where the horizontal surface power OHP monotonously decreases. The progressive power lens 10d according to Example 2 therefore provides an advantage of a shallow horizontal lens curve.

Figure 31:
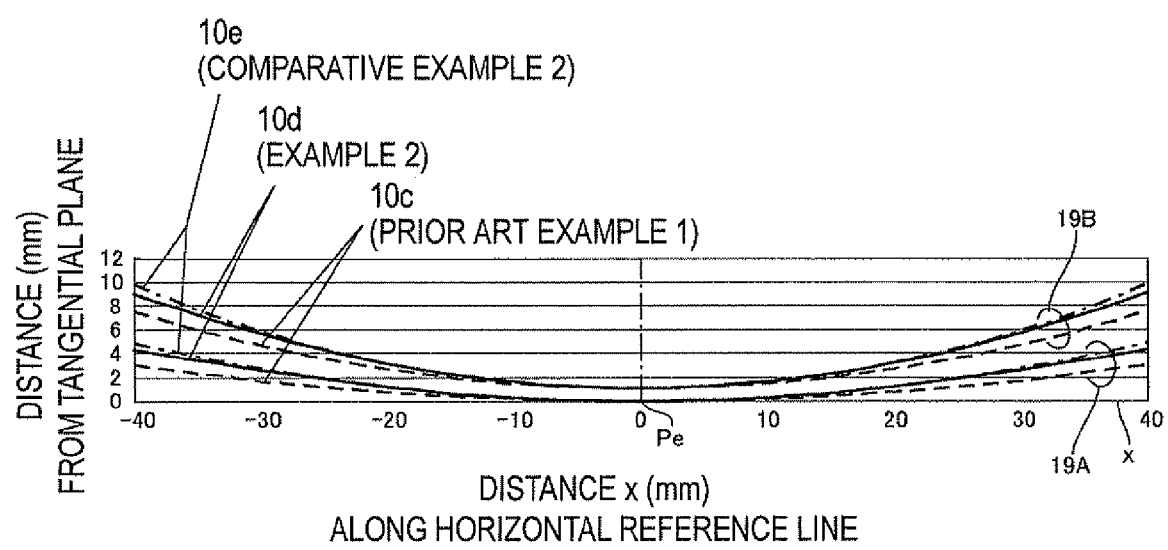
FIG. 31 shows the curves of the object-side surfaces and the curves of the eyeball-side surfaces of the progressive power lenses according to Example 2, Comparative Example 2, and Prior art Example 1.

FIG. 31 shows the curves of the object-side surfaces 19A and the curves of the eyeball-side surfaces 19B of the progressive power lens 10d according to Example 2, the progressive power lens 10e according to Comparative Example 2, and the progressive power lens 10c according to Prior art Example 1. Each of the curves includes the fitting point Pe and extends along the horizontal reference line 15. The curve of each of the object-side surfaces 19A is expressed by the distance from a tangential plane including the fitting point Pe (object-side sag), which is the vertex and the geometric center of the object-side surface 19A. As in the example described above, the progressive power lens 10e according to Comparative Example 2, which includes a simple toric surface element, has a deeper horizontal curve and hence tends to have a larger thickness at the periphery of the lens (edge thickness difference) than the progressive power lens 10c according to Prior art Example 1. In contrast, the progressive power lens 10d according to Example 2 does not have very deep horizontal curve or a very large thickness at the periphery of the lens (edge thickness difference).

Referring to the numerical data of the progressive power lens 10d according to Example 2 shown in FIG. 23A, the horizontal surface power OHP of the progressive power lens 10d according to Example 2 decreases by 0.017 D at a horizontal distance x of 10 mm from the principal meridian 14 (or vertical reference line y). In other words, the amount of decrease ΔTP in the difference TP is 0.02 D, which means that the difference TP is maintained at about 2.0 D. The atoric surface element of the object-side surface 19A in an area within a horizontal distance x of 10 mm therefore changes mildly in shape or is a substantially toric surface.

The horizontal surface power OHP of the object-side surface 19A of the progressive power lens 10d abruptly decreases beyond a horizontal distance x of about 10 mm, and the amount of decrease is 1.169 D at a horizontal distance x of 25 mm. The amount of decrease ΔTP in the difference TP is therefore 1.17 D, which is about 0.6 times the difference TPc (toric level) at the principal meridian 14, which is 2.0 D. The horizontal surface power OHP of the object-side surface 19A continues to decrease monotonously, and the amount of decrease at the outer edge of the lens 10d is 3.974 D, which is substantially equal to the toric level TPc at the principal meridian 14. In contrast, in the progressive power lens 10e according to Comparative Example 2, the horizontal surface power OHP remains fixed from the principal meridian 14 to the outer edge.

The horizontal surface power OHP of the progressive power lens 10c according to Example of relate art 1 at the principal meridian 14 is 2.5 D, whereas the horizontal surface power OHP of the progressive power lens 10d according to Example 2 and the progressive power lens 10e according to Comparative Example 2 at the principal meridian 14 is 4.0 D, which greatly differs from 2.5 D. As a result, the sags at the peripheries of the progressive power lens 10d according to Example 2 and the progressive power lens 10e according to Comparative Example 2 are much greater than the sag at the periphery of the progressive power lens 10c according to Prior art Example 1. It is, however, shown that employing an atoric shape allows the progressive power lens 10d according to Example 2 to advantageously have a shallower object-side surface 19A than the progressive power lens 10e according to Comparative Example 2, which employs a toric shape where the horizontal surface power OHP is fixed along the horizontal reference line, by about 0.53 mm at a horizontal distance x of 35 mm. On the other hand, the progressive power lens 10e according to Comparative Example 2 is thicker than the progressive power lens 10c according to Prior art Example 1 by 0.26 mm at a horizontal distance x of 35 mm. In contrast, the progressive power lens 10d according to Example 2 is thicker only by 0.16 mm, whereby an optical lens having a central portion formed of a toric surface element but having a small increase in thickness can be provided.

As described above, the progressive power lens 10d according to Example 2, which provides each of the object-side surface 19A and the eyeball-side surface 19B with an atoric surface element, forms an optical lens that produces a small amount of image sway, has a small edge thickness difference, and is readily inserted into a frame.

2.3 Third Embodiment

2.3.1 Example 3

Basic spectacle specifications in Example 3 were designed based on a progressive power lens "Seiko P-1 Synergy AS" (refractive index: 1.67) manufactured by Seiko Epson Corp. to which the following spectacle specifications were applied: the length of the progressive corridor was 14 mm; the prescribed power (distance power, Sph) was 3.00 D; and the addition power (Add) was 2.00 (D). Further, the diameter of a progressive power lens according to Example 3 is 65 mm, and no astigmatism power is added. A progressive power lens 10f according to Example 3 is therefore a hypermetropia correcting spectacle lens having a distance portion 11 of positive prescribed average power. The progressive power lens 10f according to Example 3 includes an atoric surface element.

Figure 32A:
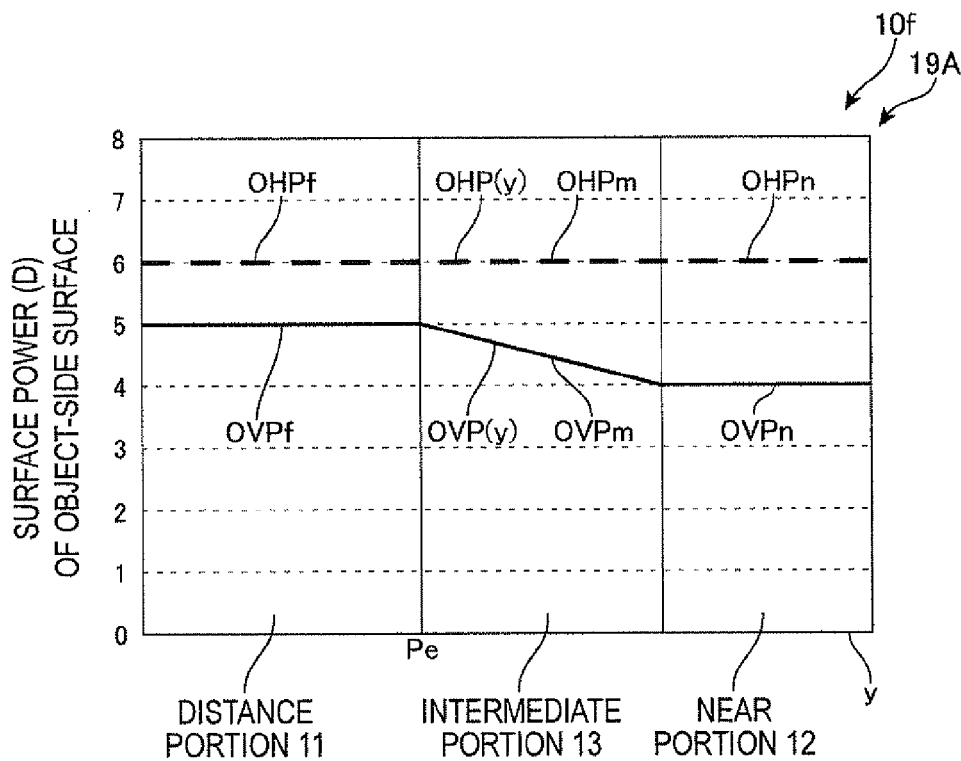
FIG. 32A shows surface power of the object-side surface of a progressive power lens according to Example 3 along the principal meridian.
Figure 32B:
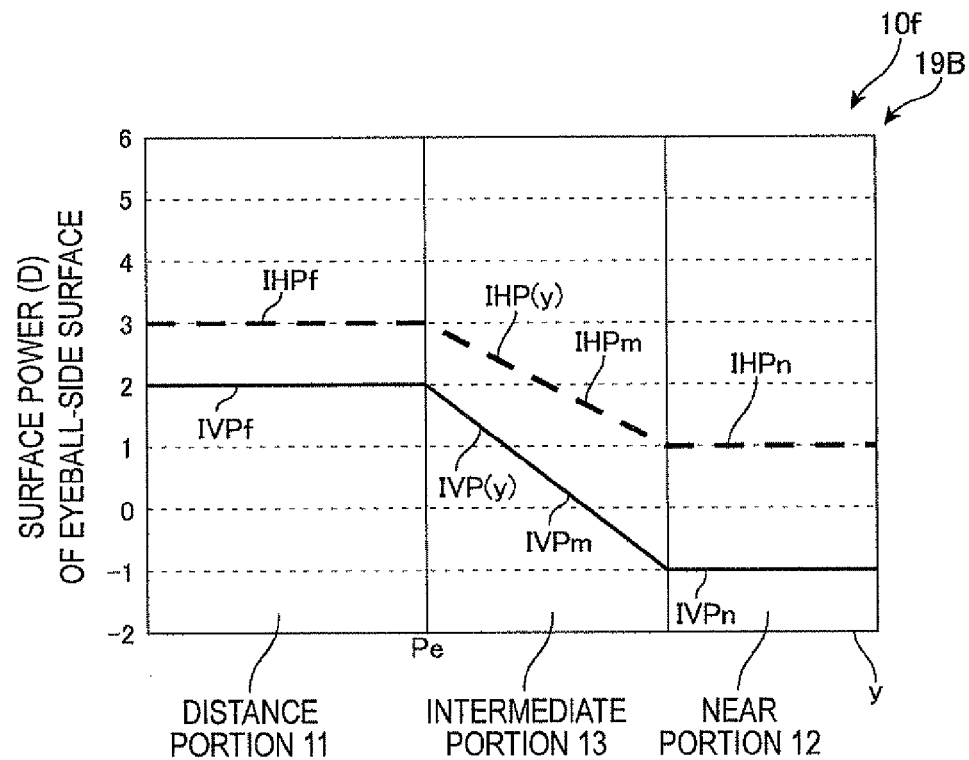
FIG. 32B shows surface power of the eyeball-side surface of the progressive power lens according to Example 3 along the principal meridian.

FIG. 32A shows a broken line representing the horizontal surface power OHP(y) and a solid line representing the vertical surface power OVP(y) of the object-side surface 19A of the progressive power lens 10f according to Example 3 along the principal meridian 14. FIG. 32B shows a broken line representing the horizontal surface power IHP(y) and a solid line representing the vertical surface power IVP(y) of the eyeball-side surface 19B of the progressive-power lens 10f along the principal meridian 14. FIG. 32B shows that the power IVP(y) of the eyeball-side surface 19B experiences 0 D and becomes negative or the near portion 12 has a convex surface instead of a concave surface.

Figure 33A:
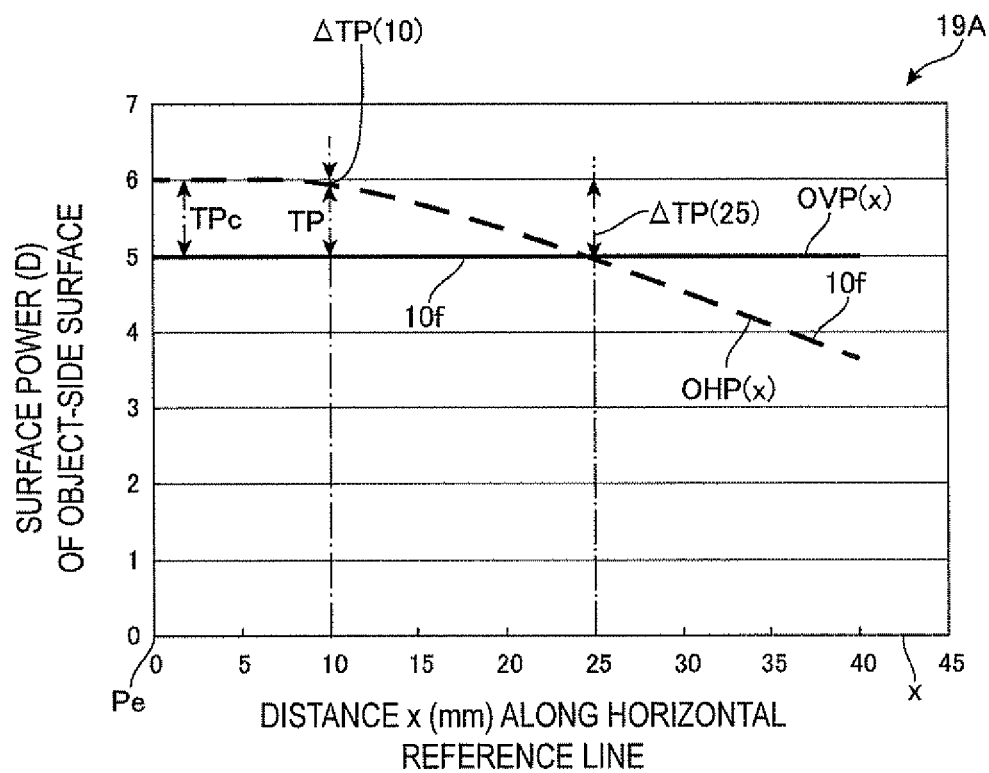
FIG. 33A shows surface power of the object-side surface of the progressive power lens according to Example 3 along the horizontal reference line.
Figure 33B:
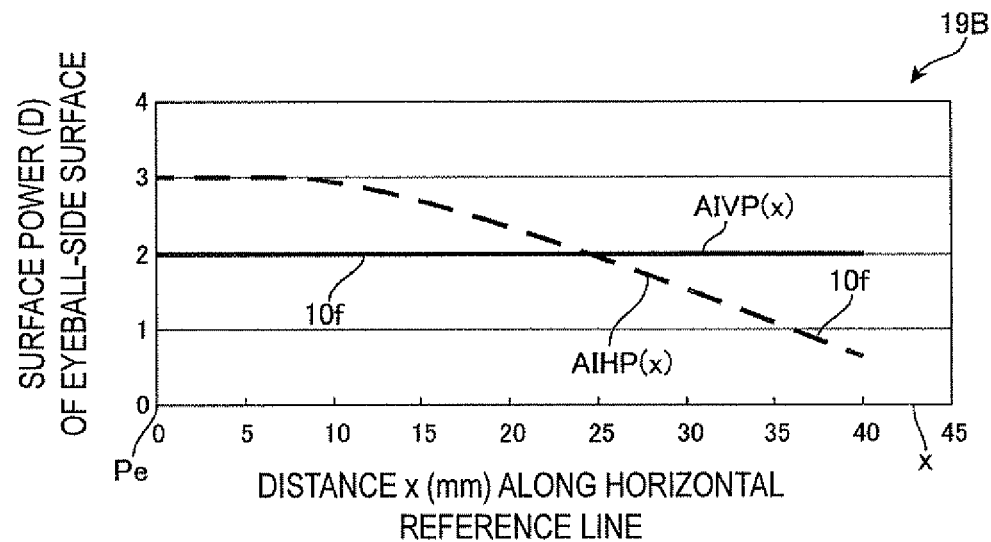
FIG. 33B shows surface power of an atoric surface element of the eyeball-side surfaces of the progressive power lens according to Example 3 along the horizontal reference line.

FIG. 33A shows a broken line representing the horizontal surface power OHP(x) and a solid line representing the vertical surface power OHP(x) of the object-side surface 19A of the progressive power lens 10f according to Example 3 along the horizontal reference line 15. FIG. 33B shows a broken line representing the horizontal surface power AIHP(x) and a solid line representing the vertical surface power AIVP(x) of an atoric surface element of the eyeball-side surface 19B of the progressive power lens 10f according to Example 3 along the horizontal reference line 15.

FIG. 34A shows numerical data of the object-side surface 19A of the progressive power lens 10f according to Example 3. FIG. 34B shows numerical data of the object-side surface 19A of a progressive power lens 10g according to Prior art Example 3, which will be described below.

The progressive power lens 10f according to Example 3 satisfies Expressions (0), (1), and (4) described above. Specifically, on the object-side surface 19A, each of the horizontal surface power OHPf of the distance portion 11, the horizontal surface power OHPm of the intermediate portion 13, and the horizontal surface power OHPn of the near portion 1 is a fixed value, 6.0 D. On the other hand, the vertical surface power OVPf of the distance portion 11 is 5.0 D, the vertical surface power OVPn of the near portion 12 is 4.0 D, and the vertical surface power OVPm of the intermediate portion 13 progressively decreases. On the eyeball-side surface 19B along the principal meridian 14, the horizontal surface power IHPf of the distance portion 11 is a fixed value, 3.0 D, the horizontal surface power IHPn of the near portion 12 is a fixed value, 1.0 D, and the horizontal surface power IHPm of the intermediate portion 13 gradually decreases. On the eyeball-side surface 19B, the vertical surface power IVPf of the distance portion 11 is a fixed value, 2.0 D, the vertical surface power IVPn of the near portion 12 is a fixed value, −1.0 D, and the vertical surface power IVPm of the intermediate portion 13 gradually decreases.

As a result, the object-side surface 19A of the progressive power lens 10f includes a reverse progressive (object-side reverse progressive) element, and the eyeball-side surface 19B thereof includes an eyeball-side progressive element that cancels the object-side reverse progressive element and functions as a progressive surface.

2.3.2 Prior Art Example 3

A progressive power lens 10g was designed as Prior art Example 3 and compared with the progressive power lens 10f according to Example 3. The progressive power lens 10g has a spherical object-side surface 19A having the same spectacle specifications as those in Example 3.

Figure 35A:
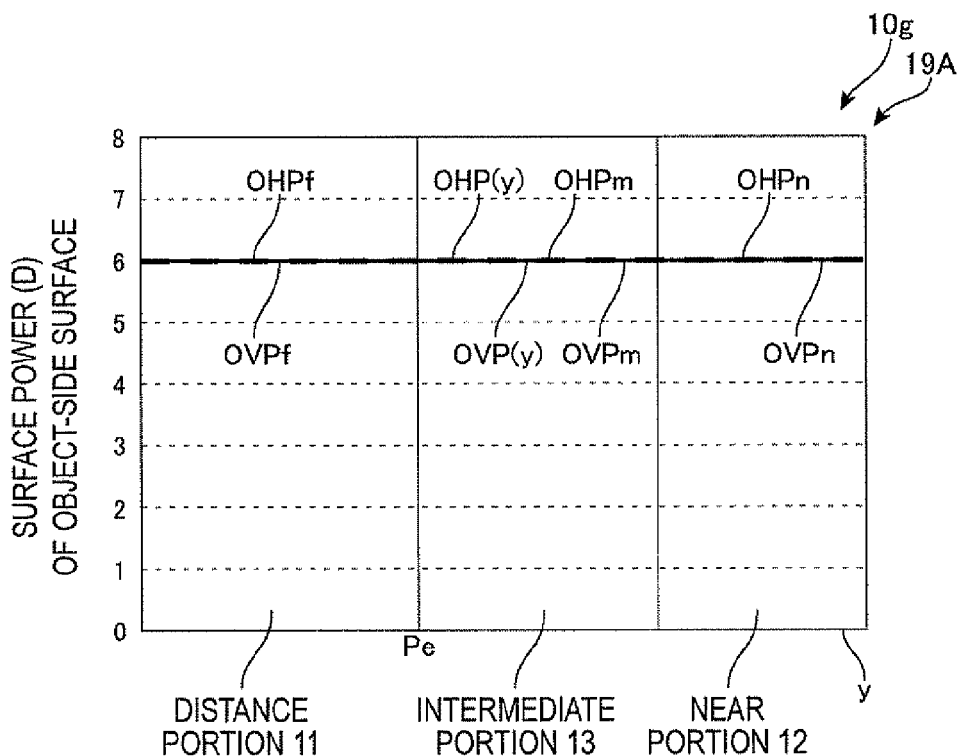
FIG. 35A shows surface power of the object-side surface of the progressive power lens according to Prior art Example 3 along the principal meridian.
Figure 35B:
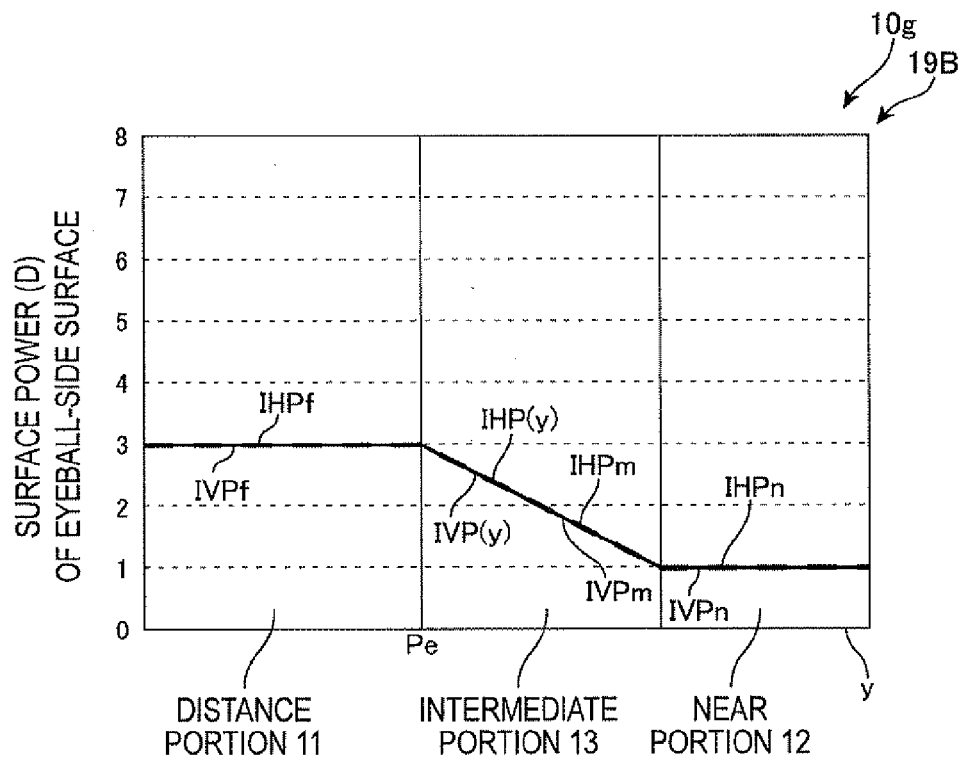
FIG. 35B shows surface power of the eyeball-side surface of the progressive power lens according to Prior art Example 3 along the principal meridian.

FIG. 35A shows the horizontal surface power OHP(y) and the vertical surface power OVP(y) of the object-side surface 19A of the progressive power lens 10g according to Prior art Example 3 along the principal meridian 14. FIG. 35B shows the horizontal surface power IHP(y) and the vertical surface power IVP(y) of the eyeball-side surface 193 of the progressive power lens 10g along the principal meridian 14. FIG. 343 shows numerical data of the object-side surface 19A of the progressive power lens 10g.

Since the progressive power lens 10g according to Prior art Example 3 has a spherical object-side surface 19A, each of the horizontal surface power OHPf of the distance portion 11, the horizontal surface power OHPm of the intermediate portion 13, the horizontal surface power OHPn of the near portion 12, the vertical surface power OVPf of the distance portion 11, the vertical surface power OVPm of the intermediate portion 13, and the vertical surface power OVPn of the near portion 12 is a fixed value, 6.0 D. On the other hand, the horizontal surface power IHP and the vertical surface power IVP of the eyeball-side surface 19B along the principal meridian 14 agree with each other. Each of the horizontal surface power IHPf and the vertical surface power IVPf of the distance portion 11 is a fixed value, 3.0 D. The horizontal surface power IHPm and the vertical surface power IVPm of the intermediate portion 13 progressively decrease to 1.0 D in the near portion 12.

2.3.3 Evaluation

Figure 36A:
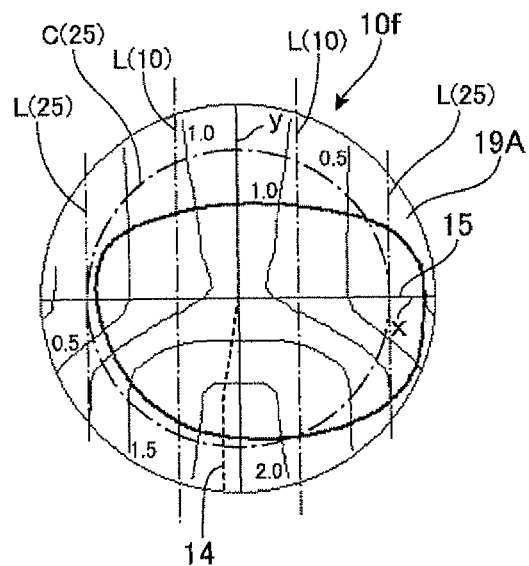
FIG. 36A shows a surface astigmatism distribution across the object-side surface of the progressive power lens according to Example 3.
Figure 36B:
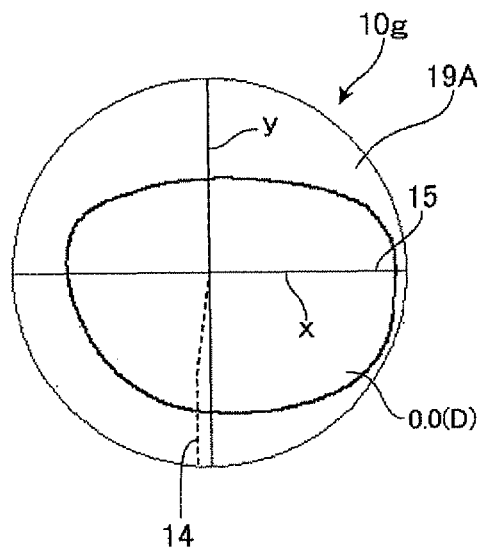
FIG. 36B shows a surface astigmatism distribution across the object-side surface of the progressive power lens according to Prior art Example 3.
Figure 37A:
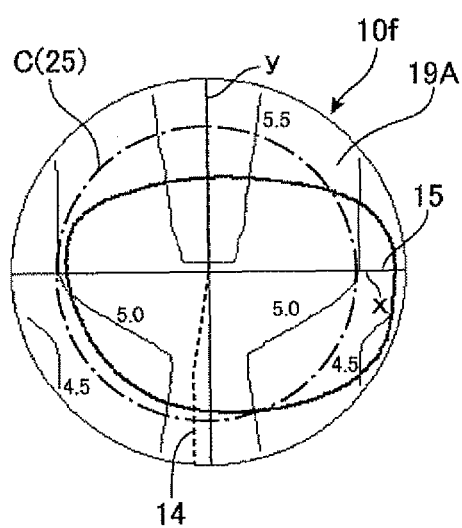
FIG. 37A shows an equivalent spherical surface power distribution across the object-side surface of the progressive power lens according to Example 3.
Figure 37B:
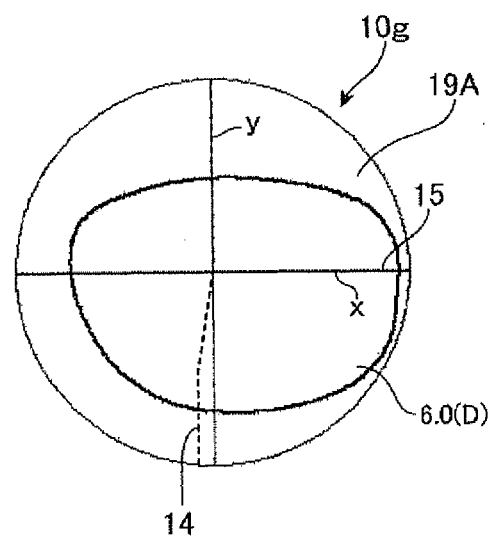
FIG. 37B shows an equivalent spherical surface power distribution across the object-side surface of the progressive power lens according to Prior art Example 3.

FIG. 36A shows a surface astigmatism distribution across the object-side surface 19A of the progressive power lens 10f according to Example 3, and FIG. 36B shows a surface astigmatism distribution across the object-side surface 19A of the progressive power lens 10g according to Prior art Example 3. FIG. 37A shows an equivalent spherical surface power distribution across the object-side surface 19A of the progressive power lens 10f according to Example 3, and FIG. 37B shows an equivalent spherical surface power distribution across the object-side surface 19A of the progressive power lens 10g according to Prior art Example 3. FIG. 36A also shows not only lines L(10) set apart from the principal meridian 14 by horizontal distances of ±10 mm and lines L(25) set apart from the principal meridian 14 by horizontal distances of ±25 mm but also a circle C(25) drawn around the fitting point Pe with a distance (radius) of 25 mm. FIG. 37A shows a circle C(25) drawn around the fitting point Pe with a distance of 25 mm.

Figure 38A:
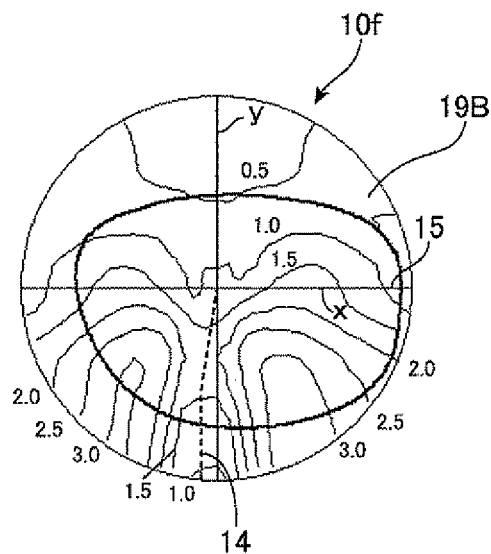
FIG. 38A shows a surface astigmatism distribution across the eyeball-side surface of the progressive power lens according to Example 3.
Figure 38B:
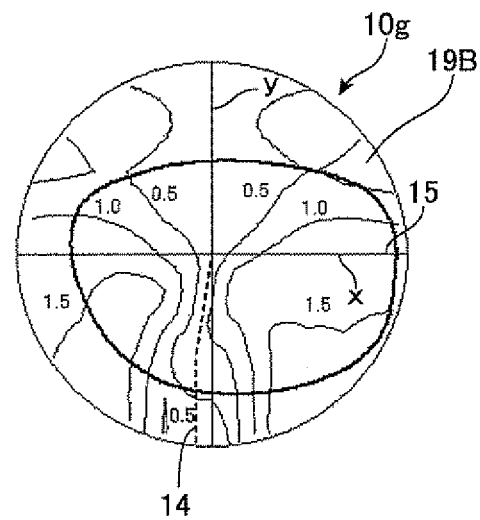
FIG. 38B shows a surface astigmatism distribution across the eyeball-side surface of the progressive power lens according to Prior art Example 3.
Figure 39A:
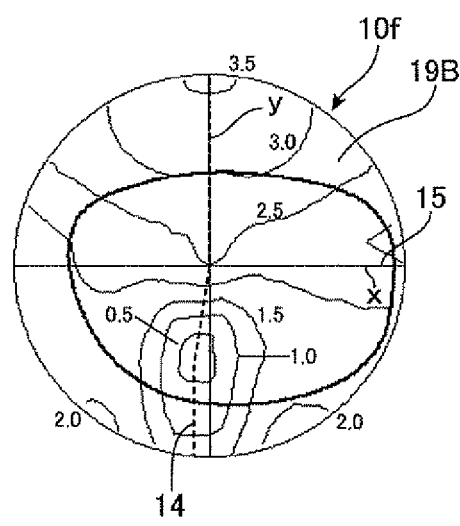
FIG. 39A shows an equivalent spherical surface power distribution across the eyeball-side surface of the progressive power lens according to Example 3.

FIG. 38A shows a surface astigmatism distribution across the eyeball-side surface 19B of the progressive power lens 10f according to Example 3, and FIG. 38B shows a surface astigmatism distribution across the eyeball-side surface 19B of the progressive power lens 10g according to Prior art Example 3. FIG. 39A shows an equivalent spherical surface power distribution across the eyeball-side surface 19B of the progressive power lens 10f according to Example 3, and FIG. 39B shows an equivalent spherical surface power distribution across the eyeball-side surface 19B of the progressive power lens 10g according to Prior art Example 3.

The surface astigmatism of the progressive power lens 10f according to Example 3 shown in FIGS. 36A and 38A is the sum of the surface astigmatism across the progressive power lens 10g according to Prior art Example 3 shown in FIGS. 36B and 38B and the surface astigmatism produced by the atoric surface element, which changes in such a way that the difference between the horizontal surface power and the vertical surface power decreases in the direction from the principal meridian 14 outward along the horizontal reference line 15 and the sign of the difference TP is reversed. It is also shown that the summation is not simple because aspheric surface correction is added to adjust the amount of aberration.

Figure 39B:
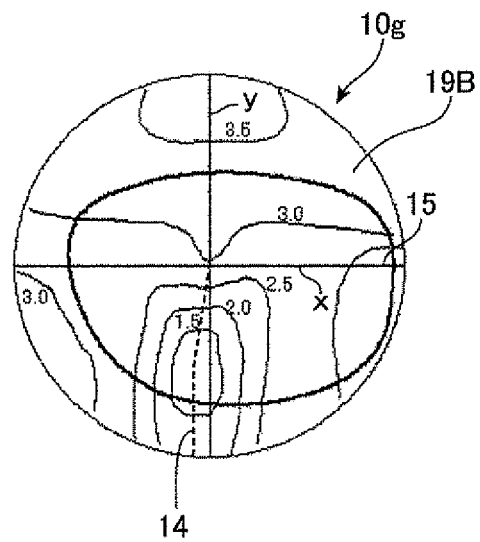
FIG. 39B shows an equivalent spherical surface power distribution across the eyeball-side surface of the progressive power lens according to Prior art Example 3.

Similarly, the equivalent spherical surface power distribution across the progressive power lens 10f according to Example 3 shown in FIGS. 37A and 39A is the sum of the equivalent spherical surface power distribution across the progressive-power lens 10g according to Prior art Example 3 shown in FIGS. 37B and 39B and the equivalent spherical surface power distribution produced by the atoric surface element, in which the equivalent spherical surface power decreases in such a way that the horizontal surface power OHP decreases in the direction from the principal meridian 14 outward along the horizontal reference line 15. The summation is not simple as well because aspheric surface correction is performed.

FIG. 40A shows an astigmatism distribution obtained by viewing an object through each on-lens position of the progressive power lens 10f according to Example 3, and FIG. 40B shows an astigmatism distribution obtained by viewing the object through each on-lens position of the progressive power lens 10g according to Prior art Example 3. FIG. 41A shows an equivalent spherical power distribution obtained by viewing an object through each on-lens position of the progressive power lens 10f according to Example 3, and FIG. 41S shows an equivalent spherical power distribution obtained by viewing the object through each on-lens position of the progressive power lens 10g according to Prior art Example 3.

The astigmatism distribution across the progressive power lens 10f according to Example 3 shown in FIG. 40A is substantially the same as the astigmatism distribution across the progressive power lens 10g according to Prior art Example 3 shown in FIG. 40B. Further, the equivalent spherical power distribution across the progressive power lens 10f according to Example 3 shown in FIG. 41A is substantially the same as the equivalent spherical power distribution across the progressive power lens 10g according to Prior art Example 3 shown in FIG. 41B. It is therefore shown that effectively using aspheric surface correction with the progressive power lens 10f according to Example 3 provides a progressive power lens that shows substantially the same astigmatism distribution and equivalent spherical power distribution as those across the progressive power lens 10g according to Prior art Example 3.

Further, the progressive power lens 10f according to Example 3 in an area within ±10 mm along the horizontal reference line 15 from the fitting point Pe is a substantially toric surface as shown in FIG. 33A, and the toric surface element of the eyeball-side surface 19B cancels the toric surface element of the object-side surface 19A. Moreover, the object-side surface 19A of the progressive power lens 10f in an area within ±10 mm along the horizontal reference line 15 from the principal meridian 14, that is, the portion of the object-side surface 19A from the principal meridian 14 to the lines L(10), is a substantially toric surface, and the toric surface element of the eyeball-side surface 19B cancels the toric surface element of the object-side surface 19A, as shown in FIG. 36A. As a result, a substantially toric surface is formed along the principal meridian 14, along which the line of sight 2 moves, whereby image sway produced through the optical lens 10f when the eye moves can be suppressed.

Figure 42:
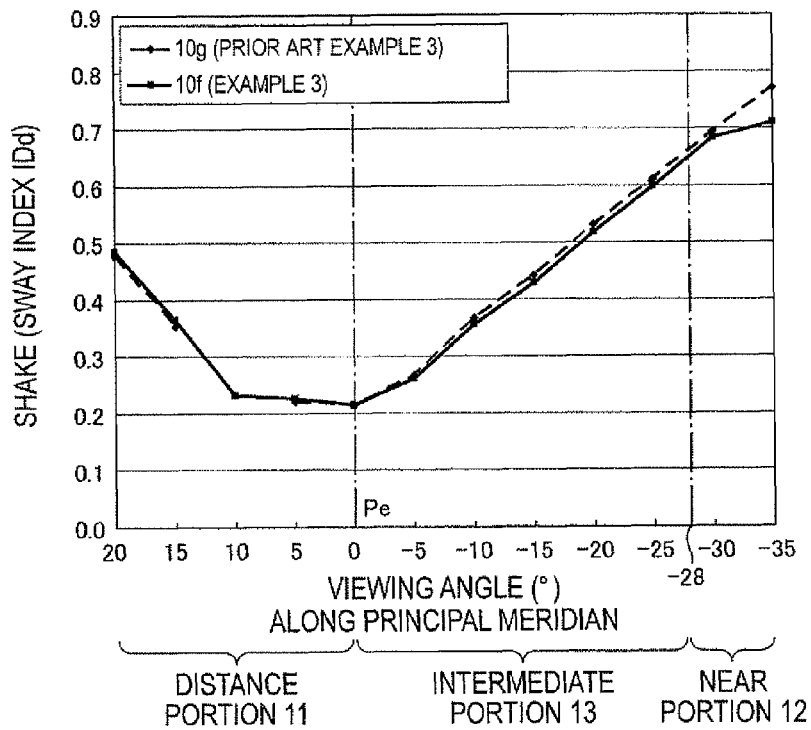
FIG. 42 shows shake (sway index IDd) in Example 3 and Prior art Example 3.

FIG. 42 shows the index IDd representing shake determined by using the sway evaluation method. The index IDd representing shake produced by the progressive power lens 10f according to Example 3 is smaller than the index IDd representing shake produced by the progressive power lens 10g according to Prior art Example 3. FIG. 42 shows that sway decreases substantially throughout the principal meridian 14 from the distance portion through the intermediate portion to the near portions. In particular, the sway is greatly reduced in the near portion 12.

The difference TPc between the horizontal surface power OHP and the vertical surface power OVP of the progressive power lens 10f according to Example 3 at the fitting point Pe is 1.0 D, which satisfies the condition (10). The amount of decrease $\Delta TP(10)$ in the difference TP of the progressive power lens 10f is 0.08 D, as shown in FIG. 34A, which satisfies the condition (11). The progressive power lens 10f therefore includes a toric surface element capable of suppressing image sway along the principal meridian 14.

Further, the progressive power lens 10f according to Example 3 has a $\Delta TP$ (25) of 1.06TPc (1.06/1.00), which satisfies the condition (12) described above. The portion of the progressive power lens 10f according to Example 3 beyond ±10 mm from the fitting point Pe and the principal meridian 14 along the horizontal reference line 15 is therefore an aspheric surface (atoric surface) where the horizontal surface power OHP monotonously decreases. The progressive power lens 10f according to Example 3 therefore provides an advantage of a shallow horizontal lens curve of the object-side surface 19A. That is, the object-side surface 19A of the progressive power lens 10f according to Example 3 includes an atoric surface element where the difference between the horizontal surface power OHP and the vertical surface power OVP at the fitting point Pe is 1.0 D and the difference is substantially zero at horizontal distances x of ±25 mm from the fitting point Pe.

Figure 43:
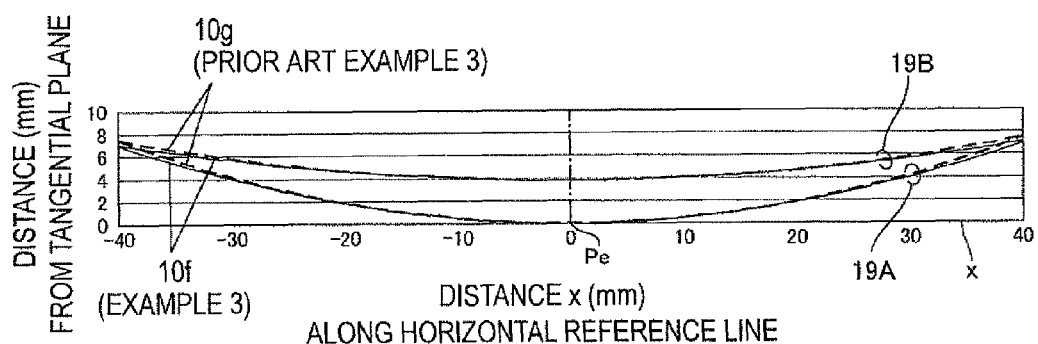
FIG. 43 shows the curved of the object-side surfaced and the curved of the eyeball-side surfaced of the progressive power lenses according to Example 3 and Prior art Example 3.

FIG. 43 shows the curves of the object-side surfaces 19A and the curves of the eyeball-side surfaces 19B of the progressive power lens 10f according to Example 3 and the progressive power lens 10g according to Prior art Example 3. Each of the curves includes the fitting point Pe and extends along the horizontal reference line 15. The curve of each of the object-side surfaces 19A is expressed by the distance from a tangential plane including the fitting point Pe (object-side sag), which is the vertex and the geometric center of the object-side surface 19A. In this example, each of the progressive power lens 10f according to Example 3 and the progressive power lens 10g according to Prior art Example 3 is a positive meniscus lens, unlike each of the lenses in the examples described above, which are negative meniscus lenses. Therefore, unlike the spherical object-side surface 19A of the progressive power lens 10g according to Prior art Example 3, the object-side surface 19A of the progressive power lens 10f according to Example 3 is an atoric surface and is further shallower than the spherical surface because the horizontal surface power OHP(x) decreases with distance toward the periphery.

Referring to the numerical data of the progressive power lenses 10f and 10g shown in FIGS. 34A and 34B, the horizontal surface power OHP of the object-side surface 19A of the progressive power lens 10f according to Example 3 decreases by 0.084 D ($\Delta TP(10)$) at a horizontal distance x of 10 mm from the principal meridian 14 (vertical reference line y), which means that the change is mild. The horizontal surface power OHP of the object-side surface 19A abruptly decreases beyond a horizontal distance x of about 10 mm, and the amount of decrease $\Delta TP(25)$ at a horizontal distance x of 25 mm is 1.056 D, which is about 1.06 times the difference TPc (toric level) between the horizontal surface power OHP and the vertical surface power OVP at the fitting point Pe on the principal meridian 14, which is 1.0 D. The horizontal surface power OHP of the object-side surface 19A continues to decrease monotonously, and the amount of decrease ΔTP at the outer edge of the lens is 2.352 D, which is about 2.5 times the toric level TP at the principal meridian 14.

Further, when the progressive power lens 10f according to Example 3 is compared with the progressive power lens 10g according to Prior art Example 3 in terms of the sag of the object-side surface 19A, the object-side surface 19A of the progressive power lens 10f, which is improved by the atoric surface element, is shallower than the object-side surface 19A of the progressive power lens 10g by about 0.68 mm at a horizontal distance x of 35 mm. When the progressive power lens 10f is compared with the progressive power lens 10g in terms of thickness, the central thickness and thickness in each horizontal position are substantially the same.

The progressive power lens 10f according to Example 3 thus forms an optical lens (spectacle lens) that produces a small amount of image sway, has a small entire thickness, and has a small amount of forward protrusion, which is an external appearance characteristic to hypermetropia prescription. Further, a problem with a mid-strong hypermetropia prescription, that is, too deep a lens curve relative to a spectacle frame curve (lens curve for providing power of 1.53 is typically designed to range 3 D from 5 D) makes it difficult for the lens to be inserted into the frame, is also solved.

The invention has been described with reference to a progressive power lens. A monofocal lens having object-side and eyeball-side surfaces each of which includes an atoric surface element independent of astigmatism correction can also provide an optical lens that does not have too deep a lens curve and can be readily inserted into a frame even when the optical lens is a large base-curve spectacle lens, as in the embodiments and examples described above.

Figure 44:
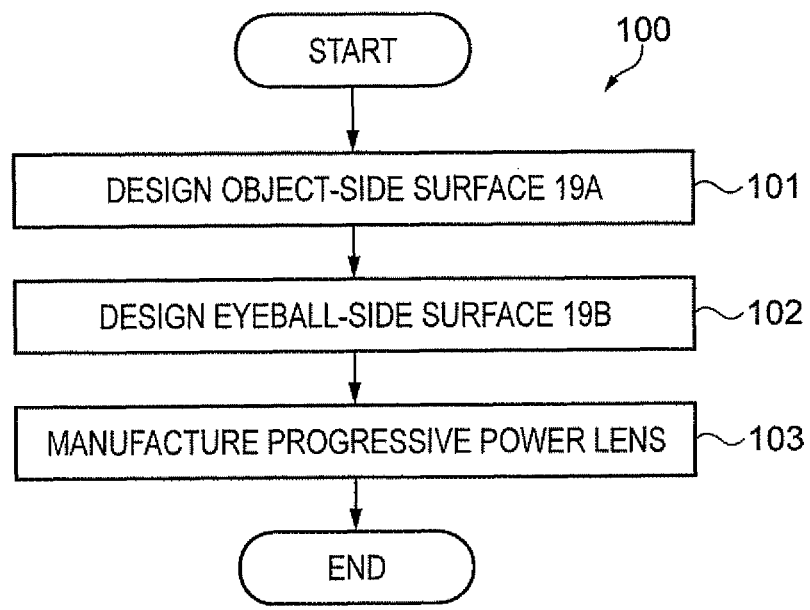
FIG. 44 shows a flowchart showing a procedure of design and manufacture of an optical lens.

FIG. 44 shows a summary of the procedure of design and manufacture of an optical lens. A design and manufacture method 100 includes step 101 of designing an object-side surface 19A, step 102 of designing an eyeball-side surface 19B, and step 103 of manufacturing a progressive power lens (optical lens) 10 designed in steps 101 and 102. Step 101 of designing the object-side surface 19A includes providing the object-side surface 19A with an atoric surface element where the horizontal surface power OHP is greater than the vertical surface power OVP at the fitting point Pe and the difference TP between the horizontal surface power OHP and the vertical surface power OVP decreases along the horizontal reference line 15 passing through the fitting point Pe in the direction from the fitting point toward the periphery of the optical lens 10 or the sign of the difference between the horizontal surface power and the vertical surface power changes along the horizontal reference line 15. Step 102 of designing the eyeball-side surface 19B includes providing the eyeball-side surface 19B with an element that cancels a surface power shift produced by the atoric surface element of the object-side surface 19A.

To further provide the optical lens (progressive power lens) 10 with a distance portion 11 and a near portion 12 having difference power factors, step 101 of designing the object-side surface 19A further includes providing the atoric surface element of the object-side surface 19A with at least one of the following elements: an element where the horizontal surface power OHPf of the distance portion 11 along the vertical reference line y or the principal meridian 14 passing through the fitting point Pe is greater than the vertical surface power OVPf of the distance portion 11 therealong and an element where the horizontal surface power OHPn of the near portion 12 along the vertical reference line y or the principal meridian 14 passing through the fitting point Pe is greater than the vertical surface power OVPn of the near portion 12 therealong (condition expressed by Expression (0)).

Step 101 of designing the object-side surface 19A may further include providing the object-side surface 19A with any of the following elements: a first element where the vertical surface power OVPf of the distance portion is greater than the vertical surface power OVPn of the near portion (condition expressed by Expression (1)), a second element where the vertical surface power OVPf of the distance portion is smaller than the vertical surface power OVPn of the near portion (condition expressed by Expression (2)), and a third element where the vertical surface power OVPf of the distance portion is equal to the vertical surface power OVPn of the near portion and the horizontal surface power OHPf of the distance portion is equal to the horizontal surface power OHPn of the near portion (condition expressed by Expression (3)).

The design method can be provided in the form of computer program (program product) executed by a computer including a CPU, a memory, and other appropriate hardware resources and carrying out steps 101 and 102 described above. In this case, the computer program can be recorded in the memory, a ROM, or any other appropriate medium. The design method may alternatively be provided over a network.

Figure 45:
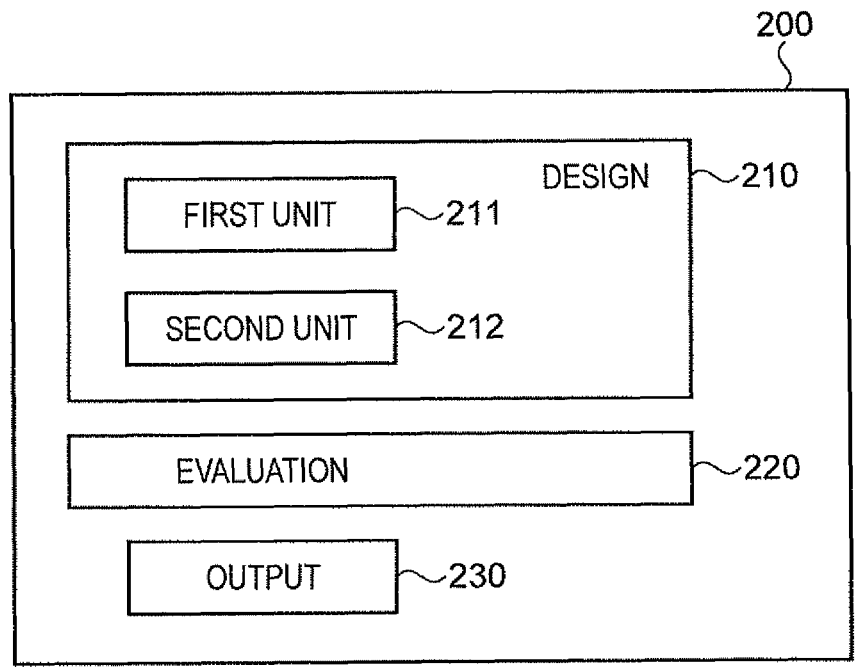
FIG. 45 is a block diagram of an apparatus for designing an optical lens.

FIG. 45 shows an example of an apparatus for designing a progressive power lens (optical lens) 10. A design apparatus 200 includes a design unit 210 that designs a progressive power lens 10 based on spectacle specifications, an evaluation unit 220 that determines the sway index IDd of the designed progressive power lens 10 by using the method described above and evaluates the sway index IDd, and an output unit 230 that converts the sway index IDd determined by the evaluation unit 220 into a form readily visible to a user (wearer), for example, in the form of graph, and outputs the converted sway index IDd. The output unit 230 allows the user to select among candidates by himself/herself a progressive power lens 10 that minimizes sway.

The design unit 210 includes a first unit 211 that designs the object-side surface 19A and a second unit 212 that designs the eyeball-side surface 19B. The first unit 211 has a function of carrying out step 101 in the design method 100 described above, and the second unit 212 has a function of carrying out step 102 in the design method 100 described above. An example of the design apparatus 200 is a personal computer including a CPU, a memory, a display, and other resources, and the design apparatus 200 having the functions described above can be achieved by downloading a program that instructs the personal computer to function as the design apparatus 200.

The above description has been made with reference to the case where a distance correction prescription includes no astigmatism correction prescription. When an astigmatism correction prescription is included, it is possible to design and manufacture an optical lens including the astigmatism correction prescription by adding a toric surface element for the astigmatism correction to the eyeball-side surface. In this case, the addition of the toric surface does not always satisfy Expression (4), but the advantageous effect of the invention can still be provided. Further, when the lens thickness is large, a more precise spectacle lens can be provided by adding correction to the eyeball-side surface in consideration of the shape factor.

What is claimed is:

1. An optical lens comprising:
    an object-side surface including an atoric surface element; and an eyeball-side surface including an element that cancels a surface power shift produced by the atoric surface element, wherein the atoric surface element of the object-side surface causes horizontal surface power at a fitting point to be greater than vertical surface power at the fitting point, the fitting point being a point through which a line of sight of a primary position of a user who is horizontally viewing a distant object in front of the user passes, and the atoric surface element of the object-side surface
(i) causes a difference between the horizontal surface power and the vertical surface power to decrease along a horizontal reference line passing through the fitting point in a direction from the fitting point toward a periphery of the optical lens or
(ii) causes a sign of the difference between the horizontal surface power and the vertical surface power to change along the horizontal reference line.

2. The optical lens according to claim 1, wherein the difference between the horizontal surface power and the vertical surface power at the fitting point is greater than or equal to 0.5 D but smaller than or equal to 3.5 D, where D represents dioptre.

3. The optical lens according to claim 1, wherein an amount of decrease in the difference between the horizontal surface power and the vertical surface power is 0.3 D at maximum in an area within ±10 mm from the fitting point along the horizontal reference line.

4. The optical lens according to claim 1, wherein an amount of decrease in the difference between the horizontal surface power and the vertical surface power in an area within ±25 mm from the fitting point along the horizontal reference line is greater than or equal to 0.3 times the difference between the horizontal surface power and the vertical surface power at the fitting point but smaller than or equal to 1.5 times of the difference between the horizontal surface power and the vertical surface power at the fitting point.

5. The optical lens according to claim 1,
further comprising a distance portion and a near portion having different power factors,
wherein the atoric surface element of the object-side surface includes at least one of the following elements: an element where horizontal surface power is greater than vertical surface power of the distance portion along a principal meridian or a vertical reference line passing through the fitting point and an element where horizontal surface power is greater than vertical surface power of the near portion along the vertical reference line passing through the fitting point or the principal meridian.

6. The optical lens according to claim 5,
wherein the object-side surface includes any of the following elements: a first element, a second element, and a third element,
the first element causes the vertical surface power of the distance portion to be greater than the vertical surface power of the near portion,
the second element causes the vertical surface power of the distance portion to be smaller than the vertical surface power of the near portion, and
the third element causes the vertical surface power of the distance portion to be equal to the vertical surface power of the near portion and the horizontal surface power of the distance portion to be equal to the horizontal surface power of the near portion.

7. A method for designing an optical lens having an object-side surface and an eyeball-side surface, the method comprising:
providing the object-side surface with an atoric surface element; and
providing the eyeball-side surface with an element that cancels a surface power shift produced by the atoric surface element of the object-side surface, wherein
the atoric surface element of the object-side surface causes horizontal surface power at a fitting point to be greater than vertical surface power at the fitting point, the fitting point being a point through which a line of sight of a primary position of a user who is horizontally viewing a distant object in front of the user passes, and
the atoric surface element of the object-side surface
(i) causes the difference between the horizontal surface power and the vertical surface power to decrease along a horizontal reference line passing through the fitting point in a direction from the fitting point toward a periphery of the optical lens or
(ii) causes the sign of the difference between the horizontal surface power and the vertical surface power to change along the horizontal reference line.

8. The optical lens according to claim 1, wherein the optical lens is a spectacle lens.

9. The optical lens according to claim 8, wherein the spectacle lens is a progressive lens.

10. The optical lens according to claim 1, wherein the difference between the horizontal surface power and the vertical surface power is obtained by subtracting the horizontal surface power from the vertical surface power, or by subtracting the vertical surface power from the horizontal surface power.

* * * * *